Figure 1:
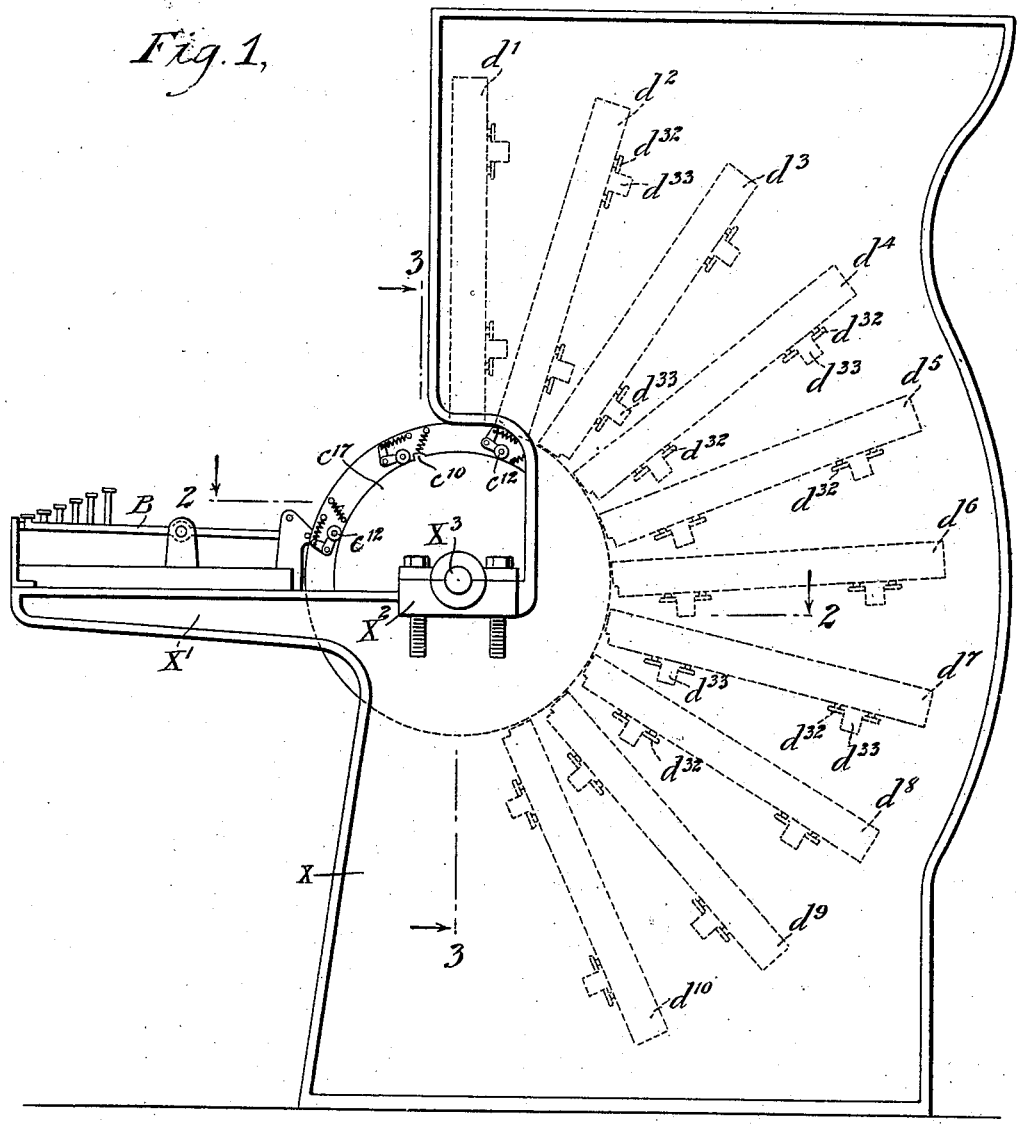

J. J. HUMMEL.
TYPE SETTING MACHINE.
APPLICATION FILED FEB. 4, 1910.

980,957.

Patented Jan. 10, 1911.
28 SHEETS—SHEET 1.

WITNESSES
Edward Thorpe
C. F. Murdock

INVENTOR
John J. Hummel
BY Munn & Co.
ATTORNEYS

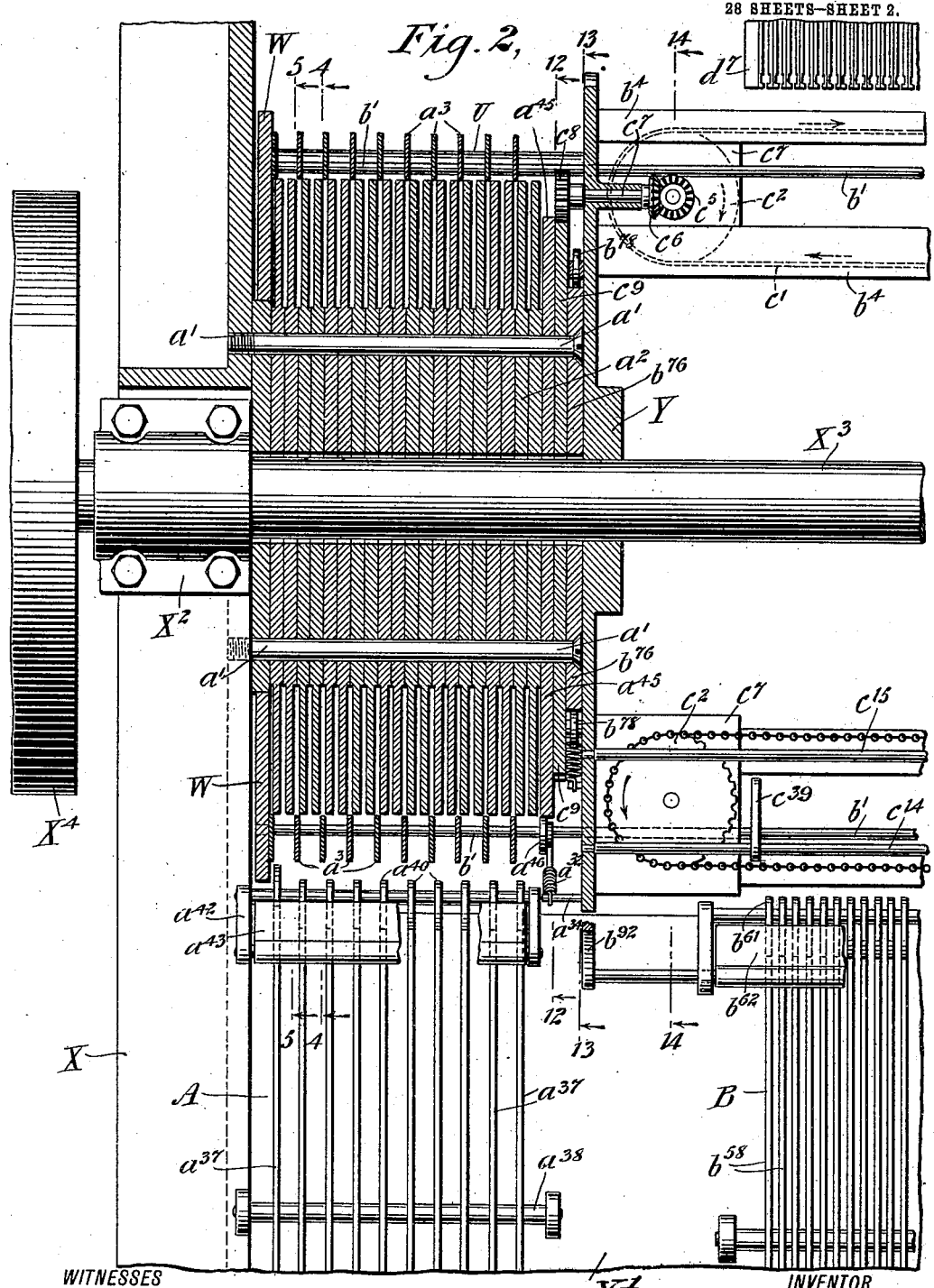

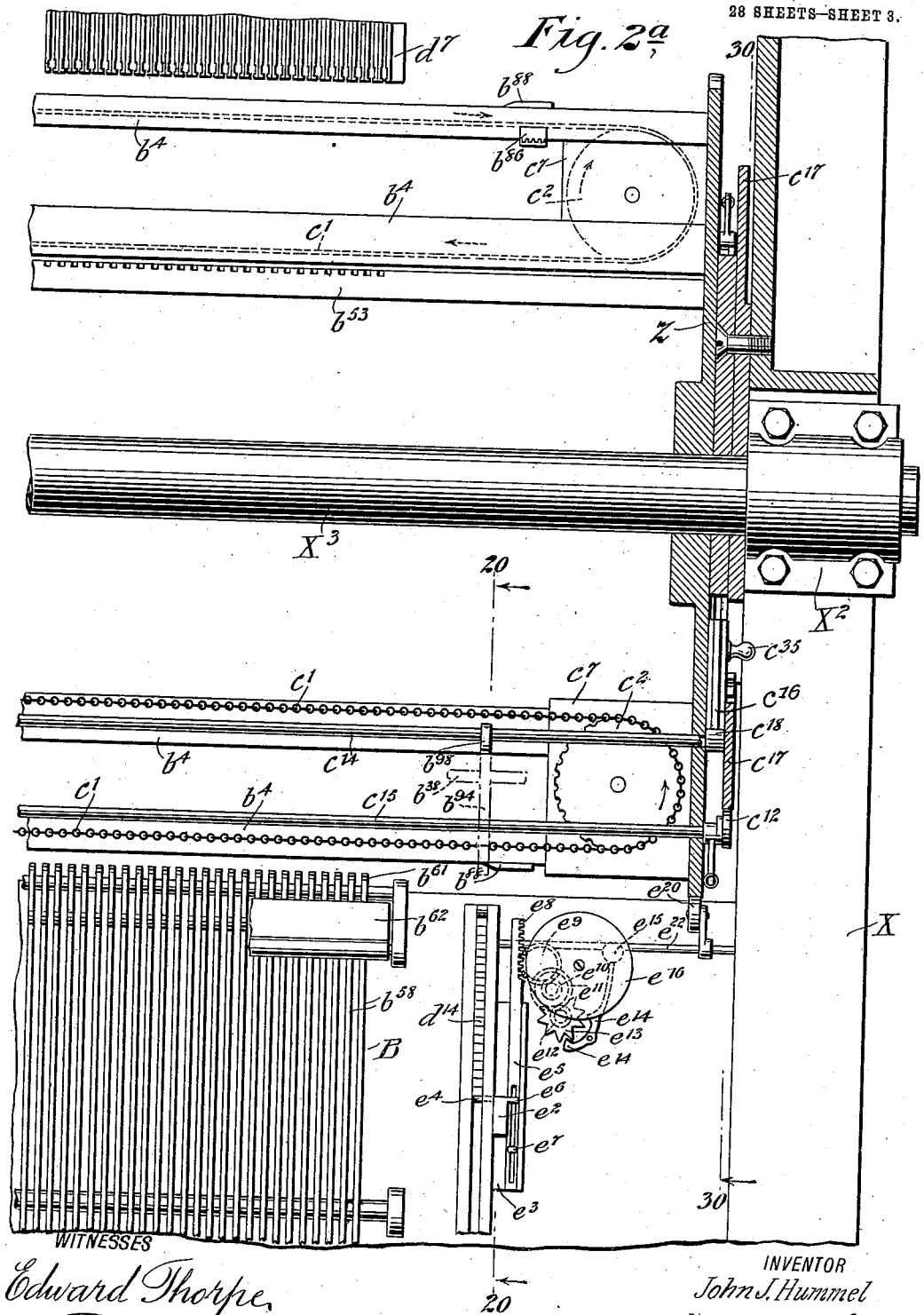

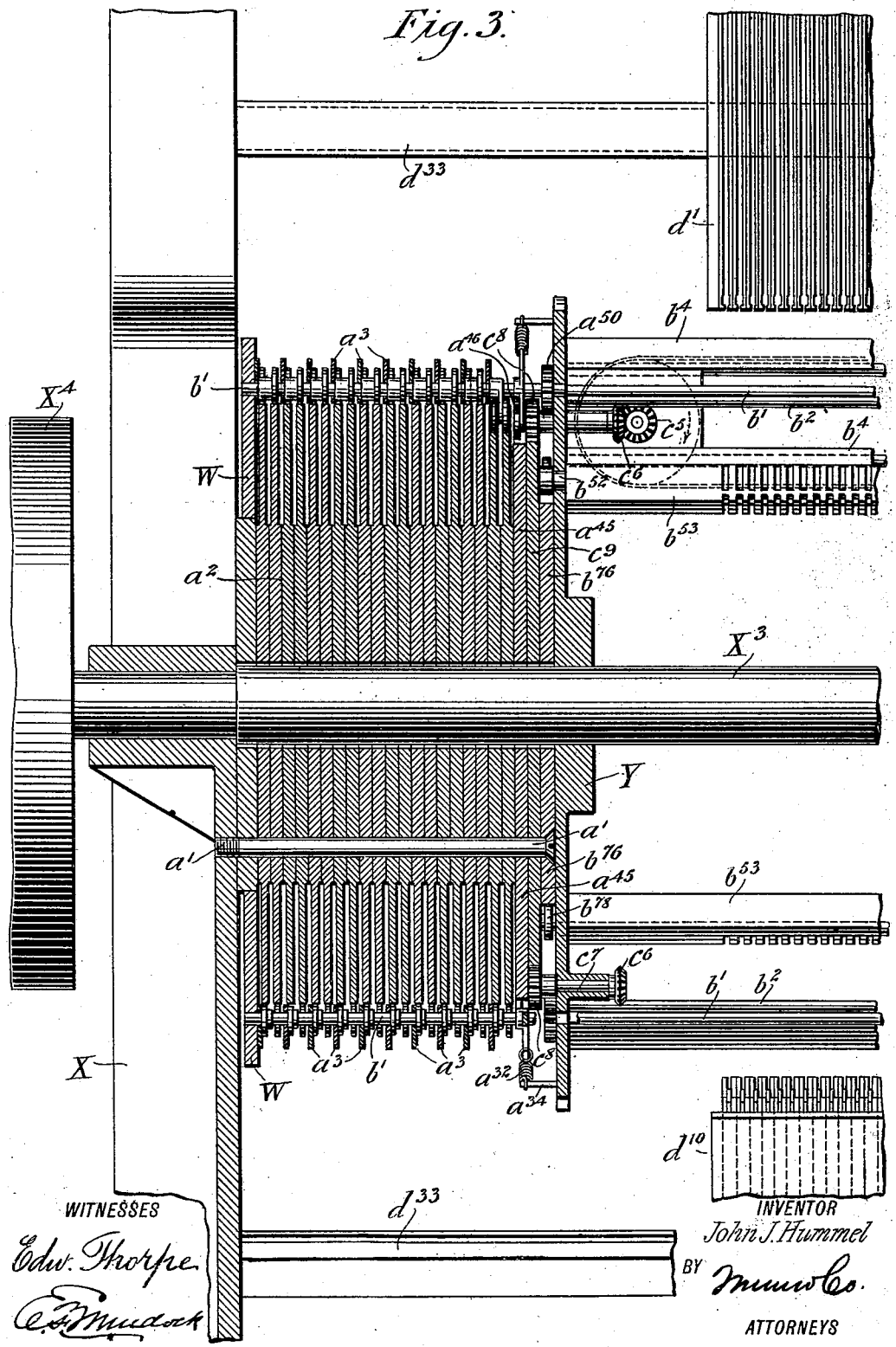

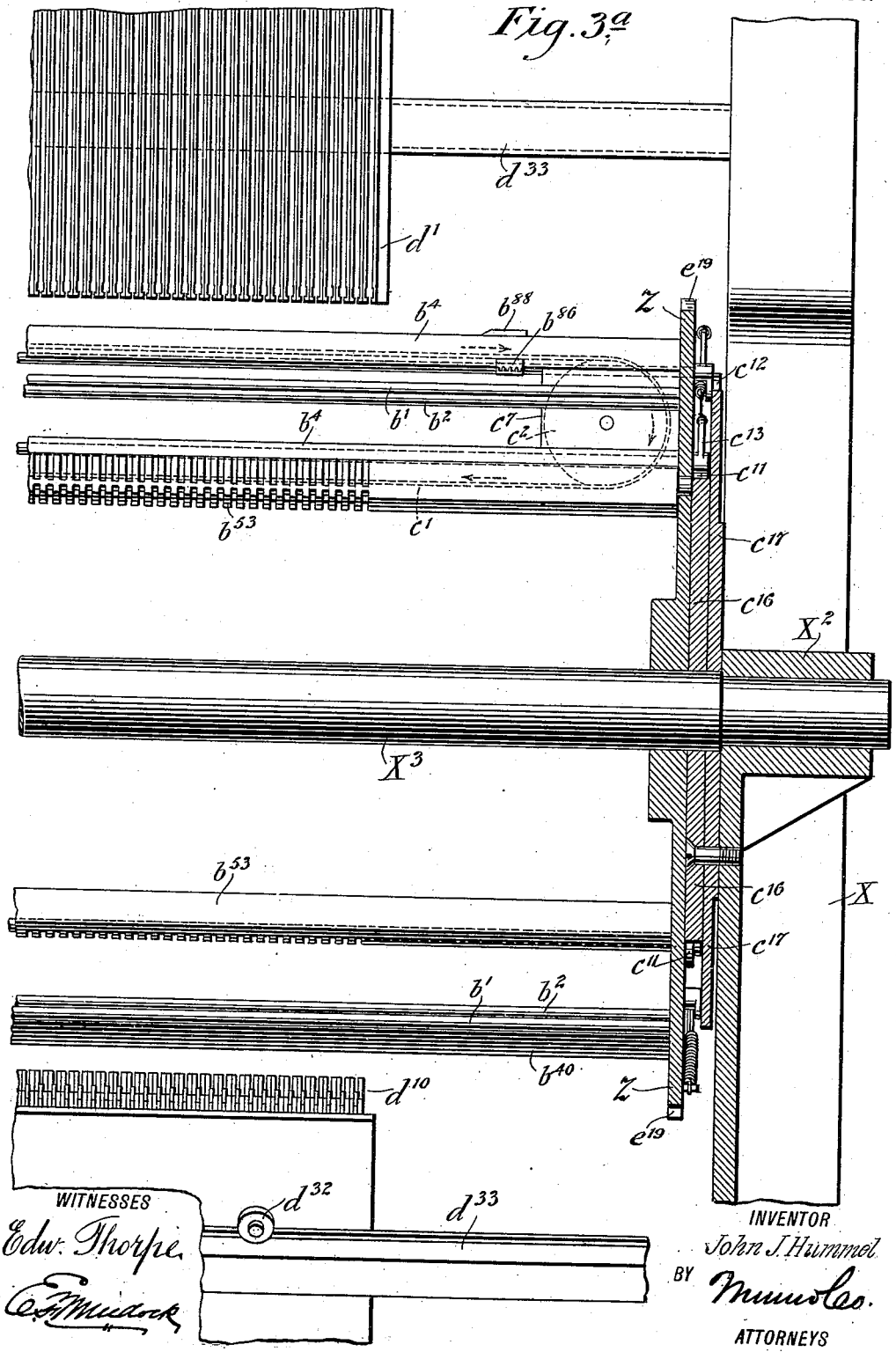

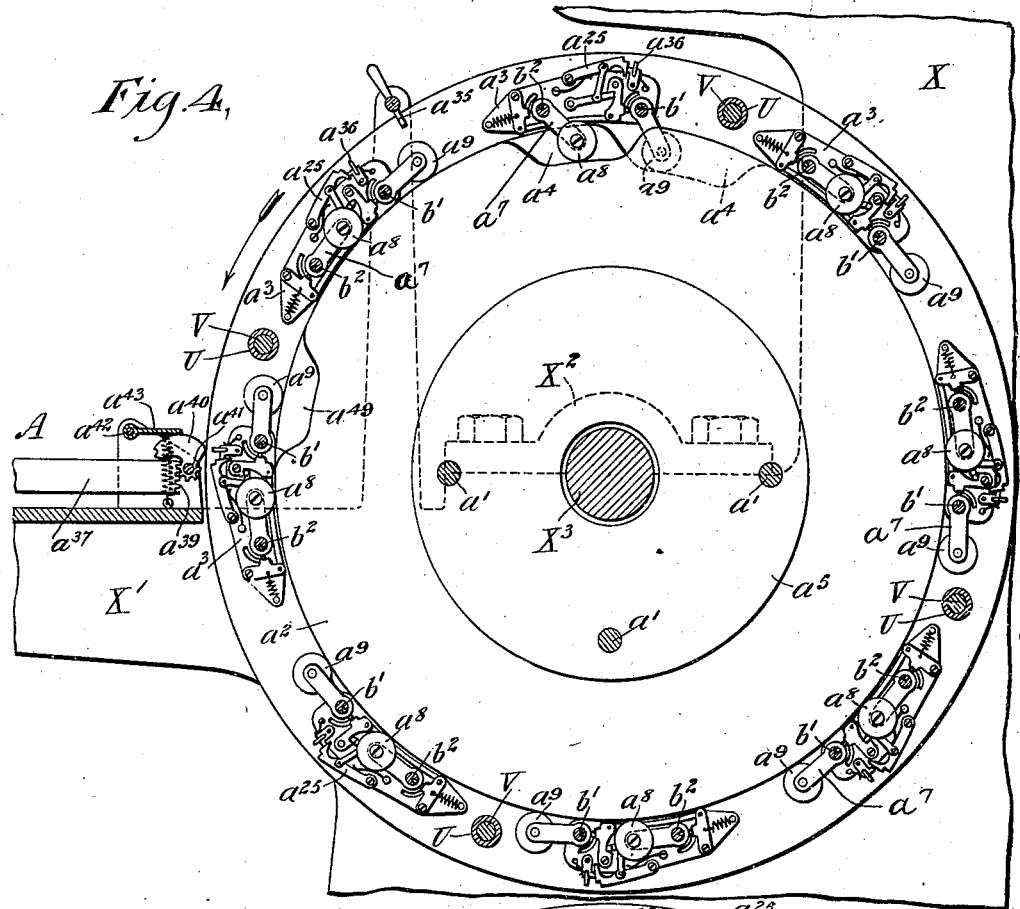
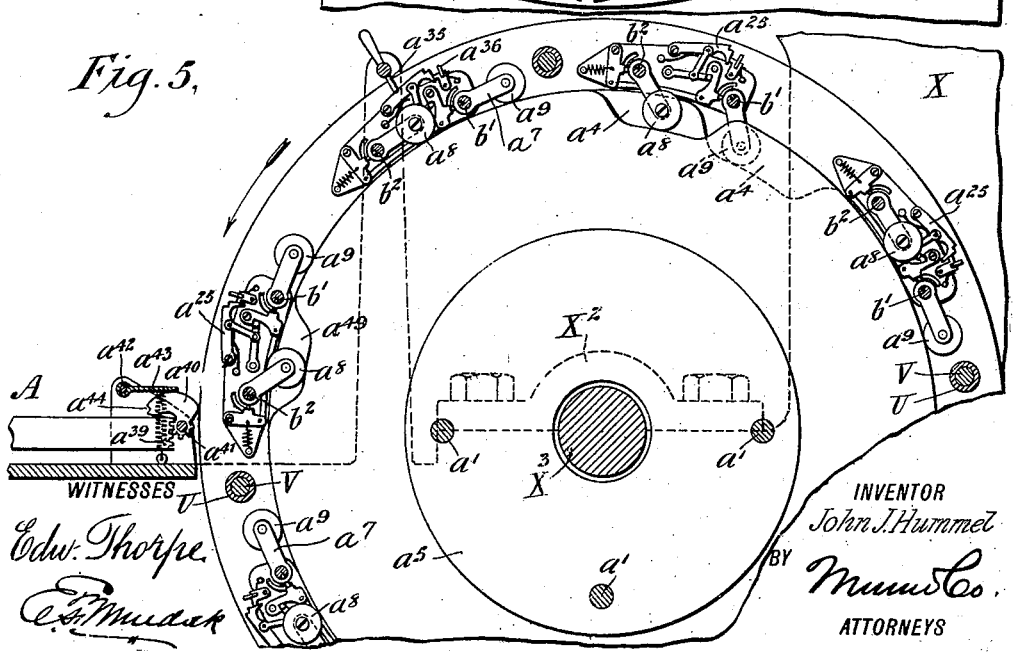

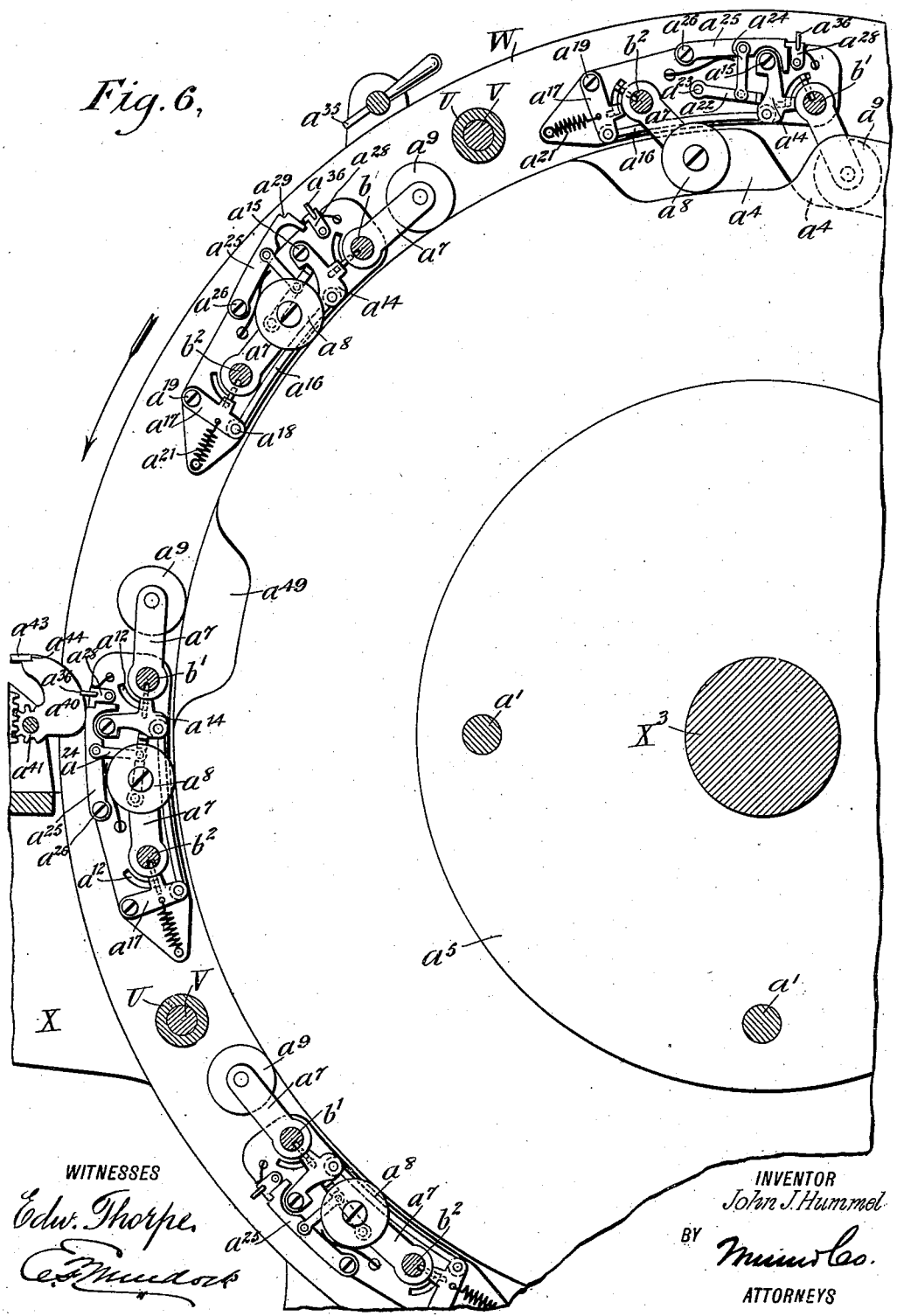

J. J. HUMMEL.
TYPE SETTING MACHINE.
APPLICATION FILED FEB. 4, 1910.

980,957. Patented Jan. 10, 1911.
28 SHEETS—SHEET 8.

WITNESSES
Edward Thorpe
E. F. Murdock

INVENTOR
John J. Hummel
BY Munn & Co.
ATTORNEYS

J. J. HUMMEL.
TYPE SETTING MACHINE.
APPLICATION FILED FEB. 4, 1910.

980,957.

Patented Jan. 10, 1911.
28 SHEETS—SHEET 10.

WITNESSES
Edw. Thorpe.

INVENTOR
John J. Hummel
BY
ATTORNEYS

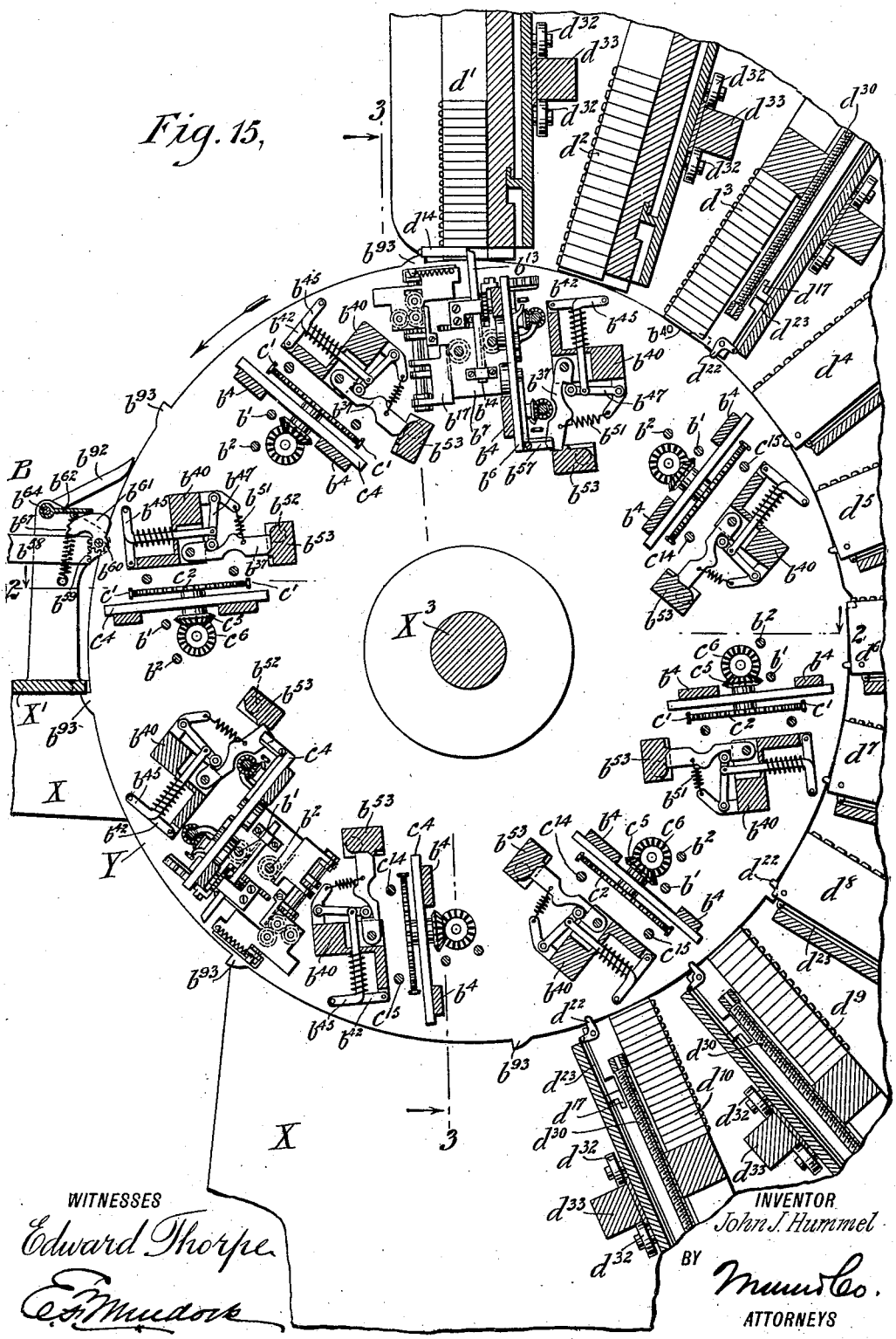

J. J. HUMMEL.
TYPE SETTING MACHINE.
APPLICATION FILED FEB. 4, 1910.
980,957.
Patented Jan. 10, 1911.
28 SHEETS—SHEET 12.
Fig. 16,
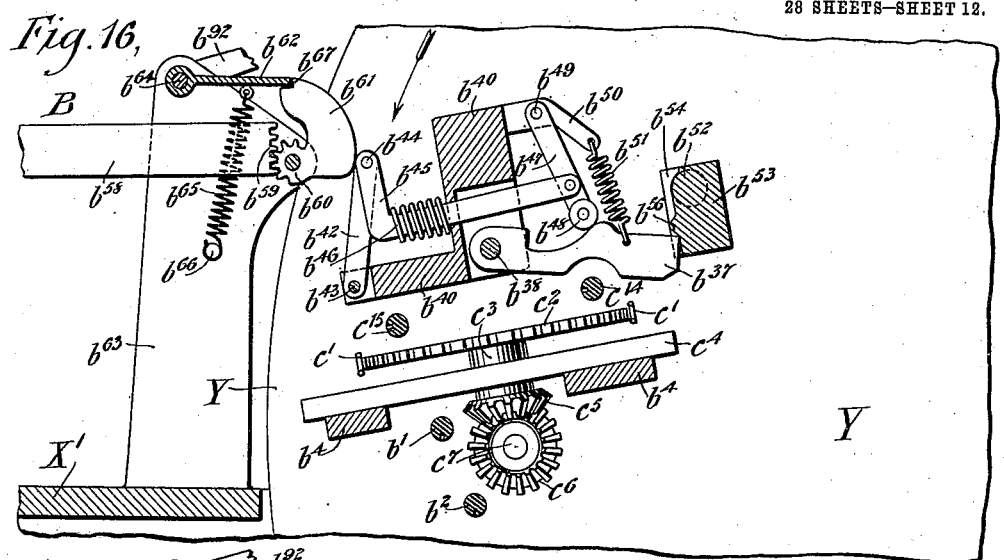
Fig. 17,
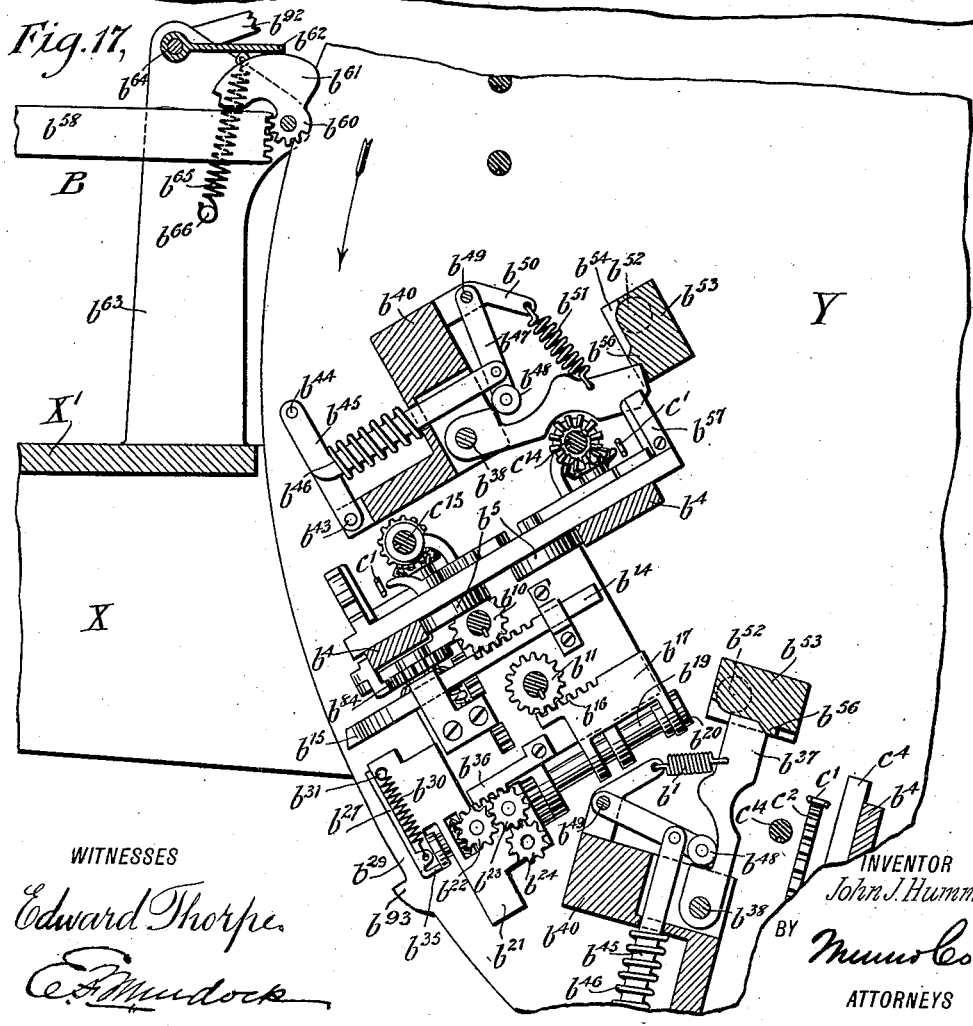
WITNESSES
Edward Thorpe
E. F. Murdock
INVENTOR
John J. Hummel
BY
Munn & Co.
ATTORNEYS
THE NORRIS PETERS CO., WASHINGTON, D. C.

J. J. HUMMEL.
TYPE SETTING MACHINE.
APPLICATION FILED FEB. 4, 1910.

980,957.

Patented Jan. 10, 1911.

28 SHEETS—SHEET 13.

WITNESSES
Edward Thorpe.
C. F. Murdock

INVENTOR
John J. Hummel
BY Munn & Co.
ATTORNEYS

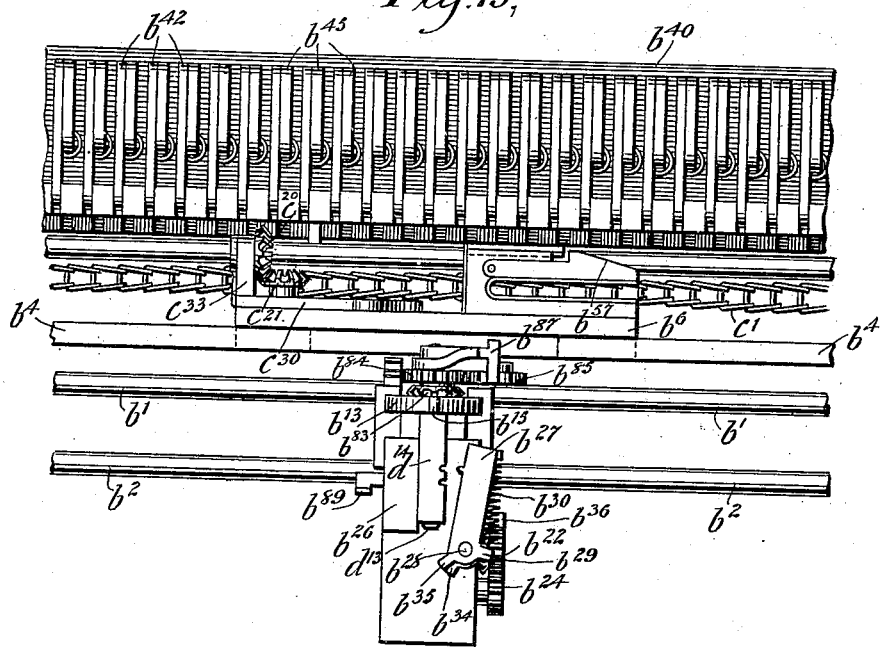

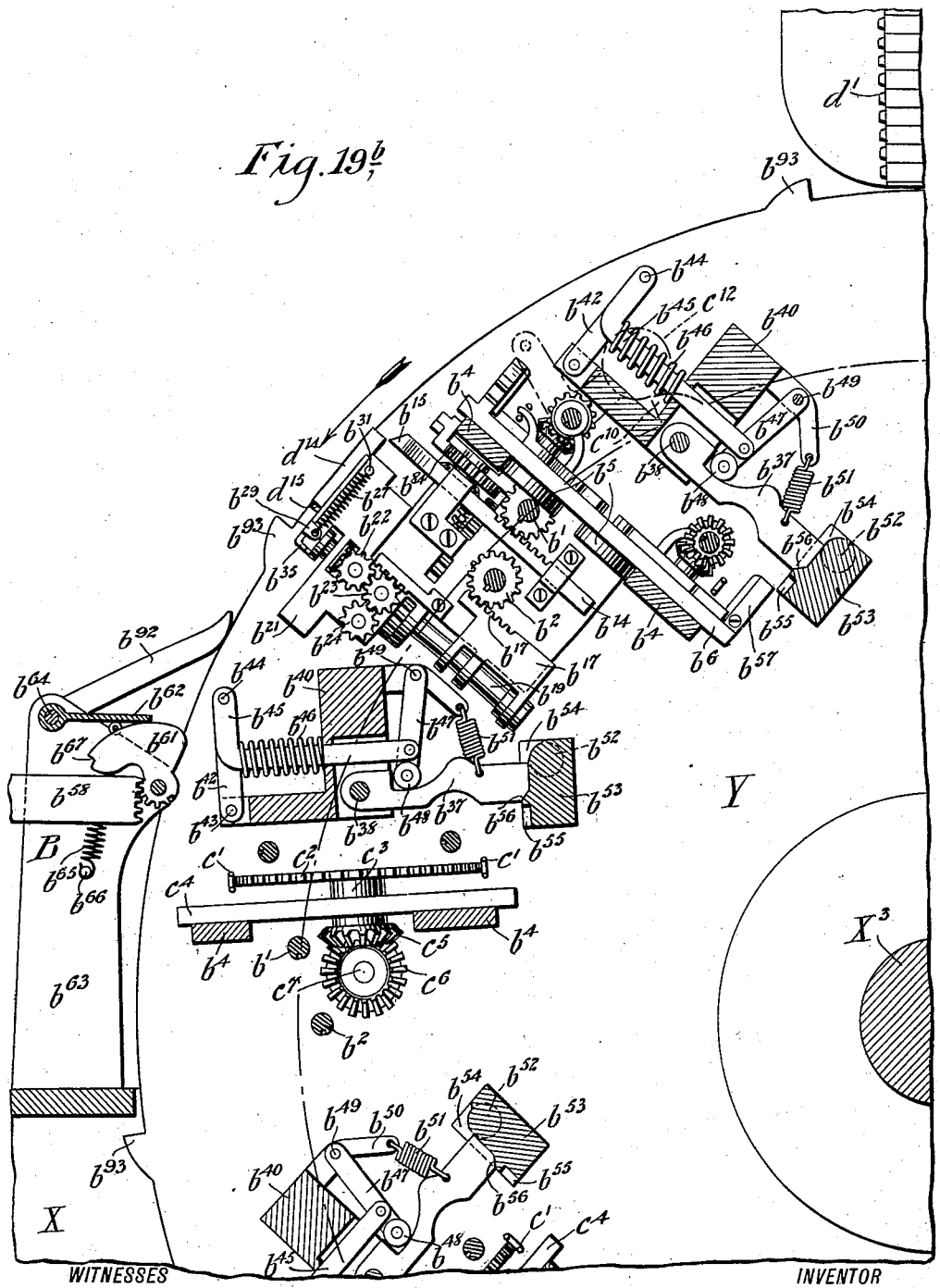

J. J. HUMMEL.
TYPE SETTING MACHINE.
APPLICATION FILED FEB. 4, 1910.
980,957.
Patented Jan. 10, 1911.
28 SHEETS—SHEET 16.
Fig. 20,
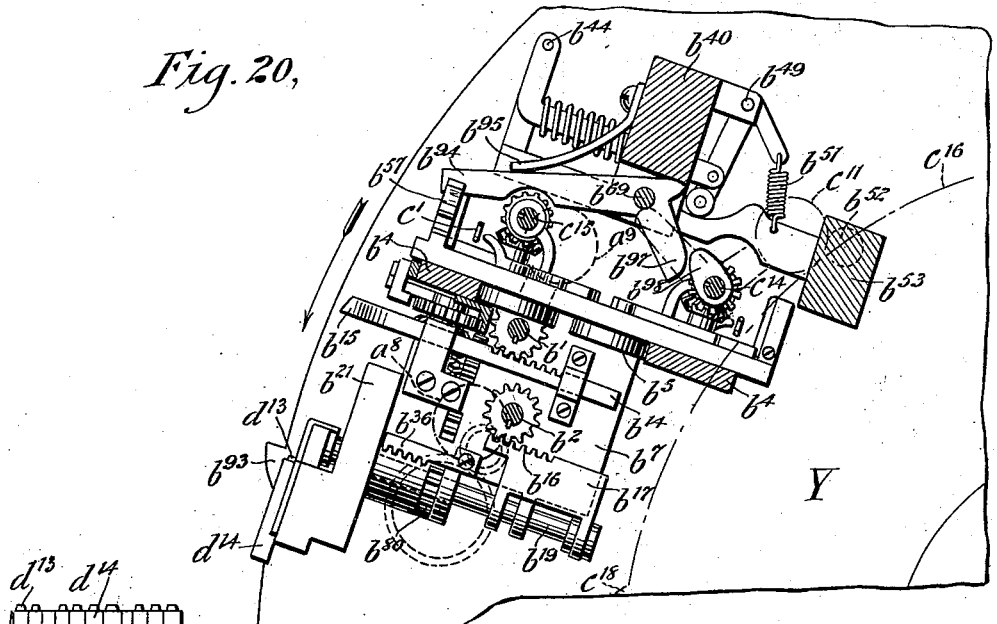
Fig. 21,
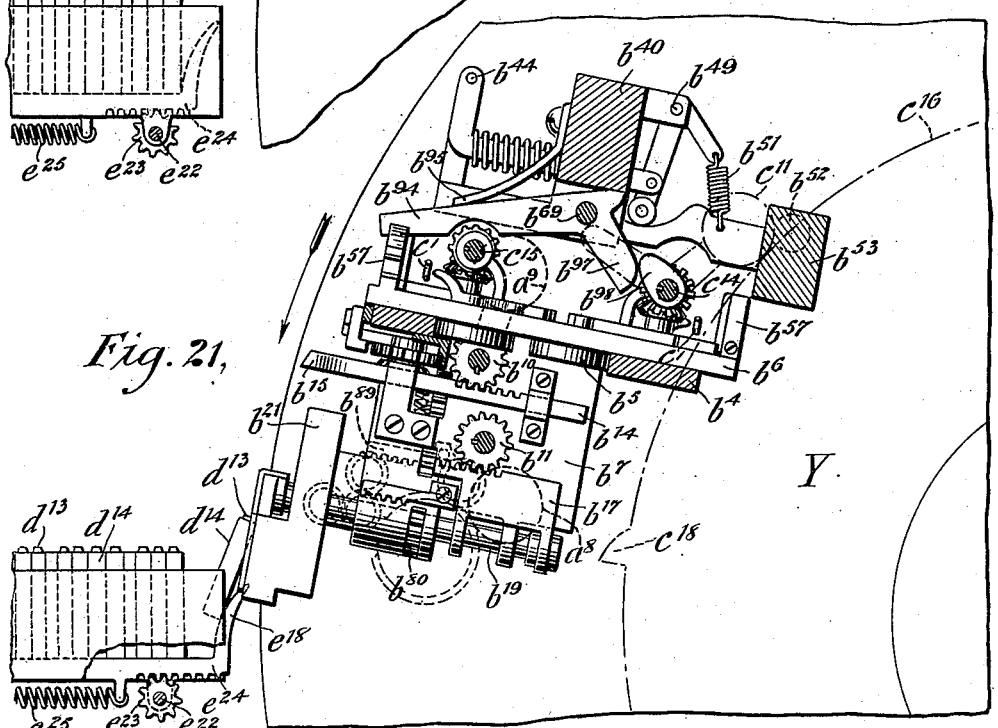
WITNESSES
Edward Thorpe
INVENTOR
John J. Hummel
BY
ATTORNEYS

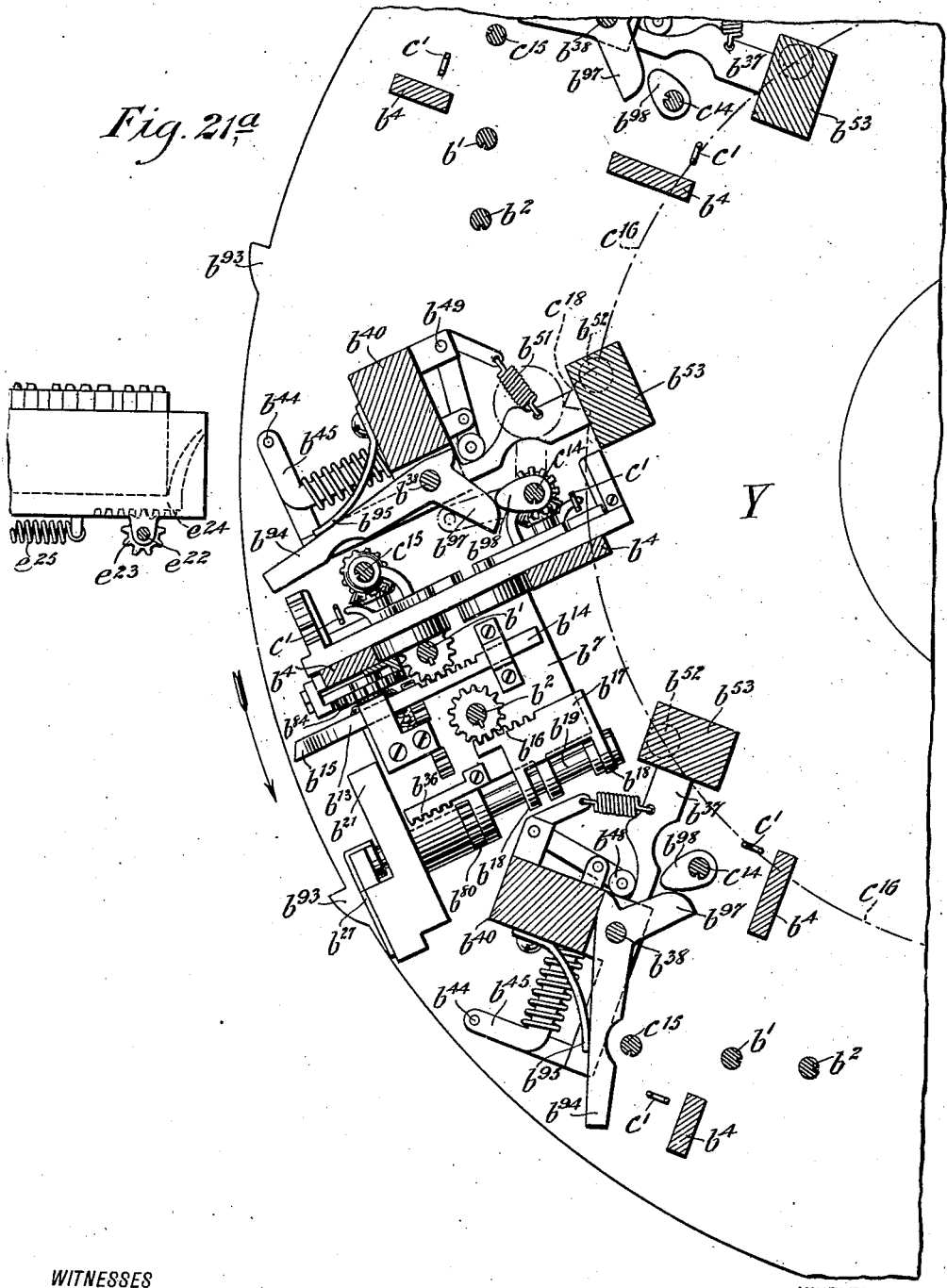

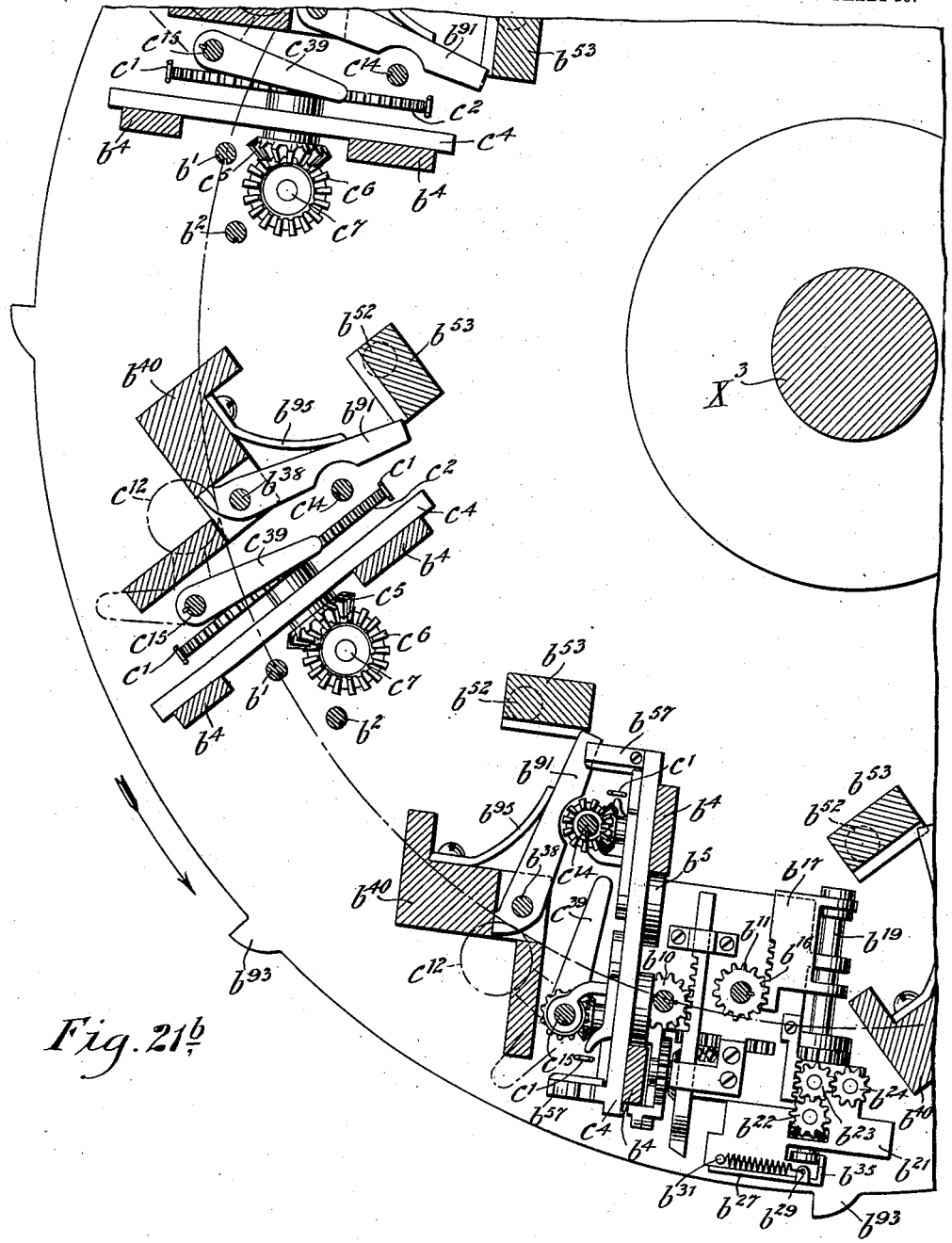

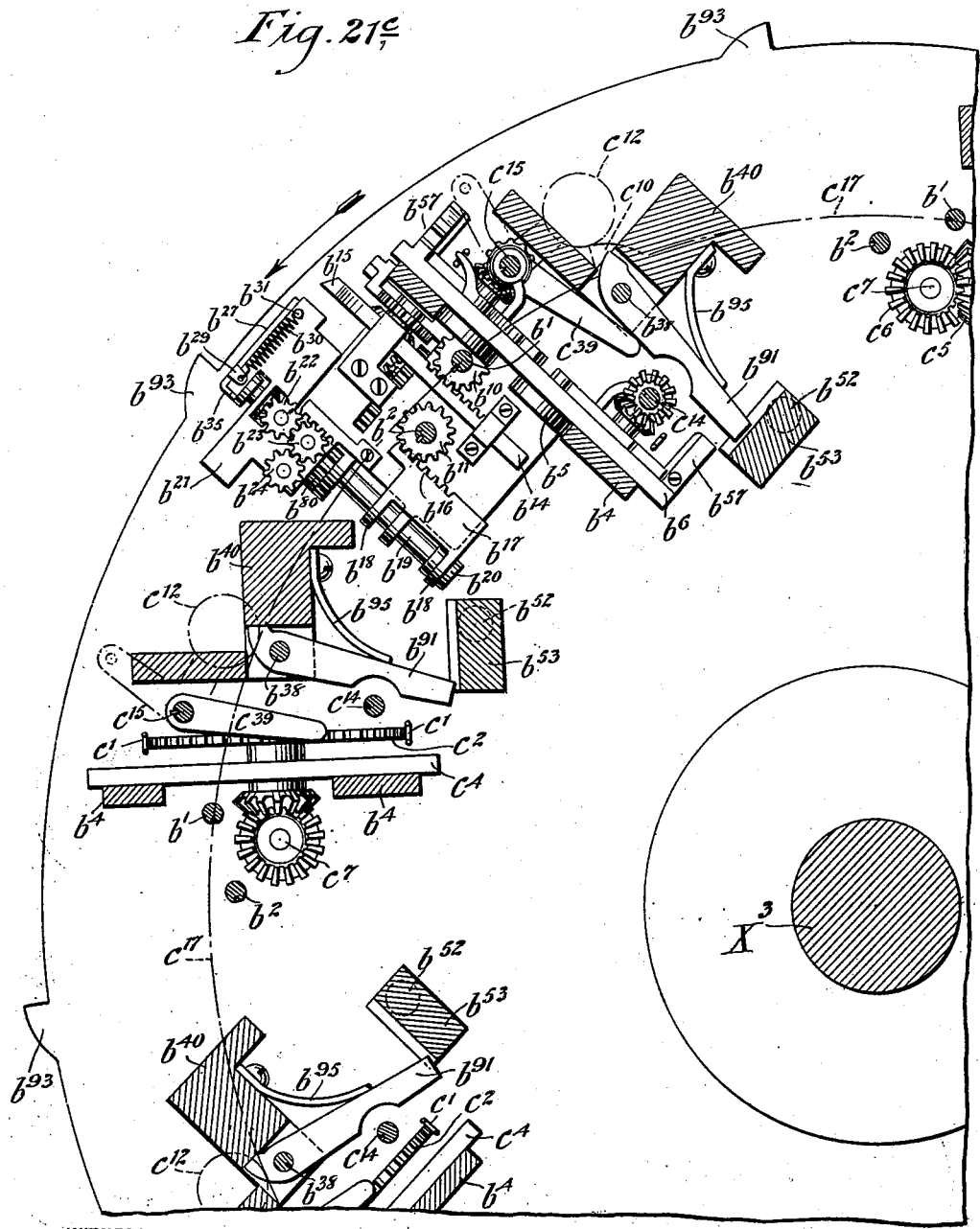

J. J. HUMMEL.
TYPE SETTING MACHINE.
APPLICATION FILED FEB. 4, 1910.

980,957.

Patented Jan. 10, 1911.
28 SHEETS—SHEET 20.

WITNESSES
Edward Thorpe

INVENTOR
John J. Hummel
BY
ATTORNEYS

J. J. HUMMEL.
TYPE SETTING MACHINE.
APPLICATION FILED FEB. 4, 1910.

980,957.

Patented Jan. 10, 1911.
28 SHEETS—SHEET 21.

WITNESSES
Edward Thorpe.

INVENTOR
John J. Hummel
BY
ATTORNEYS

J. J. HUMMEL.
TYPE SETTING MACHINE.
APPLICATION FILED FEB. 4, 1910.

980,957.

Patented Jan. 10, 1911.
28 SHEETS—SHEET 22.

WITNESSES
Edward Thorpe
C. F. Murdock

INVENTOR
John J. Hummel
BY Munn & Co.
ATTORNEYS

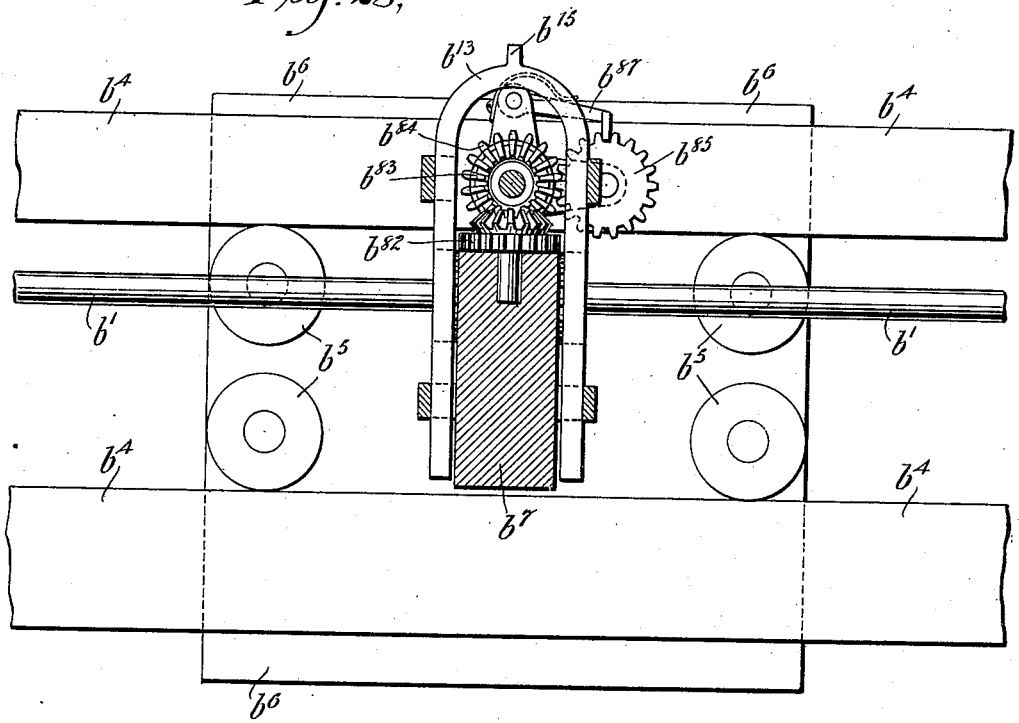
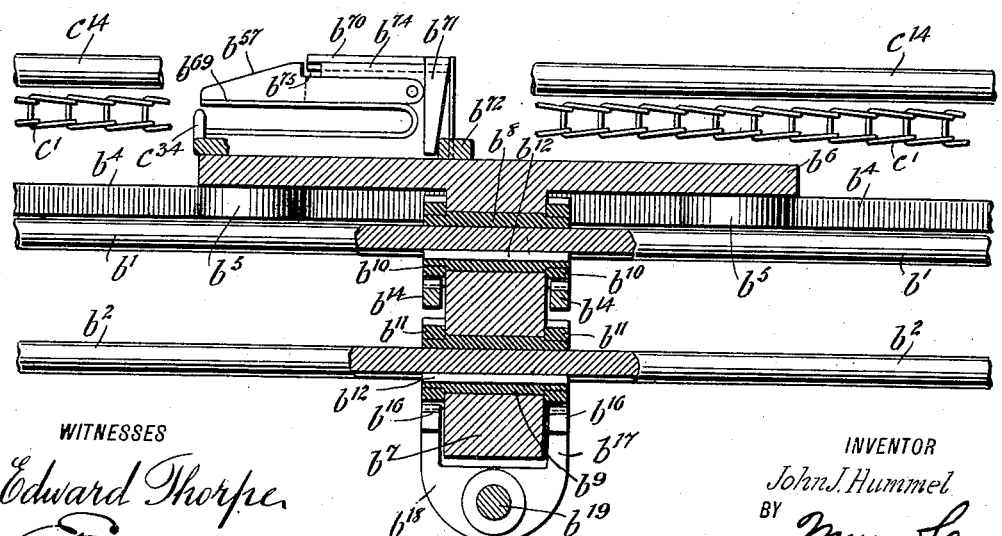

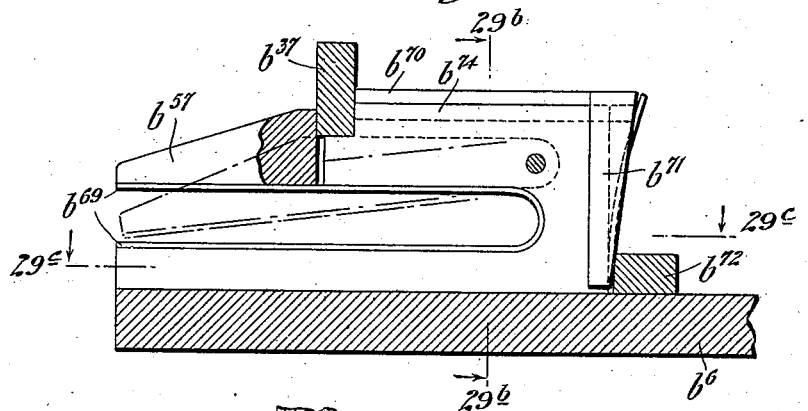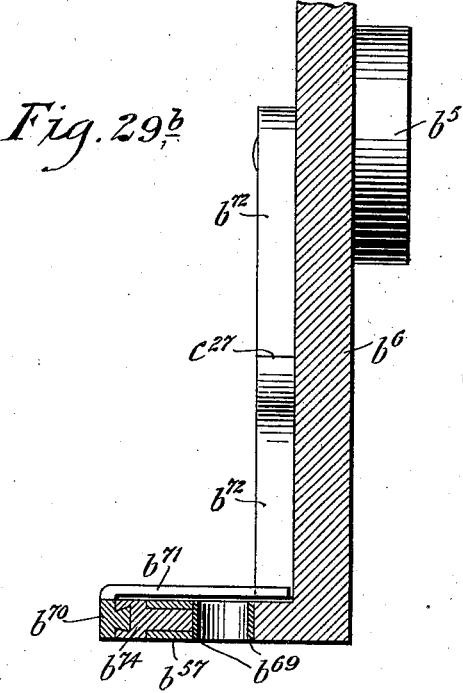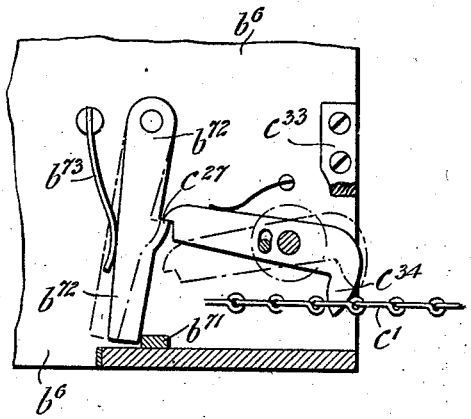

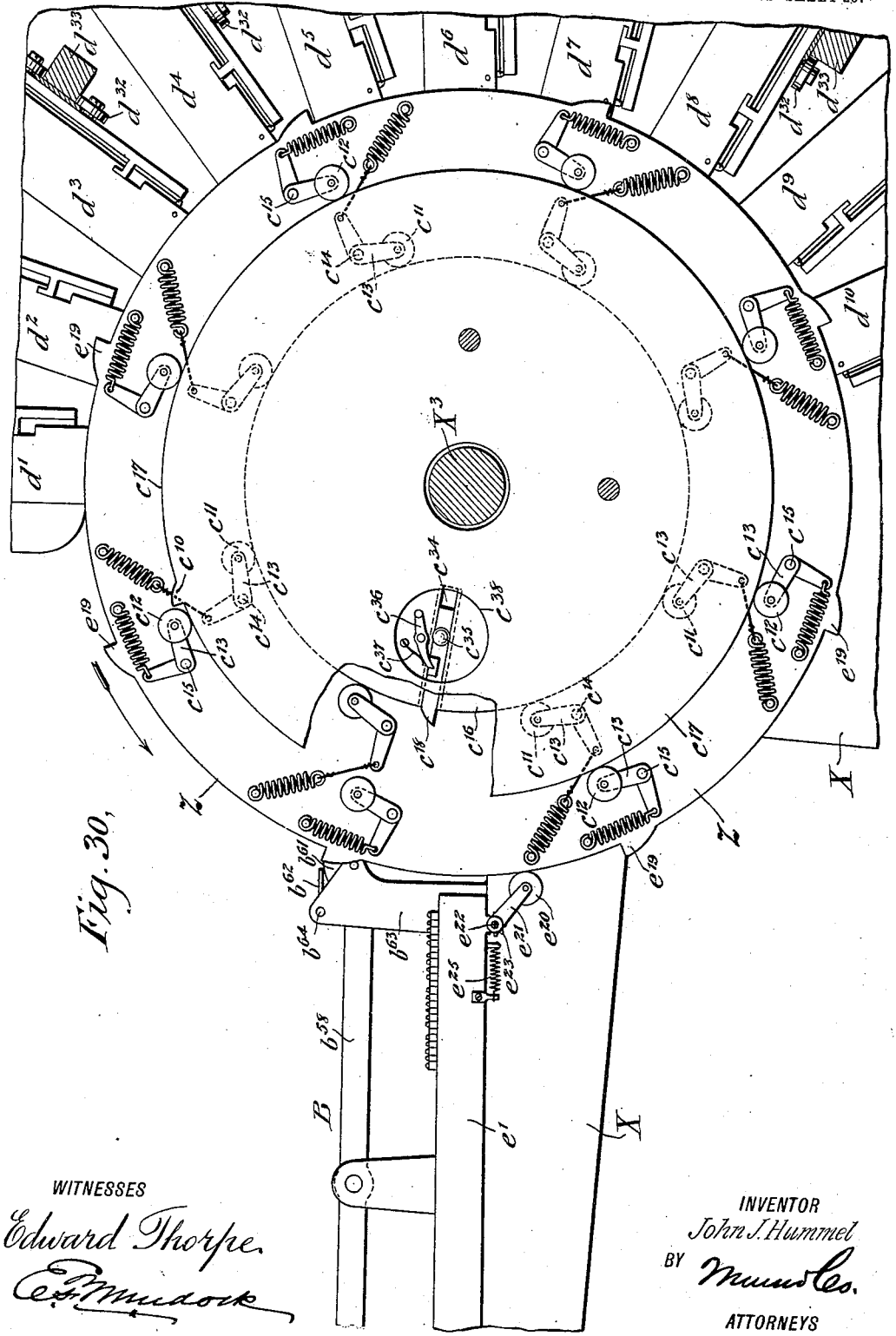

J. J. HUMMEL.
TYPE SETTING MACHINE.
APPLICATION FILED FEB. 4, 1910.
980,957.
Patented Jan. 10, 1911.
28 SHEETS—SHEET 26.
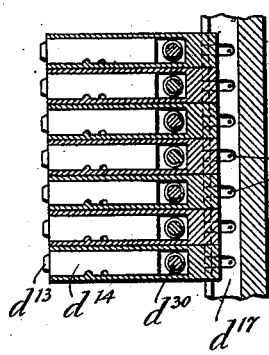
Fig. 31ª
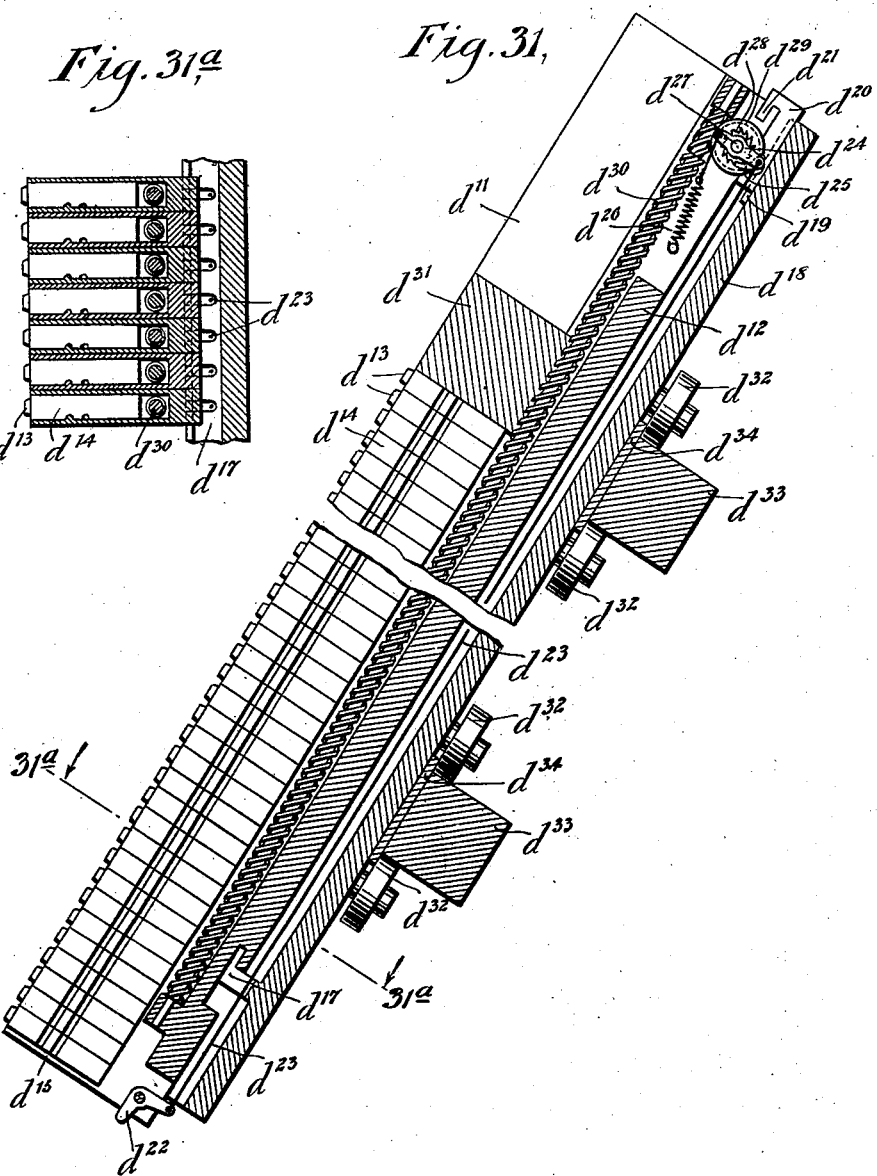
Fig. 31.
WITNESSES
Edward Thorpe.
INVENTOR
John J. Hummel
BY
ATTORNEYS

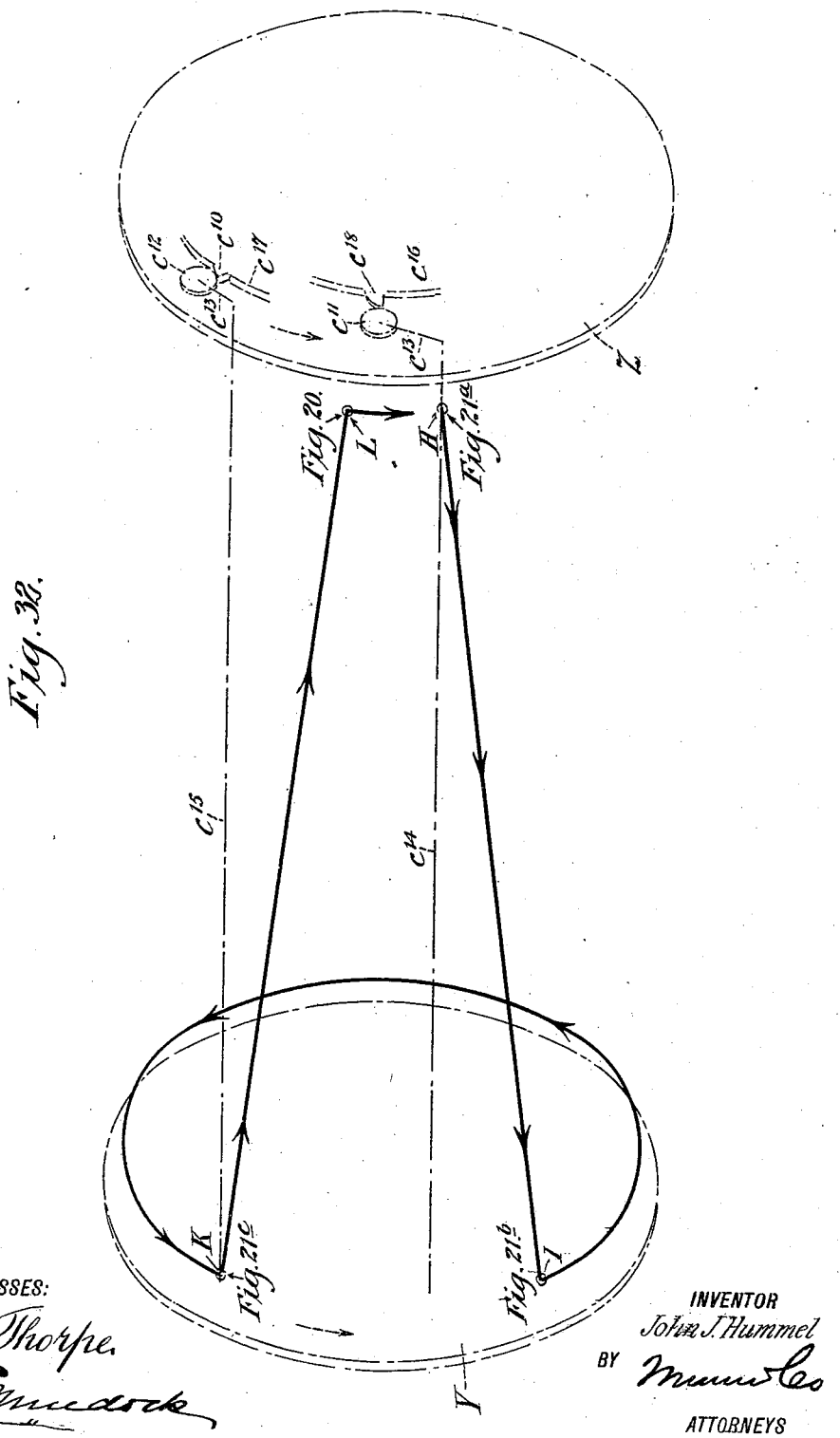

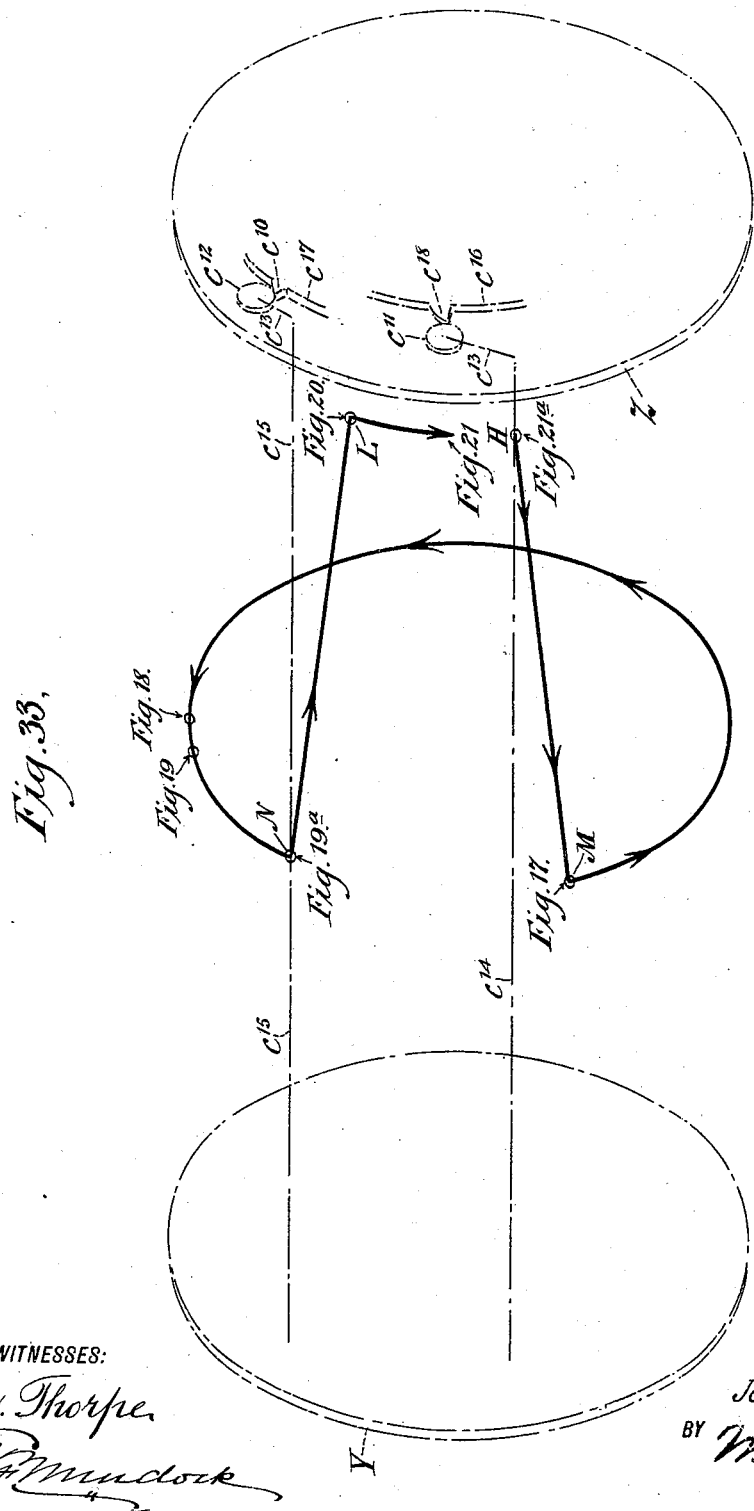

UNITED STATES PATENT OFFICE.

JOHN J. HUMMEL, OF SPOKANE, WASHINGTON.

TYPE-SETTING MACHINE.

980,957.   Specification of Letters Patent.   Patented Jan. 10, 1911.

Application filed February 4, 1910. Serial No. 541,963.

*To all whom it may concern:*

Be it known that I, JOHN J. HUMMEL, a citizen of the United States, and a resident of Spokane, in the county of Spokane and State of Washington, have invented a new and Improved Type-Setting Machine, of which the following is a full, clear, and exact description.

Among the principal objects which the present invention has in view are: to provide a mechanism whereby a rapid substitution of fonts may be effected; to provide a machine of the character described embodying a multiplicity of fonts arranged to be extracted from by a compositor mechanism; to provide a plurality of fonts embodying a series of magazines disposed in successive similarity and font alined arrangement; to provide a series of compositor units adapted to operate on each and every of the fonts and magazines composing the same; to provide a line composing and delivering mechanism; and to provide manually operated controlling devices for the several above mentioned mechanisms.

One embodiment of the present invention is disclosed in the structure illustrated in the accompanying drawings, in which like characters of reference denote corresponding parts in all the views, and in which—

Figure 7:
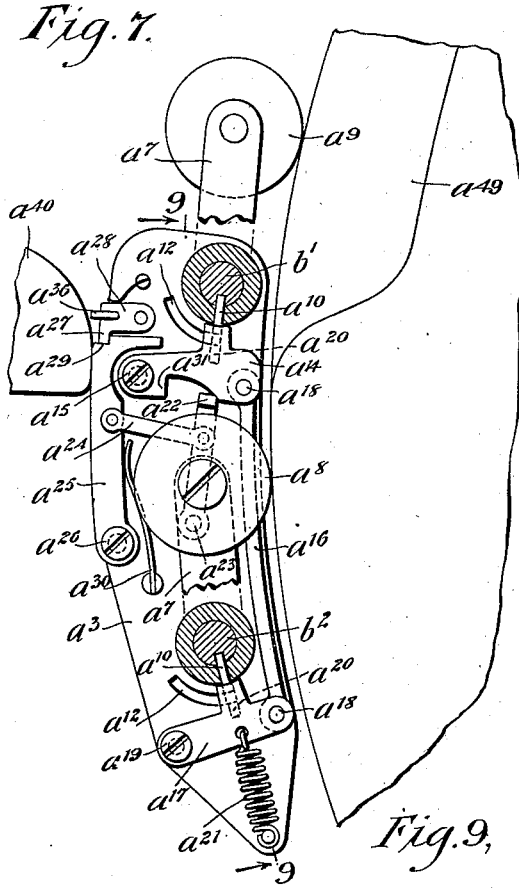
Figure 8:
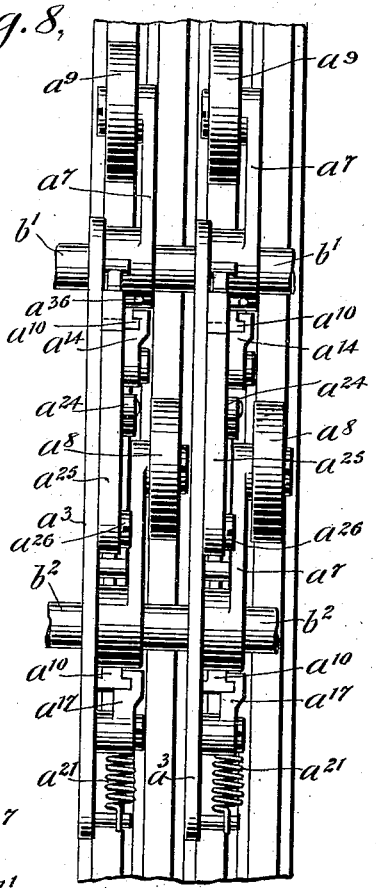
Figure 10:
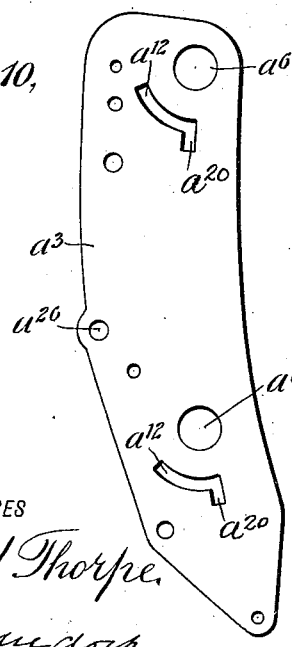
Figure 9:
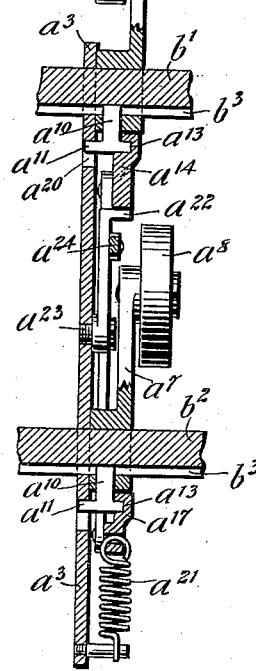
Figure 11:
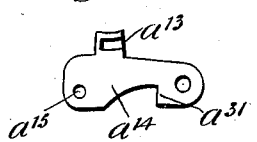
Figure 12:
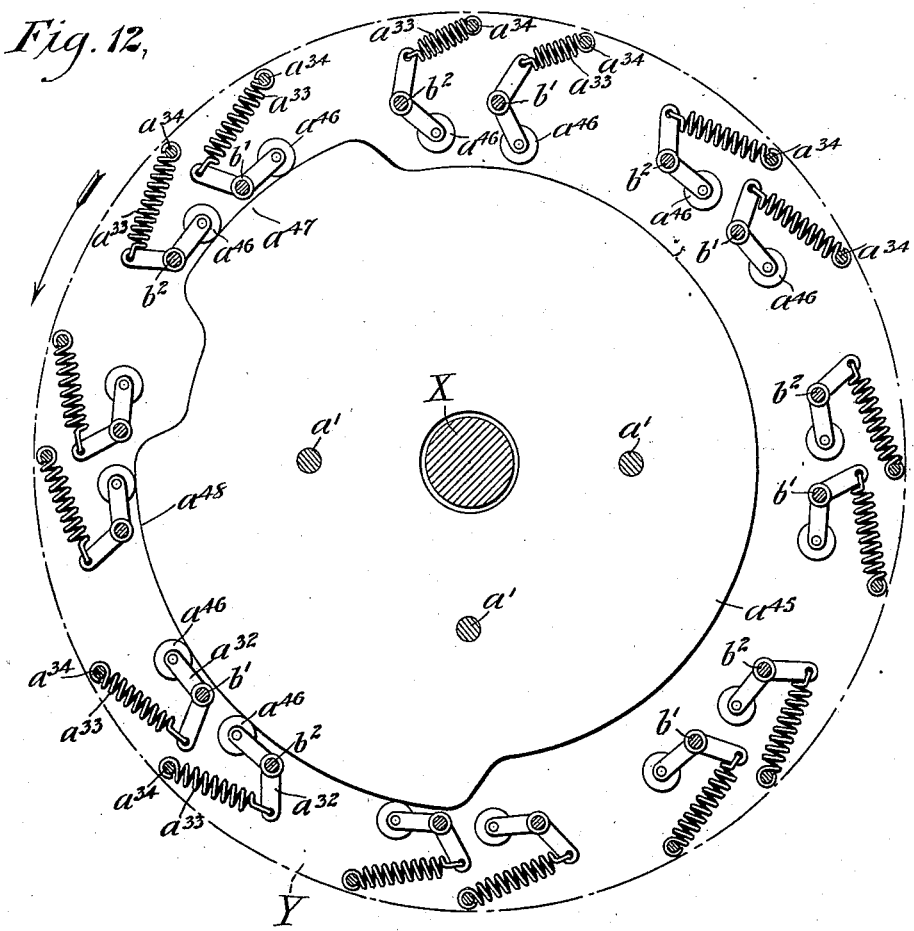
Figure 13:
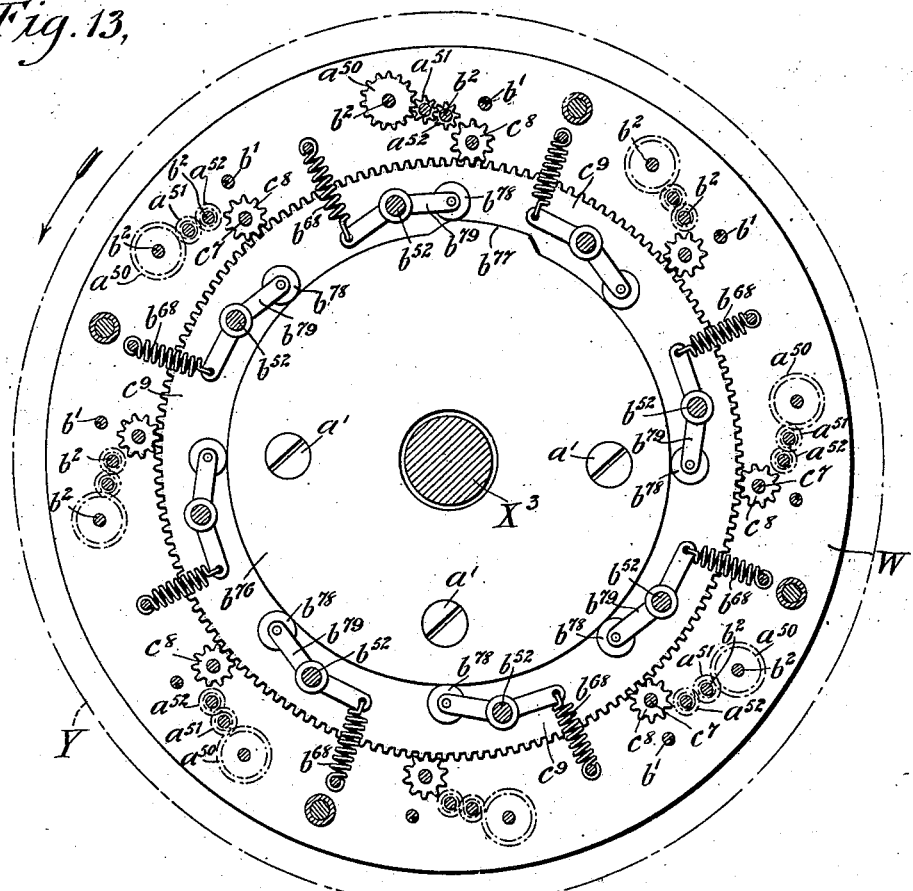
Figure 14:
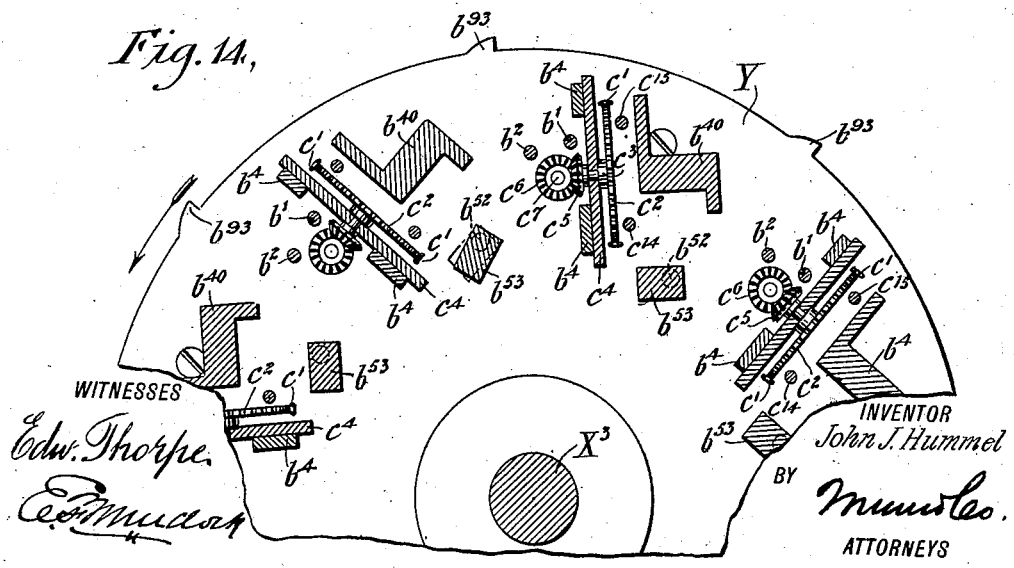
Figure 18:
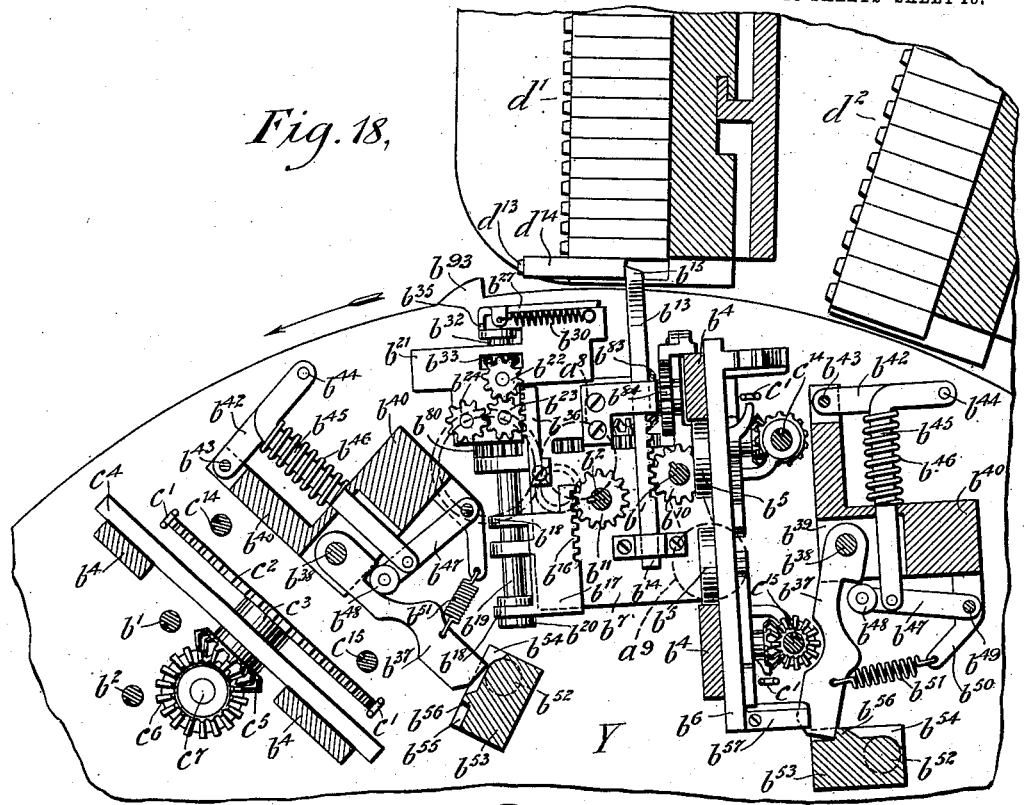
Figure 19:
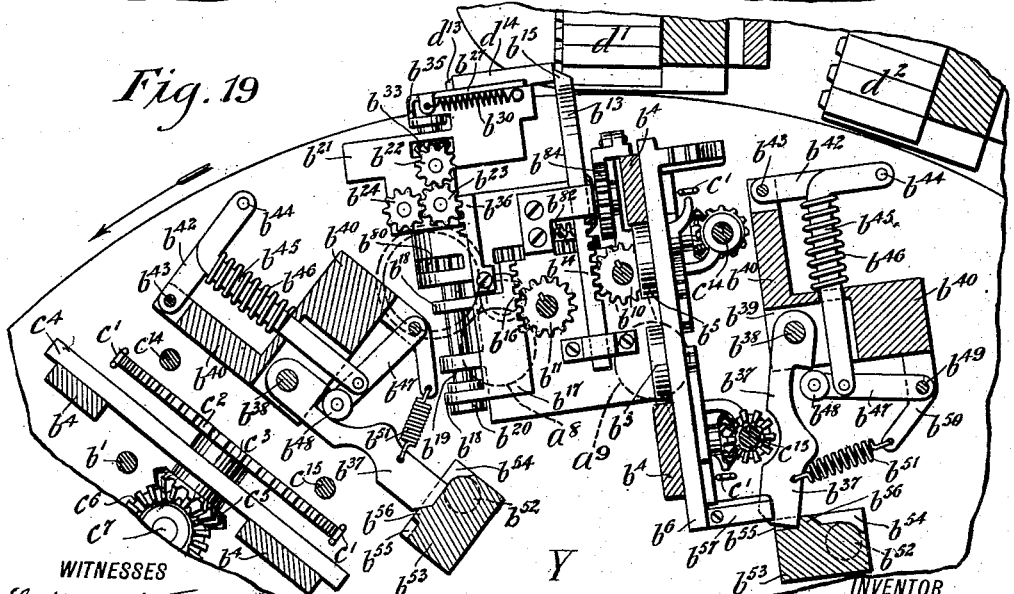
Figure 22:
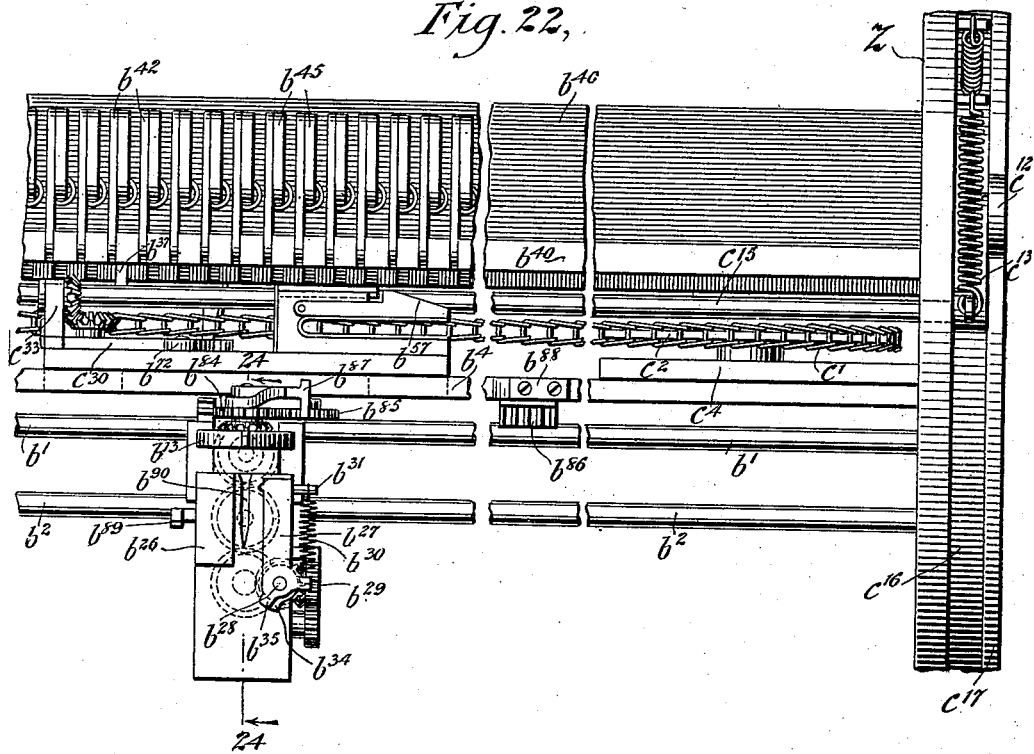
Figure 23:
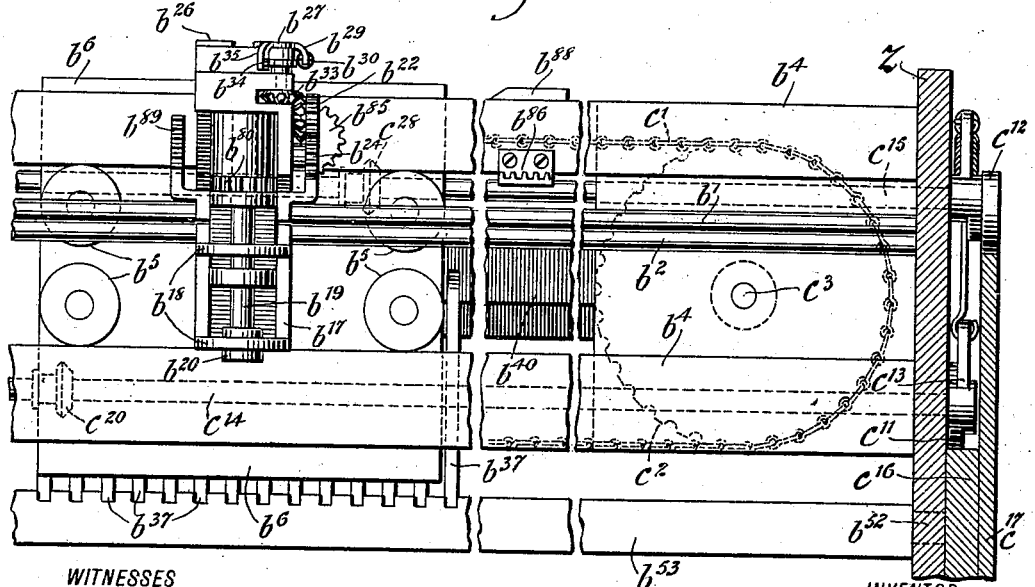
Figure 24:
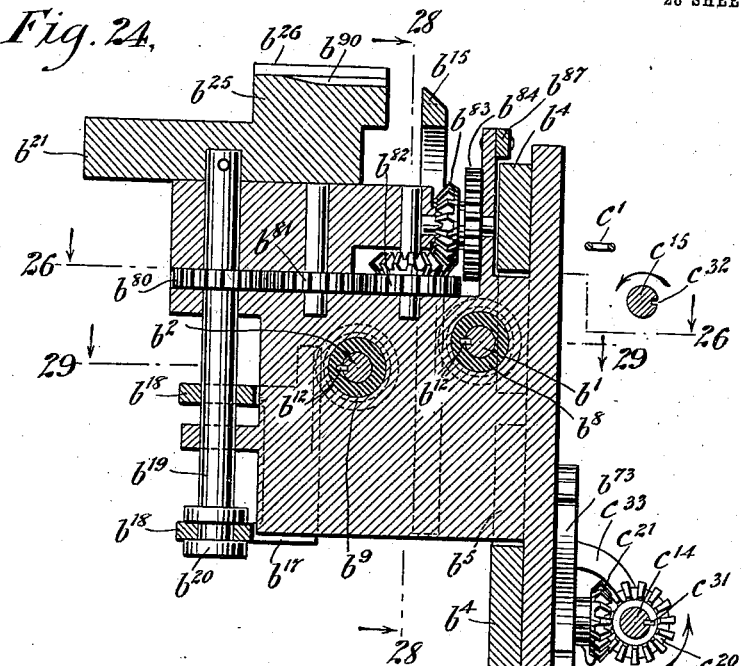
Figure 25:
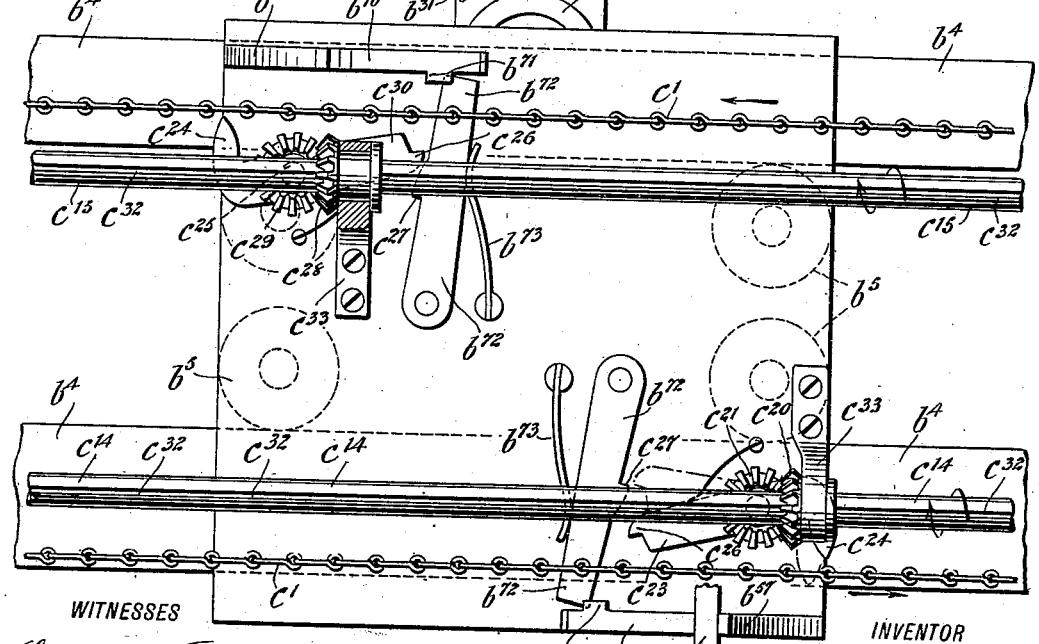
Figure 26:
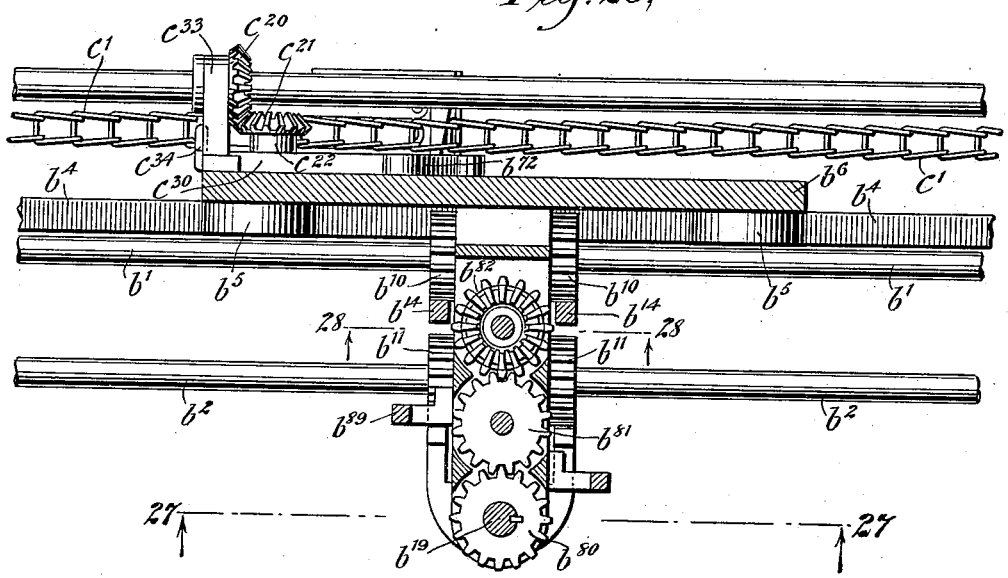
Figure 27:
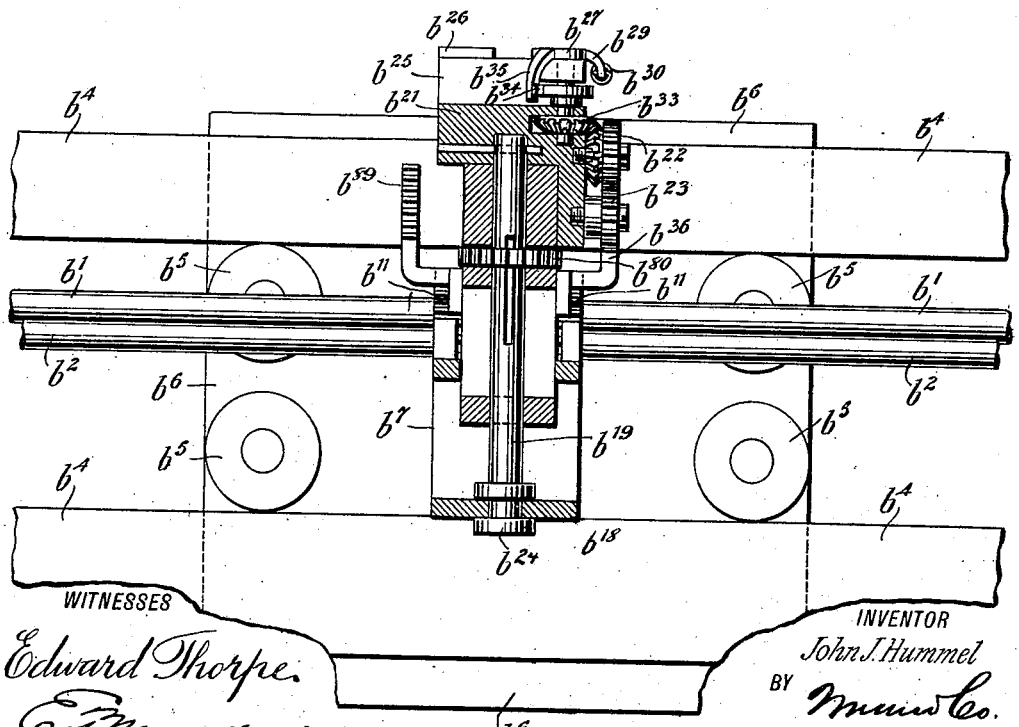

Figure 1 is a side elevation of a machine constructed in conformity with the present invention; Fig. 2 is a horizontal central section of the font selecting end of a machine constructed in conformity with the present invention, the section being taken on the line 2—2 in Figs. 1 and 15; Fig. 2ª is a fragmentary view in horizontal central section, showing the end of the machine opposite that illustrated in Fig. 2; Fig. 3 is a fragmentary view of the font selecting end of the machine in vertical longitudinal section, the section being taken on the line 3—3 in Figs. 1 and 15; Fig. 3ª is a fragmentary view of the end of the machine opposite that illustrated in Fig. 3, the section being taken on the same line; Fig. 4 is a detail view in vertical section of one pair of the stationary font selecting plates and a series of devices for rocking the shafts of the type carriers, the view being taken on the line 4—4 in Fig. 2; Fig. 5 is a similar view of an adjacent pair of the font selecting plates and a series of devices for rocking the shafts of the type carriers, the view being taken on the line 5—5 in Fig. 2; Fig. 6 is an enlarged view of a fragment of the parts illustrated in Fig. 4, showing in operative position a device for locking the shaft rocking devices; Fig. 7 is an enlarged view showing in detail the devices for rocking the operating shafts of the type carriers, the view illustrating the method of locking the operative elements of the said devices; Fig. 8 is an enlarged view of fragments of two pairs of the font selecting plates, illustrating the relative disposition of the devices for rocking the shafts of the type carriers; Fig. 9 is a longitudinal section of the devices for rocking the shafts of the type carriers, the view being taken on the line 9—9 in Fig. 7; Fig. 10 is a side view of the frame plate of the said devices for rocking the shafts of the type carriers; Fig. 11 is a side view in detail of one of the latch plates for operating the lock employed to place the devices for rocking the shafts of the type carriers in operative position; Fig. 12 is a vertical section showing a cam plate for operating the various devices for rocking the shafts of the type carriers, the view being taken on the line 12, 12 in Fig. 2; Fig. 13 is a vertical section showing one of the rotary disks supporting the operating shafts for the type carriers and rocking devices for the rocking mechanism connected therewith, the view being taken on the line 13, 13 in Fig. 2; Fig. 14 is a vertical section showing a rotary disk mounted in juxtaposition to the disk illustrated in Fig. 13, and showing in section thereon the disposition of the fixed rails for the type carriers and operative connections therefor, the view being taken on the line 14, 14 in Fig. 2; Fig. 15 is a fragmentary view illustrating in vertical section the arrangement of the various fonts about a centrally disposed rotary type extractor and carrying mechanism; Fig. 16 is an enlarged view in detail illustrating the method of arresting the type carriers with the type selecting key; Fig. 17 is a view showing the same in the inoperative position of the type selecting keys, the carrier being shown in locked position; Fig. 18 is a detail view, fragmentary in form, and in side elevation, illustrating the type carrier in operative relation with one of the type magazines and shown as extracting a type therefrom, the stationary rails and bars forming the track for the said carriers and operative elements therefor being shown in section; Fig. 19 is a similar view illustrated in an advanced position, wherein the type is on the point of complete delivery from the magazines and being received by the type holders; Fig. 19ᵃ is a plan view of the type holder and parts connected therewith, showing the type as being delivered thereto and as illustrated in Fig. 19; Fig. 19ᵇ is a view similar to Fig. 19 illustrating the next step in the travel of the carrier wherein the type is held therein, and wherein the conveying mechanism has been locked in operative position therewith; Fig. 20 is a similar view illustrating the next step of the carrier, having reversed the type holder and approaching the compositor's stick; Fig. 20ᵃ is a detail view in plan of the type carrier and parts connected therewith as shown in Fig. 20, in released position at the delivery station; Fig. 21 is a view similar to Fig. 20 illustrating the next step in the delivery of the type from the type holder to the compositor's stick; Fig. 21ᵃ is a similar view illustrating the succeeding step wherein the type having been delivered the carrier is locked to the conveyer for its return flight; Fig. 21ᵇ is a similar view showing the arrested position of the carrier at the far end of the rails where it is stopped when having passed the type selecting keys; Fig. 21ᶜ is a similar view illustrating the position in which the carrier shown in Fig. 21ᵇ is relocked to the conveyer for the return flight to the type composing end of the machine; Fig. 22 is a fragmentary view in plan of a type carrier and rails therefor, together with the conveyer and means for locking the carrier to the said conveyer, also showing the operating rack for elevating the type holder at the moment of delivery; Fig. 23 is a side elevation of the structure illustrated in Fig. 22; Fig. 24 is a detail view in vertical cross section of the type carrier, the section being taken on the line 24—24 in Fig. 22; Fig. 25 is a side elevation showing the back of the type carrier, the rails and conveyers therefor, and locking devices for engaging the said conveyers; Fig. 26 is a detail view in longitudinal cross section of the carrier, the section being taken on the line 26—26 in Fig. 24; Fig. 27 is a detail view of the carrier rails and operating shafts therefor in vertical longitudinal section, the section being taken on the line 27—27 in Fig. 26; Fig. 28 is a detail view of the carrier, one of the operating shafts and carrying rails therefor in vertical section, the section being taken on the line 28—28 in Fig. 26; Fig. 29 is a longitudinal cross section of the carrier taken on the line 29—29 in Fig. 24; Fig. 29ᵃ is a detail view in plan of the latch for releasing the carrier from the conveyer and showing in section the arresting devices of the type selecting mechanism; Fig. 29ᵇ is an enlarged detail view in vertical section taken on the line 29ᵇ—29ᵇ in Fig. 29ᵃ; Fig. 29ᶜ is a vertical section taken on the line 29ᶜ—29ᶜ in Fig. 29ᵃ; Fig. 30 is a fragmentary view in side elevation of the rotary and stationary plates forming the outer end of the rotary frame for the carriers and the shaft rocking devices connected therewith; Fig. 31 is a vertical section of one of the magazines for holding type constructed and arranged in accordance with the present invention; Fig. 31ᵃ is a cross section of a font showing a view of the magazines and the operative mechanism connected therewith, the section being taken on the line 31ᵃ—31ᵃ in Fig. 31; Fig. 32 is a diagrammatic view illustrating the operative flight of the carriers when not arrested to extract type from the various magazines; and Fig. 33 is a diagrammatic view illustrating the operative flight of a carrier when arrested to extract a type from one of the various magazines.

In the following specification the word "font" is used to designate the mechanical equivalent herein employed for the usual type case. By thus using the word font I have endeavored to convey the idea that the type, as well as the casing holding the same, are, by the manipulation of the machine, selected.

For convenience of description it is deemed advisable to set forth the structural and operative features of the various groups into which the different instrumentalities naturally arrange themselves. That these groups may be readily distinguished I have assigned to each group, and to the various instrumentalities forming the same, a distinguishing letter, while there has been assigned to the various instrumentalities a distinguishing numeral used in conjunction with the distinguishing letter of the group.

To that group of instrumentalities herein designated as the font selecting mechanism, by the construction and arrangement of which the various fonts may be selected from which the type are extracted and composed, is assigned the group letter $a$. To that group of instrumentalities herein designated as the type carriers, constructed and arranged to facilitate the extraction of the separate type from the various magazines of the various fonts, and to convey to and successively deposit the same in galley line form, is assigned the group letter $b$. To that group of instrumentalities herein designated as the conveyers, which coact to place the said carriers in selective position to the various type magazines, is assigned the group letter $c$. To that group of instrumentalities herein designated the font battery, the separate elements of which co-act to hold in separate column form and advance successively the various type, is assigned the group letter $d$. To that group of instrumentalities herein designated as the line setting mechanism is assigned the group letter $d$.

In its operation, the present machine performs in serial order the following functions, and in the order named. The first operation consists in selecting the particular font of the font battery from which the type are to be extracted and successively composed. The second operation is to extract from the various magazines of the selected font the various letters as and in the order used. The third operation is to convey the separate and individual type to a certain location to be there formed in their successive or composition order. The fourth operation is to compose the type as delivered into the form of a printer's stick or galley line, which, when formed, is shifted to accommodate the succeeding line. These various groups are structurally connected and supported by a frame, the sides X, X of which may be arranged in any convenient shape. Extended from the front of the said frame is a table $X^1$, upon which is supported the keyboards employed in operating the present machine. Formed in the sides X of the frame are bearings $X^2$. The bearings $X^2$ are provided to receive a shaft $X^3$, at the one end of which is provided a driving pulley, $X^4$. The shaft $X^3$ has fixedly mounted thereon disks Y, Z and W. These elements are common to each of the groups mentioned, and are therefore assigned separate distinguishing characters.

Secured by means of bolts $a^1$, $a^1$, rigidly to the sides X of the frame, are a number of plates $a^2$, $a^2$. These plates are perforated to pass the shaft $X^3$ and are mounted on the frame concentrically therewith. The plates $a^2$ are reduced at their outer sections and are there separated, as shown in Fig. 2 of the drawings, and are disposed to each side of the plates $a^3$. Each plate $a^3$ is provided with peripheral recesses $a^4$, $a^4$ and $a^{19}$. In each plate, however, the distance between the said recesses differs, the arrangement depending upon and controlling the operation of the machine with relation to a certain font of the font battery. The plates $a^2$ are further arranged in pairs, each pair being disposed in such manner that the recesses $a^4$, $a^4$, in one of said plates are advanced in relation to the recesses in the other. This arrangement is made with regard to the operation of the type carriers, both in extracting and delivering the type contained therein. Each plate is cut away to form central hub extensions $a^5$, $a^5$, shown particularly in Figs. 4, 5 and 6.

The disks W, Y and Z are connected by means of the framing rods V, V. Rotatively mounted in the disks, and having suitable bearings therein, are small rocking shafts $b^1$, $b^2$. Rotatively mounted upon the shafts $b^1$, $b^2$ are the plates $a^3$, $a^3$, the shafts passing through perforations $a^6$, $a^6$ formed therein. Rotatively mounted upon the said shafts $b^1$, $b^2$ are lever arms $a^7$, $a^7$. At the outer and free end of the arms $a^7$, $a^7$ are mounted wheels $a^8$, $a^9$. The wheels $a^8$ $a^9$ track when the peripheries of the adjacent plates $a^2$, $a^2$ and wheels mounted on each of the plates $a^3$, $a^3$ are disposed to track on the peripheries of the plates $a^2$, $a^2$ which constitute the various pairs. Normally the wheels $a^8$, $a^9$, and the arms $a^7$, $a^7$ connected therewith, rock loosely upon the shafts $b^1$, $b^2$. When, however, they are locked to the said shafts, the shafts are rotated when and as the wheels $a^8$ or $a^9$ pass from the outer extended edge of the peripheries of the plates $a^2$, $a^2$ into the recesses $a^4$, $a^4$ provided therein. The locking is accomplished by means of pins $a^{10}$, $a^{10}$. The pins $a^{10}$, $a^{10}$ are adapted to extend within channels $b^3$, $b^3$ formed in the shafts $b^1$, $b^2$, and have extended T-shaped heads $a^{11}$, $a^{11}$, one arm of the extension thereof passing through slots $a^{12}$, $a^{12}$ in the plate $a^3$, and the other resting within grooves $a^{13}$, $a^{13}$ in a latch $a^{14}$. The latch $a^{14}$ is pivotally mounted at $a^{15}$ upon the plate $a^3$, and is connected by means of a link $a^{16}$ with a second latch $a^{17}$, which is provided with a groove $a^{13}$ similar in all respects to that illustrated in Fig. 11 of the drawings. The link $a^{16}$ is pivotally connected at $a^{18}$, $a^{18}$ with the two latches. The latch $a^{17}$ is pivoted at $a^{19}$ on the plate $a^3$.

The slot $a^{12}$ is formed concentrically with the shafts $b^1$, $b^2$ to permit the rocking of the arms $a^7$, $a^7$. At one end of the said slots they are provided with extensions $a^{20}$, $a^{20}$, into which the pins $a^{10}$, $a^{10}$ are retracted when withdrawn from engagement with the channel $b^3$ in the shafts $b^1$, $b^2$. The said pins are withdrawn into the extensions $a^{20}$, $a^{20}$ by the latches $a^{14}$ and $a^{17}$. The latches $a^{14}$ and $a^{17}$ are actuated by means of a coiled spring $a^{21}$. When not restrained, the coiled spring $a^{21}$ operates to retract the latches $a^{14}$ and $a^{17}$ and thereby withdraw the pins $a^{10}$, $a^{10}$ from engagement with the shafts $b^1$, $b^2$. They are prevented from thus acting by a pivot arm $a^{22}$, which is pivoted at $a^{23}$ upon the plate $a^3$. The arm $a^{22}$ is connected by a link $a^{24}$ to a latch $a^{25}$. The latch $a^{25}$ is pivoted at $a^{26}$ to the plate $a^3$. The forward or free end of the latch $a^{25}$ is elongated to form a wiping face for a finger $a^{27}$ of the spring seated dog $a^{28}$. A shoulder $a^{29}$ is also formed in the end of the latch $a^{25}$ to receive the finger $a^{27}$ of the said dog. When not otherwise controlled the latch $a^{25}$ is raised by a leaf spring $a^{30}$ to a position wherein the finger $a^{27}$ is supported on the surface of the elongated end. In this position the end of the arm $a^{22}$ rests against a shoulder $a^{31}$ formed on the side of the latch $a^{14}$ and arrests the outward extension of the latch $a^{25}$. The latch $a^{14}$ is cut away to form the shoulder $a^{31}$, and also to permit the latch $a^{14}$ to be retracted by the spring $a^{21}$, the arm $a^{22}$ permitting such retraction by passing into the recess formed in the side of the latch $a^{14}$. As above stated, when the latches $a^{14}$ and $a^{17}$ are thus retracted, the pins $a^{10}$, $a^{10}$ are withdrawn from engagement with the shafts $b^1$, $b^2$. In this position the arms $a^7$, $a^7$, and the wheels $a^8$, $a^9$ carried thereby, are free to move into and out of the recesses $a^4$, $a^4$ of their respective plates $a^2$. To this action, however, the arms are not impelled except as they are locked to the shafts $b^1$, $b^2$. At the end of the shafts $b^1$, $b^2$ are fixedly secured double extension levers $a^{32}$, $a^{32}$. To the outer end of the levers $a^{32}$ are secured the ends of coiled springs $a^{33}$ $a^{33}$. The springs $a^{33}$ $a^{33}$ are anchored at $a^{34}$, $a^{34}$ on the disk Y. The tension of the springs $a^{33}$ is such as to rock the shafts $b^1$, $b^2$ in such manner as to introduce the wheels $a^8$, $a^9$ into the recesses $a^4$, $a^4$ when the arms $a^7$, $a^7$ are locked to the said shafts.

In the operation of the machine it will be understood that the arms $a^7$, $a^7$ of each plate $a^3$ in line with one font selecting key on the keyboard A are at all times locked to the shafts $b^1$, $b^2$. The locking of the one set prevents the rocking of the shafts, except as permitted by the recesses $a^4$, $a^4$ belonging to the particular plates $a^3$, $a^3$ over the edge of which the particular set of wheels $a^8$, $a^9$ is at that time tracking. While the said shafts are being actuated by the one set of wheels $a^8$, $a^9$, it will be understood that the other wheels $a^8$, $a^9$, and the arms $a^7$, $a^7$ connected therewith, are free to rock on the said shafts $b^1$, $b^2$ without affecting the same or being affected thereby. Each pair of the arms $a^7$, $a^7$ is disengaged from each pair of shafts $b^1$, $b^2$, as each shaft approaches the keyboard A. The said shafts are reëngaged if the font selecting key is set in line therewith. The arms $a^7$ are disengaged by placing a trip $a^{35}$ in the path of triggers $a^{36}$, $a^{36}$ extended from the top of dogs $a^{28}$, $a^{28}$. When the trip $a^{35}$ is placed in position, as illustrated in Fig. 4, the successive dogs $a^{28}$ are thrown out of engagement with the latch $a^{25}$, permitting the spring $a^{30}$ to raise the same to remove the arm $a^{22}$ from the path of the latch $a^{14}$, and permitting the spring $a^{21}$ to retract the latches $a^{14}$ and $a^{17}$. This retraction, as stated, withdraws the pins $a^{10}$, $a^{10}$ and releases the shafts $b^1$, $b^2$ from that particular set of rotating devices. As stated, however, prior to this release of the rotating devices from the said shafts, a succeeding set of devices has been placed in position to engage the said shafts. In this manner the shafts $b^1$, $b^2$ are constantly held in locked position with one or the other of the various sets of shaft rotating devices.

In the present drawings there is illustrated a construction wherein are employed ten different fonts. Each series of the devices for rotating the shafts $b^1$, $b^2$ corresponds with one of the said fonts. Each device of the said series employs two wheels $a^8$, $a^9$, and each wheel tracks upon a distinct and separate plate $a^2$. The two plates upon which the wheels are tracking are arranged in pairs to cause time relation in the action of the wheels $a^8$, $a^9$ and the arms $a^7$, $a^7$ and shafts $b^1$, $b^2$ connected therewith. Thus, in a machine there should be as many of the devices for rotating the shafts $b^1$, $b^2$ as there are fonts for holding type. There would be two track plates $a^2$ for each of the said series. Each pair of the shafts $b^1$, $b^2$ operates a carrier for the type. Each carrier is provided with means for extracting type from the various fonts, and with a holding mechanism for retaining the type after extraction therefrom. These extracting and holding mechanisms are actuated by the rocking of the shafts $b^1$, $b^2$. The extracting mechanism, as will be hereinafter set forth, operates slightly in advance of the holding mechanism, and therefore the recess $a^4$ disposed in line with the wheel $a^9$ receives the said wheel $a^9$ slightly in advance of the recess $a^4$ in the path of the wheel $a^8$, permitting the lowering of the said wheel $a^8$. With the drop of the wheels $a^8$, $a^9$ into the recesses $a^4$, $a^4$, the shafts with which they are connected are rotated, with the effect upon the carrying mechanism, as will be hereinafter described, that the extracting devices in the one instance are inserted in the path of the columns of type in the different fonts, and the type holders are raised from the carriers to receive the said type as extracted.

From what has been said it will be seen that the disposition of the recesses $a^4$, $a^4$ of the various pairs of plates $a^2$, $a^2$ regulates the time of action of the type carriers with reference to the fonts. For instance, if the shaft dropping devices be used which are actuated by the pair of plates $a^2$ having the recesses $a^4$, $a^4$ in line with the font disposed third from the top of the font battery, then the carriers will be actuated to extract a type from that font as they in succession pass the delivery end of the battery of fonts. This for the reason that at that time in the rotation of the series of shafts $b^1$, $b^2$, the said shafts are rotated, and thereby actuate the carriers. It is by this means that the particular font from which it is desired to draw the type for the composition is selected.

The shaft $b^2$ is divided into two sections, one extending between the disks W and Y and the other extending between the disks Y and Z. Between the disks W and Y, as shown, are contained the shaft rocking devices of the font selecting mechanism. Between the disks Y and Z are operated the type carriers. The purpose in separating the sections of the shaft $b^2$ is that the speed in the rotation of the section connected with the portion $b^{21}$ may be increased. To accomplish this the section of the shaft $b^2$ connected with the arm $a^7$ and wheel $a^9$ is provided at the end with a gear wheel $a^{50}$. The gear wheel $a^{50}$ is meshed with one of two smaller gears $a^{51}$, $a^{52}$, the latter of which is fixedly mounted on the section of the shaft $b^2$ extended between the disks Y and Z. The depth of the recess $a^4$ into which the wheel $a^8$ drops is made shallower than the depth of the recess into which the wheel $a^9$ drops. The result of this construction is that the wheel $a^8$ drops through a smaller arc, consuming less time, and effecting, through the chain of gears $a^{51}$ and $a^{52}$, a larger arc of rotation in the section of the shaft $b^2$ which passes through the type carriers. The larger arc of movement of the last mentioned section of the shaft $b^2$ is, however, timed for the same period as the smaller arc in the first mentioned section. This construction and arrangement results in a rapid extension of the type receiving and carrying mechanism with which the shaft $b^2$ is operatively connected, and as will be hereinafter more fully set forth, when and as the various carriers are alined with or pass in front of the font selected as that from which the type are to be extracted.

The means for selecting the particular series of shafts $b^1$, $b^2$ which corresponds to the font desired, is a keyboard A and the key bars $a^{37}$ connected therewith. The key bars $a^{37}$ equal in number the fonts of types employed, or for which provision is made in this machine. These bars are pivoted on a shaft $a^{38}$, and are provided in the free end with gear teeth $a^{39}$. The teeth $a^{39}$ are meshed with the gear segments formed on pivotal cams $a^{40}$. There is such a cam for each of the key bars $a^{37}$. The cams $a^{40}$ are pivoted on a shaft $a^{41}$, which is extended between standards $a^{42}$, $a^{42}$ mounted on the table $X^1$. With the depression of the padded ends of the key bars $a^{37}$ of the key board A, the free ends of the said bars are raised, causing, by means of the gear toothed engagement with the cams $a^{40}$, the extension of the same into the path of the latches $a^{25}$. With the passage of the various devices, when the cam $a^{40}$ is extended, the said latches are depressed against the tension of the springs $a^{30}$. The arms $a^{22}$, by means of the links $a^{24}$, are forced downward over the curved surfaces of the back of the latch $a^{14}$. This forces the latch $a^{14}$ forward, carrying the pin $a^{10}$ and seating the same within the channel $b^3$ of the shaft $b^1$, $b^2$. When the cam $a^{40}$ is thus extended, a lock plate $a^{43}$ falls upon a shoulder $a^{44}$ of the said cam, locking it rigidly in its extended position. This plate is extended across the entire keyboard. It is thus held until the operator desires to change the font. In this position each of the various succeeding devices for rocking the shafts $b^1$, $b^2$ are locked until all of that series is operating the various shafts $b^1$, $b^2$ as each of the series passes over the particular recess $a^4$, $a^4$ formed in the plates $a^2$, $a^2$ belonging to that particular series. When the operator desires to change his font it is only necessary for him to depress another of the key bars $a^{37}$ representing the font desired. In this action, the key bar being depressed rotates the cam $a^{40}$ with which it is gear toothed engaged. The cam $a^{40}$, coming into operation, rotates upward and impinges upon the under side of the lock plate $a^{43}$ and raises the same. In so raising the plate $a^{43}$, that particular key bar which was formerly depressed is now allowed to resume its original position, retracting the cam $a^{40}$ connected therewith, while the second and succeeding key bar forces outward the second cam $a^{40}$. This, it will be seen, effects a complete change in the operation of the shaft $b^1$, $b^2$, and carriers connected therewith, with regard to the individual one of the various fonts constituting the font battery. Thus, it will be seen that a compositor, operating a machine constructed and arranged in accordance with this invention, could compose his matter in any desired type, and quickly shift to any of the various fonts representing the Roman, Italic, Gothic or Kenilworth type. Further, he could change the size of the type, or in any other way within the possibility of the font battery, arrange his composition either by introducing a word or phrase, and quickly resume the form or body type of his composition by depressing the original key. The enormous saving in time and labor which results from the employment of this device will be recognized.

It will be understood that as each of the devices passes the trips $a^{35}$ the triggers $a^{36}$ are released, and the springs $a^{21}$ are allowed to retract the pins $a^{10}$ to release the shafts $b^1$, $b^2$. The shafts $b^1$, $b^2$ are held at this point from rotating by a cam plate $a^{45}$, the wheels $a^{46}$, $a^{46}$ tracking on the high cam surfaces $a^{47}$ and $a^{48}$ of said cam plates $a^{45}$, during the interval between the unlocking of the said shafts by the release of the triggers $a^{36}$, and the resetting of the latches $a^{25}$ by the cams $a^{40}$. It is during the interval after the carrier controlling the shafts has passed the trip $a^{35}$ that the shafts $b^1$, $b^2$ are prevented from rotation by the cam surfaces $a^{47}$ and $a^{48}$ except while passing over the intervening space between said cam surfaces. It is while passing over this space that, in the operation of the machine as hereinafter set forth, the shafts are rotated to deliver the type to the line forming mechanism. By providing the plates $a^{45}$ and the set of rollers $a^{46}$, $a^{46}$ for each of the various shafts $b^1$, $b^2$, a construction is permitted wherein the plates $a^2$ may be finished on one side only, or left unfinished, if desired. The plate $a^{45}$ secures uniformity in action for the various type carriers as far as the operation of delivering the type is concerned.

It has been shown in the above description and reference to the accompanying drawings, how the fonts from which the type are to be extracted, are selected. It now remains to describe how the type are extracted from the said fonts and carried and delivered to the line setting mechanism.

The construction of the type carriers, and their arrangement in the machine, is illustrated in the drawings from Figs. 15 to 28 inclusive. There are eight carriers, corresponding in number to the eight shaft rocking devices above described. The number of carriers have no relation to the number of type fonts employed. The carriers are carried on guide rails extended between the disks Y and Z, and rigidly secured thereto. The guide rails $b^4$, $b^4$ are disposed, as shown in the drawings, to form tracks for wheels $b^5$, $b^5$, which are mounted upon a back plate $b^6$. The wheels $b^5$, $b^5$ are four in number, as seen more particularly in Figs. 26 and 27. About midway of the plate $b^6$ is extended the body portion $b^7$ of the carriers. The body portion $b^7$ is perforated to form bearings for the hubs $b^8$, $b^9$ of gear wheels $b^{10}$, $b^{11}$. The hubs are rotatably mounted in the bearings formed in the body $b^7$, and are provided with perforations whereby they are slidably mounted on the shafts $b^1$, $b^2$. The said shafts are prevented from rotating in the said hubs by feathers $b^{12}$, $b^{12}$, which extend into and slidably engage the channel $b^3$ formed in the said shafts. The wheels $b^{10}$, $b^{11}$, and the hubs thereof, are carried by the body portion $b^7$, and in the various positions of the carriers the same are prevented from tilting or otherwise being carried out of alinement by the shafts $b^1$, $b^2$. Also, by means of this connection it will be seen that as the said shafts $b^1$, $b^2$ are rocked by reason of the wheels $a^8$ and $a^9$ passing into the recesses $a^4$, $a^4$ of the font selecting mechanism, the wheels $b^{10}$ and $b^{11}$ are rotated in unison with the rocking of the said shafts.

In toothed engagement with the wheel $b^{10}$ is an ejector $b^{13}$. The ejector $b^{13}$ is formed in the shape of a yoke, as shown in Figs. 25 and 28. The perpendicular extensions of the legs of the ejector are formed as toothed racks $b^{14}$, $b^{14}$, as seen in Figs. 18 and 21 of the drawings. There are two wheels $b^{10}$ on opposite sides of the body portion $b^7$, and both are engaged with the rack teeth of the legs of the ejector $b^{13}$. At the crown of the reach of the yoke is extended a finger $b^{15}$, which is adapted to pass within the slots formed in the lower end of the various type holding magazines when the said ejectors are elevated.

Normally the ejectors $b^{13}$ are retracted to a position where they do not extend into the path of the type holding magazines. They are so extended, as to raise the finger $b^{15}$ into the slot formed in the lower end of the said magazines, when the wheels $b^{10}$ are rotated by the rocking of the shaft $b^1$ with which they are engaged.

In Fig. 18 of the drawings is illustrated the elevated position of the ejector $b^{13}$. It may be noticed that the feather and channel therefor in the shaft $b^1$ are shown in Fig. 18 as raised from the horizontal position in conformity with the rocking action of the shaft $b^1$. Mention of this is here made to show in this manner the fact that the shaft $b^1$ has been rocked. When the wheel $a^9$, which is connected to the shaft $b^1$, rises out of the recess $a^4$, the shaft $b^1$ will be rotated back to a position in which the said feather assumes a horizontal position, and the wheel $b^{10}$ is then rotated in such manner that the ejector $b^{13}$ is retracted to the lowered or normal position.

In the operation of the machine the various shafts $b^1$ are each rocked at one point in the rotary path of the disks W, Y and Z, and the shafts connected therewith, in accordance with the location of the recess $a^4$ in the assembled plates $a^2$, $a^2$ over which the particular series of wheels $a^9$ connected with the shafts $b^1$ is traveling. The length of the recesses $a^4$, $a^4$ formed in the periphery of the plates $a^2$ on which the wheels $a^9$ are arranged to travel, is formed so that the shaft $b^1$ will be rocked at the period in the rotation of the carriers just prior to the said carriers passing under the particular font and magazines thereof from which it is desired to extract the type for composition. Also, the length of the recesses is sufficient to maintain the ejectors extended until the carriers have passed the magazine, and the type therefrom has been deposited in the type holder mounted on the carrier.

The type holder is elevated from the body portion $b^7$, upon which it normally rests, by means of the wheels $b^{11}$ fixed on the shafts $b^2$, the teeth of which wheels are engaged with rack teeth $b^{16}$ formed in plates $b^{17}$, which are slidably mounted upon the body $b^7$. The plates $b^{17}$ are provided with extensions $b^{18}$, $b^{18}$, which are perforated to have threaded therethrough a shaft $b^{19}$. The shaft $b^{19}$ is provided at the lower end with collars $b^{20}$, separated to receive the extensions $b^{18}$ between the said collars, whereby the said extensions are engaged with the said shaft to compel the same to rise and fall in unison with the rise and fall of the plates $b^{17}$. At the upper end of the shaft $b^{19}$ is secured the body portion $b^{21}$ of the type holder, which is provided to form bearings for a chain of wheels $b^{22}$, $b^{23}$, $b^{24}$. At the end of the body portion $b^{21}$, adjacent to the ejector $b^{13}$, the said body portion is extended to form a head $b^{25}$ whereon is received and held the type.

The holding devices for the type comprise a fixed extension $b^{26}$ and a pivot arm $b^{27}$. (See Fig. 22 of the drawings.) The arm $b^{27}$ is provided, near a pivot $b^{28}$, with an ear $b^{29}$, to which is connected a spiral spring $b^{30}$. The spring $b^{30}$ is anchored on a pin $b^{31}$ set out from the side of the head $b^{25}$. The springs $b^{30}$ are set to a tension whereby the arm $b^{27}$ is moved toward the extension $b^{26}$ with sufficient force to grasp and hold the type between the said arm and the said extension firmly, but lightly.

Mounted in the body portion $b^{21}$, and below the pivot $b^{28}$, and concentrically therewith, is a shaft $b^{32}$, at the lower end of which is fixedly mounted a miter gear $b^{33}$, and at the upper end of which is provided an extension $b^{34}$, into the path of which extends a depended ear $b^{35}$ formed on the arm $b^{27}$. The miter gear $b^{33}$ is meshed with the wheel $b^{22}$, which is in turn meshed with the wheel $b^{23}$. The wheel $b^{23}$ is in toothed engagement with a rack $b^{36}$ mounted on the side of the body portion $b^{7}$ of the carrier.

As thus constructed the operation of the holder is as follows: When the shaft $b^2$ is rotated, by reason of the wheel $a^8$ passing into the recess $a^4$ provided therefor, (which it will be observed by reference to the drawings, quickly succeeds the rotation of the shaft $b^1$), the wheel $b^{11}$ is rotated, thereby raising the plates $b^{17}$, and by reason of the connection through the extension $b^{18}$ with the shaft $b^{19}$, the said shaft and the type holder connected therewith are elevated to the position shown in Fig. 19 of the drawings. In thus elevating the type holder, the wheel $b^{23}$ is caused to rotate by reason of its engagement with the rack $b^{36}$. The rotation of the wheel $b^{23}$ rotates the wheels $b^{22}$ and $b^{33}$, the latter wheel, in rotating, revolves the shaft $b^{32}$, causing the extension $b^{34}$ to impinge upon the ear $b^{35}$. In forcing inward the ear $b^{35}$, the arm $b^{27}$ is opened against the tension of the spring $b^{30}$. In this manner, when the head $b^{25}$ is elevated into the position where it receives the extracted type, the arm $b^{27}$ will be fully extended, offering no impediment to the type as introduced upon the head $b^{25}$ to rest beside the extension $b^{26}$. The type thus rests until the machine rotates to a point where the wheel $a^8$ passes out of the recess $a^4$. In this action the shaft $b^2$ is rotated in a direction the reverse of that just above described, retracting the shaft $b^{19}$ and the type holder connected therewith, and reversing the rotation of the wheels $b^{22}$, $b^{23}$ and $b^{24}$. This removes the extension $b^{34}$ from the path of the ear $b^{35}$ and permits the spring $b^{30}$ to move the arm $b^{27}$ lightly but firmly against the type interposed between the said arm and the extension $b^{26}$. In this manner the type is carried by the carriers until delivered to the line setting mechanism.

The various carriers, as will hereinafter be more fully explained, are each conveyed reciprocatively between the disks Y and Z, supported on the rails $b^4$, $b^4$ and upon the wheels $b^5$, $b^5$, mounted upon the plate $b^6$, and arranged to track on the said rails.

By the operation of the key bars $b^{58}$, $b^{58}$ the type selecting devices are arranged to arrest the carriers in their longitudinal flight from the disk Z toward the disk Y. By reason of the arrangement hereinafter described, a carrier, after delivering its type to the stick forming mechanism, is released. The releasing station, as will be seen, is alined with the key board referred to. The coincidence of the release of a carrier and the setting of a device to intercept its flight, and to stop the said carrier, results in the said carrier being arrested in line with the key which is operated. The alinement of the key with each of the magazines of the various fonts which bears the designated letter is hereinafter set forth. At present it is only necessary to call attention to the fact that the carrier is arrested in the path of the various magazines containing the letter selected. In the rotation of the disks Y and Z the arrested carrier is rotated past each of the said magazines referred to, in order that the finger $b^{15}$ may be projected to enter the opening in the lower end of the magazine containing the selected letter and belonging to the selected font, in accordance with the operation of the key bars $a^{37}$. To so arrest the carriers there is provided a series of latches $b^{37}$. The number of latches equals the number of letters or characters carried in each of the fonts. The latches $b^{37}$ are each independently pivoted upon a pivot rod $b^{38}$. The pivot rod $b^{38}$ is extended between the side walls of slots $b^{39}$ formed in a bar $b^{40}$. The bar $b^{40}$ is extended between the disks Y and Z and rigidly secured thereto in position relative to the rails $b^4$, $b^4$. The bar $b^{40}$ is provided with an extended flange $b^{41}$, the upper edge of which is nicked to form a series of slots wherein are pivoted links $b^{42}$. The links $b^{42}$ are pivoted on a rod $b^{43}$, and are pivotally connected at $b^{44}$ to a lateral extension of the plunger $b^{45}$. The plunger $b^{45}$ is provided with a spiral spring $b^{46}$, which is mounted to surround the shank of the said flange and to rest between the lateral extension thereof and the top of the bar $b^{40}$, through perforations in the top of which the said flanges pass. The said flanges are, at their lower end, pivotally secured to arms $b^{47}$. The arms $b^{47}$ are provided with rollers $b^{48}$ mounted at the free end thereof. The pivoted end of the arms $b^{47}$ are mounted at $b^{49}$ upon bracket extensions $b^{50}$. At the lower end of the bracket extensions $b^{50}$ are perforations to anchor spring $b^{51}$, which are threaded through perforations provided in the latches $b^{37}$, and operate to retract the same when permitted so to do.

Pivotally mounted on trunnion bearings $b^{52}$, below the series of latches $b^{37}$, and in operative relation thereto, are latch bars $b^{53}$. The latch bars $b^{53}$ are provided in the upper side with a series of nicks $b^{54}$ and $b^{55}$. The nicks $b^{54}$ and $b^{55}$ are alined in pairs, the former being arranged to hold the latches $b^{37}$ in the retracted position, and the latter arranged to hold the said latches in their advanced position. The two series are divided by a shoulder $b^{56}$, which forms a stop for the said latches and holds the same in the advanced position during the period when one of the said carriers is arrested to receive a type from one of the said magazines. In the advanced position of the latches $b^{37}$, as illustrated in Figs. 18 and 19, they are protruded into the path of latches $b^{57}$ set out from the back of the plate $b^6$ and at the lower edge thereof. Each carrier is thus provided, and when, in the operation of the machine, any particular latch $b^{37}$ is extended, the carrier moving upon the rails $b^4$, $b^4$ juxtaposed to the particular extended latch, will be thereby engaged and arrested. It is therefore obvious that the relation of the various latches $b^{37}$ being fixedly established with reference to certain magazines of the various fonts, the selection of the magazine or letter contained therein becomes mechanically a selection of the latch $b^{37}$ pertaining thereto. The key bars $b^{58}$ of the key board B are constructed and mounted in a manner very similar to that described with reference to the key bars $a^{37}$ of the key board A. The number of key bars equal the number of letters and characters in any of the fonts. That is, they are pivoted between the padded ends and the ends bearing the gear teeth $b^{59}$. The gear teeth $b^{59}$ are meshed with segments $b^{60}$ formed as a part of, and integral with, the cams $b^{61}$. The cams $b^{61}$ are actuated by the key bars $b^{58}$, to be extended, as shown in Fig. 16, when the padded ends of the said key bars are depressed, or retracted, as shown in Fig. 17, when the key bars are returned to their normal position.

Overlying the line of cams $b^{61}$ is a plate $b^{62}$, which is pivoted in standards $b^{64}$. The plate $b^{62}$ is held downward on the cams $b^{61}$ by means of a spring $b^{65}$, the said spring being anchored at $b^{66}$ on each or both of the said standards $b^{63}$. The cams $b^{61}$ are provided with a square shouldered recess $b^{67}$, similar in form and arrangement to the recess described with reference to the cams $a^{40}$.

When extended, as illustrated in Fig. 16 of the drawings, the cams $b^{61}$ are protruded into the path of the links $b^{42}$, or of the lateral extension of the plungers $b^{45}$ connected therewith. Being thus extended each cam is held by the plate $b^{62}$. In the extended position of the particularly selected cam $b^{61}$, the first of the series of links $b^{42}$ is depressed, thereby projecting the plunger $b^{45}$ against the compression of the spring $b^{46}$, and extending the roller bearing end of the arm $b^{47}$ in the manner illustrated in Fig. 16 of the drawings. The roller $b^{48}$ passes over the curved back of the latch $b^{37}$, causing the lower end of the said latch to override the shoulder $b^{56}$, leaving the nick $b^{54}$ on the bar $b^{53}$, and extending forward until resting above the nick $b^{55}$. The bar $b^{53}$ is maintained in the normal position illustrated in Figs. 18 and 19 by springs $b^{68}$, $b^{68}$. (See Fig. 13.) With the extension of the selected latch $b^{37}$ over the nick $b^{55}$, the spring $b^{68}$ operates to rotate the bar $b^{53}$ into that position wherein the shoulder $b^{56}$ passes behind the extended latch and locks the same in its extended position. When now the carriers are conveyed from the disk Y to the disk Z, the carrier mounted on the rails $b^4$, $b^4$, grouped with the particular bar $b^{53}$ and latch held thereby, is arrested by the latch $b^{57}$ impinging upon the projected latch $b^{37}$. The latch $b^{37}$ is held in the extended position shown in Fig. 29 by a leaf spring $b^{69}$. The latch head is retraced by the latch $b^{37}$ from the path thereof, exposing a slide $b^{70}$. The slide $b^{70}$ is mounted in the framing of the carrier, and is provided with a lateral extension $b^{71}$, which rests normally to the inside of the latch $b^{72}$. It is the latch $b^{72}$ which controls the engagement of the dogs with the conveyer chains, as will be hereinafter more fully set forth. The latch $b^{72}$ is actuated by a spring $b^{73}$, shown in Fig. 25 of the drawings. When the latch $b^{37}$ strikes upon and removes from its path the slide $b^{70}$, it is brought into contact with the fixed shoulder of the projection $b^{74}$. The shoulder of the projection $b^{74}$, and of the latch $b^{54}$, form a holding recess $b^{75}$ adapted to snugly fit and retain in locked engagement the said latch $b^{37}$. With the extension of the slide $b^{70}$ and the extension $b^{71}$ thereof, the latch $b^{72}$ is operated to release the carrier from the conveyer chains, as stated. The two shoulders constituting the recess $b^{75}$ at that moment hold in secure engagement the latch $b^{37}$, and the carrier is held stationary against movement in either direction. The carrier is thus held while the machine makes a complete revolution, passing the carrier in front of the various fonts and in the path of the particular magazine from which it is desired to extract a selected type.

A single plate $b^{76}$ is bolted to the plates $a^2$, $a^2$. The plate $b^{76}$ is provided with a single cam $b^{77}$, located substantially as illustrated in Fig. 13 of the drawings. The disposition of this cam relative to the rotary engagement of the elements of the machine is such as to cause the various wheels $b^{78}$ to over-ride the said cam after each of the carriers have passed the last of the series of fonts. The wheels $b^{78}$ are mounted at the end of arms $b^{79}$, which are fixedly attached to the trunnion bearings $b^{52}$ formed on the end of the bars $b^{53}$. Whenever the wheels $b^{78}$ thus over-ride the cam $b^{77}$, the bars $b^{53}$ are rocked so as to lower the shoulder $b^{56}$ beyond the latches $b^{37}$, thereby permitting the springs $b^{51}$ to retract the said latches $b^{37}$ from engagement with the recess $b^{75}$ in the carrier upon which the said recess is formed. As will be hereinafter described, the carrier is engaged by the conveyers immediately succeeding the disengagement by the latch $b^{37}$ above described. The conveyers move the carrier with its type held therein, to a point in the machine where the said carriers are alined with the line setting mechanism, and where it is intended that the type held in the carrier shall be released and deposited in the compositor's stick.

It will be observed, by reference to Figs. 18 and 19, that the type as being extracted from the magazines are introduced into the type holders in a manner presenting the head of the type in the line of rotation. It will also be observed, by reference to the arrows contained in the said figures, that the machine is revolving in such a manner that the type so held would be deposited in the stick head downward, therefore it becomes necessary to rotate the holder after the same has been supplied with a type extracted from one of the many magazines, and this rotation must occur prior to the carriers arriving at the position above mentioned, wherein they are alined with the line setting mechanism.

The rotation of the type holders is upon the shaft $b^{19}$. For this purpose there is fixedly mounted upon the said shaft a small gear wheel $b^{80}$. The gear wheel $b^{80}$ is meshed with a gear $b^{81}$, which in turn is meshed with the straight gear teeth on a compound prong gear $b^{82}$. (See Fig. 26 of the drawings.) The teeth of the gear $b^{82}$ are meshed with a double gear $b^{83}$, which is fixedly mounted upon a short shaft carrying a straight toothed gear $b^{84}$, and which in turn is meshed with a gear wheel $b^{85}$. (See Fig. 28.) By the rotation of the gear wheel $b^{85}$ the intermeshed and recited gears are each rotated, resulting in a half revolution of the shaft $b^{19}$ and the type holder carried thereby. The chain of gears are relatively proportioned to effect this operation of the shaft $b^{19}$ and the holder carried thereby.

On the rail $b^4$, and disposed in a position thereon slightly in advance of the position of the line setting mechanism, is secured a small rack $b^{86}$, extended in the path of, and adapted to engage the teeth of the gear $b^{85}$ to cause the same to rotate as it passes over the said rack. To prevent the rotation of the gear $b^{85}$ and wheels connected therewith, is provided a spring actuated detent $b^{87}$, the head whereof strikes between the teeth of the gear $b^{85}$. (See Fig. 28.) It is to release the gear $b^{85}$ from engagement with the detent $b^{87}$ that there is also provided, on the rail $b^4$, a cam $b^{88}$, adapted to extend under the detent $b^{87}$, and to raise the same out of engagement with the wheel $b^{85}$ prior to the engagement of the said wheel $b^{85}$ by the rack $b^{86}$. As the wheel $b^{85}$ passes over the rack $b^{86}$, the wheels $b^{84}$, $b^{83}$, $b^{82}$, $b^{81}$ and $b^{80}$ are rotated, the latter rotating the type holder, as above stated, one half revolution. At the completion of this rotary action it will be found that the type holder is directly in line with the type setting mechanism, and that the type is deposited in an upright position ready to be ejected from the holder into the compositor's stick.

At the point where the type holder is completely reversed, as just above described, the carrier is at the end of its lateral travel. Further, the type holder, at this point, is projected from the body of the carrier as it was when receiving the type from the magazine. This projection of the type holder is for the purpose of extending the same to the position wherein the line setting mechanism engages the said type and extracts the same from the holder. The line setting mechanism is mounted upon the table $X^1$. The elevating of the type holder is caused by rotating the shaft $b^2$, the rotation of which is controlled by the wheel $a^8$ of the shaft rocking devices. Each and every of the plates $a^2$ upon which the wheels $a^8$ track, are therefore provided with a recess $a^{49}$, in assembled line, and in such position that the rocking of the shaft $b^2$, caused by the wheel $a^8$ falling into the recess, projects the type holder at this point in position to deliver the type to the line setting mechanism. It is also desired, in order that all friction on the type may be avoided, that as the type holder be thus projected, the arm $b^{27}$ be retracted from holding contact with the said type. In order that this may be accomplished with the type holder in the type delivery position, which is opposite the type receiving position shown in Figs. 18 and 19, I have provided a rack $b^{89}$. When the type holder is rotated in the positions shown in Figs. 20 and 21, the gear wheel $b^{24}$, which is held in mesh with the gear wheel $b^{23}$, is engaged by the teeth of the rack $b^{89}$. When, therefore, the type holder is projected in this position, the shaft $b^{32}$ is rotated, as above described, to impinge upon the ear $b^{35}$ and spread the free end of the arm $b^{27}$.

As in the operation of receiving the type, so in that of delivering the type after the operation is performed, the shaft $b^2$ is again rotated back to the normal position, retracting the type holder, and through the chain of gears $b^{24}$, $b^{23}$, $b^{22}$ and $b^{33}$, removing the extension $b^{34}$ from the ear $b^{35}$, permitting the spring $b^{30}$ to return the arm $b^{27}$ to its normal position. As will be hereinafter described, from this point the carrier is conveyed to the receiving end of its passage over the rails $b^4$, $b^4$. In returning back to the said receiving end, it draws the gear $b^{85}$ back over the rack $b^{86}$, producing a rotation in the gear $b^{85}$ and chain of gears connected therewith the reverse of that above described, producing a reverse result in that the type holder is again rotated back to the normal or receiving position, which is illustrated in Figs. 18 and 19 of the drawings.

The bed of the type holder is provided with a groove $b^{90}$, having a flared outer end and a contracted inner end. This groove $b^{90}$ is provided for the insertion of the end of the extracting device forming a part of the line setting mechanism, whereby the type are drawn from the type holder in the position illustrated in Figs. 20 and 21.

In the above description the operation of the key bars $b^{58}$, shoulders $b^{56}$ and retaining plates $b^{62}$ has been set forth, illustrating the manner in which the various shoulders are each released by the succeeding shoulder as the same is brought into operative position. To safeguard against more than one of the locking devices being set for the arrestation of more than one of the carriers, I have provided an arm $b^{92}$ fixedly mounted upon the pivot $b^{64}$. The arm $b^{94}$ is provided with a curved or rounded surfaced end, which rests slidingly upon the periphery of the disk Y and in the path of cams $b^{93}$, $b^{93}$. The cams $b^{93}$ are disposed in the rotative path of the machine slightly in advance of the plungers $b^{45}$ and links $b^{42}$ connected therewith, and each are operated upon by the cams $b^{61}$. By reason of this arrangement it is obvious that the locking latch $b^{37}$, first passing in front of the said cams $b^{61}$ after the same are projected by the operation of the key bars connected therewith, alone is advanced to the position wherein it arrests the carrier when conveyed transversely across the machine. Before the succeeding locking devices are extended into the path of the said cam $b^{61}$ one of the cams $b^{93}$ passes under the end of the arm $b^{92}$, rocking the said arm and pivot $b^{64}$ connected therewith to raise the plate $b^{62}$, which releases the cam $b^{61}$ and permits the same to retract to avoid impinging upon the succeeding link $b^{42}$ and plunger $b^{45}$ carried thereby. In this manner there is avoided the repetition of the selection of a single type unless otherwise desired. Should it be desired to repeat the type the operator depresses the key bar $b^{58}$ indicating the said type twice.

In the preceding description there has been set forth the construction and arrangement of the font selecting mechanism and the type carriers, together with the coöperative elements thereof, including the key boards whereby the various fonts are selected and maintained in operative relation with the remainder of the mechanism and the key board whereby the individual type are selected.

As stated, the machine is provided with eight carriers, each carrier operating independently of the other carriers, and coöperating with one of the series of shaft rocking devices forming a part of the font selecting mechanism. It has been described how the shaft rocking devices and carriers are mounted on rails and shafts, which are secured to rotary frame disks or members fixedly mounted upon a rotating shaft, which is driven by any desired form of driving mechanism, the transmission mechanism of which is secured upon the driving pulley $X^4$ of the present machine. It has also been set forth that the fonts are radially extended about the rotating disks, and rails and shafts connected therewith, in cylindrical arrangement, wherein the various magazines for holding the individual type are arranged in serial order, disposed lengthwise between the rotary disks and parallel with the driving shaft therefor and wherein the magazine in each font containing a certain letter is disposed in the same plane or rotary alinement with each of the magazines containing the same letter in each of the other fonts. Hence, it is necessary to provide a number of carriers equal to the number of magazines, or move the set of carriers across the length of the fonts. This latter is the form of magazine which I have adopted. It is to so convey the carriers that I have provided the present conveying mechanism.

The conveying mechanism consists primarily in a plurality of endless chains $c^1$, $c^1$ the number of which varies with the size of the machine. The said chains are held in toothed engagement by sprocket wheels $c^2$, $c^2$. The sprocket wheels $c^2$ are mounted on short shafts $c^3$, $c^3$ extended through plates $c^4$, $c^4$ mounted upon the rails $b^4$, $b^4$, at the opposite ends of the said rails. The shafts $c^3$ are provided at the end opposite that carrying the sprockets $c^2$ with a beveled gear $c^5$. The beveled gear $c^5$ is meshed with a beveled gear $c^6$, the shaft $c^7$ of which is extended through, and has a bearing in, the disk Y. The opposite end of the shaft $c^7$ is provided with a small pinion $c^8$, which is mounted in toothed engagement with a large gear $c^9$, which is stationarily mounted with the plates $a^2$, $a^{45}$ and $b^{76}$. By means of this arrangement it is obvious that the shafts $c^7$ are rotated a number of complete revolutions while the said shafts are passing around the wheel $c^9$. The gears $c^5$, and $c^6$ being equal, the same number of rotations imparted to the shaft $c^7$ by the rotation of the disk Y is imparted to the shaft $c^3$, and through it to the sprockets $c^2$. The rotation of the sprockets $c^2$ produces an equal rate of travel in the chains $c^1$. When the carriers are engaged by the said chains they, the carriers, are moved laterally between the disks Y and Z at a speed equal to the travel of the chains. The said carriers are engaged with the chains $c^1$, and alternately with the outer and inner extension thereof, between the sprockets $c^2$ at both ends of the rails $b^4$, $b^4$, and when and as the bar $b^{53}$ is released from engagement with the carriers by reason of the interposition of the latch $b^{37}$.

The conveying mechanism provides, beside the sprockets and chains and gears for rotating the same, a releasing and engaging mechanism, whereby the various carriers are automatically engaged and released. These engaging and releasing mechanisms are operated by cam spurs $c^{10}$, $c^{18}$, which are extended into the path of rollers $c^{11}$ and $c^{12}$. The rollers $c^{11}$ and $c^{12}$ are mounted on the free end of rocking arms $c^{13}$, $c^{13}$, which are fixedly secured to shafts $c^{14}$ and $c^{15}$. The spurs $c^{10}$ and $c^{18}$ are mounted in slots provided in plates $c^{16}$, $c^{17}$. The plates $c^{16}$, $c^{17}$ are bolted stationarily to the frame X of the machine, and disposed between the same and the disk Z. The spur $c^{10}$ is extended beyond the periphery of the plate $c^{17}$ at a point where the rollers $c^{12}$ will pass from the said spurs after the carriers have passed beyond the last of the series of fonts with which the machine is provided. It is designed that in the operation of the carriers, as they are delivered from end to end of the raceways provided and formed by the rails $b^4$, $b^4$, the said carriers will be arrested at these points to follow the rotary path of the machine. When in the course of operating the machine a carrier has been arrested in its flight from the starting end to the delivery end of its raceways, to extract a type from one of the selected magazines, it is carried in a rotary path from the point where it was arrested by the rotation of the machine, until the carrier passes the line of the extension of the spur $c^{10}$. In this rotary path the carrier is disengaged from the conveyer, and is held in locked position, as above described, by the latch bar $b^{53}$. In the course of rotation, and in advance of the rotary position of the spur $c^{10}$, the bar $b^{53}$ is withdrawn to release the latch $b^{37}$ from engagement with the carrier. In the rotation of the machine the carrier then passes the line of the extension of the spur $c^{10}$, the roller $c^{12}$ connected with the shaft $c^{15}$ passing over the said spur, and by rocking the shaft $c^{15}$ locks the carrier to the conveyer chain and to the outer reach of the said chain. This relocking of the carrier immediately conveys the carrier laterally toward the delivery station thereof.

The action of the conveyers, as above stated, is relatively swift, therefore, before the rotation of the machine lowers the re-engaged carrier to the line of the table $X^1$ on which is mounted the line setting mechanism, the carrier has reached the end of the raceway or the rails $b^4$, $b^4$ on which it is mounted. At the end of the path of travel of the carriers in each of the bars $b^{40}$ is mounted a latch $b^{91}$, which is at all times advanced in position to engage the latch $b^{57}$ and slide $b^{70}$, releasing thereby the latches $b^{72}$, $b^{72}$ and the dogs engaging the chains. The action of the latch $b^{91}$ is in all respects similar to the action of the latch $b^{37}$, except that the latch $b^{91}$ is not locked in the operative position by the bar $b^{53}$. A similar latch is provided at the starting end of the rails $b^4$, $b^4$, whereby the carriers are arrested and held in position at the starting end of the raceway. These latches are disengaged from the recess $b^{75}$ of the carriers by means of cams $c^{19}$. The cams $c^{19}$ operate to raise the latches when the shafts $c^{14}$ and $c^{15}$ are rotated by the rollers $c^{11}$ and $c^{12}$ passing over the spurs $c^{10}$ and $c^{18}$.

Slidably mounted upon the shaft $c^{14}$, by means of a feather $c^{31}$ which extends into a channel $c^{32}$, is a beveled gear $c^{20}$. This beveled gear is meshed with an accompanying beveled gear $c^{21}$. The gear $c^{21}$ is, by means of a short shaft $c^{22}$, rotatably mounted in the back plate $b^6$ of the carrier. Set out from the side of the short shaft $c^{22}$ is an extension adapted to under-ride and engage the arm $c^{23}$ of a dog $c^{24}$. The arm $c^{23}$ and the dog $c^{24}$ are integrally formed or rigidly connected. The dog $c^{24}$ is hook-shaped and adapted to strike into the links of the chains $c^1$. The arm $c^{23}$ is pivoted upon a stud $c^{25}$ formed on the shaft $c^{22}$. On the free end of the arm $c^{23}$ is formed a latch extension $c^{26}$, which is adapted to rest over a shoulder $c^{27}$ formed on the latch member $b^{72}$.

On the shaft $c^{15}$ is slidably mounted a beveled gear $c^{28}$, by means of a feather $c^{31}$ extending from the said gear into the channel $c^{32}$, the said gear being meshed with a corresponding gear $c^{29}$, which is provided with a short shaft in all respects similar to the shaft $c^{22}$ carrying the gear $c^{21}$. The stud $c^{25}$ on this shaft likewise forms a pivot for a latch $c^{30}$, which is provided with a hook-like dog end $c^{24}$, and the latch extension $c^{26}$ adapted to rest over the shoulder $c^{27}$ formed on the latch $b^{72}$ adapted to control the same. The said shafts $c^{14}$ and $c^{15}$, when rotated by the spurs $c^{18}$ and $c^{10}$, rotate in the direction shown by the arrows in Figs. 24 and 25. The beveled gears $c^{20}$ and $c^{28}$ are rotatably mounted in brackets $c^{33}$, $c^{33}$ set out from the back of the back plate $b^6$ of the carrier. When the said shafts are rotated the said gears are thereby revolved, in turn rotating the gears $c^{21}$ and $c^{29}$. When either of the gears $c^{21}$ or $c^{29}$ are rotated, they, by means of the extensions $c^{26}$, elevate the arms $c^{23}$ or lower the latch $c^{30}$, until the extension $c^{26}$ on each arm or latch passes over and is engaged by the shoulder $c^{27}$ in each of the latches $b^{72}$. The latches $b^{72}$ are actuated to yield to permit the extensions $c^{26}$ to pass, and then to advance the shoulders $c^{27}$ into the return path thereof by the springs $b^{73}$, $b^{73}$. It will be noted that the spurs $c^{10}$ and $c^{18}$ are short or acute, therefore after having rotated the shafts $c^{14}$ and $c^{15}$ to seat the hook-like extensions of the dog $c^{24}$ in the chains $c^{1}$, the rollers $c^{11}$ and $c^{12}$ on passing the peak of the spurs, resume their track on the circular periphery of the plates $c^{16}$ and $c^{17}$ respectively, rotating the said shafts $c^{14}$ and $c^{15}$. In this position of the shafts, the extension $c^{26}$ is removed from under the arms $c^{23}$ and $c^{30}$, permitting the retraction of the same to lift the tooth-like extensions $c^{24}$, $c^{24}$ out of engagement with the chain $c^{1}$. This retraction of the arms $c^{23}$ and $c^{30}$ is prevented by the latches $b^{72}$, $b^{72}$.

As above described, the latches $b^{72}$, $b^{72}$ retain their position until they are retracted by the latches $b^{37}$ and $b^{91}$ impinging upon and moving the slides $b^{70}$ and the extensions $b^{71}$ thereof. The occasion for this interposition of the latches $b^{37}$ is above set forth. Also the operation of the latches $b^{91}$ at the ends of the raceway of the carriers has been mentioned. From the preceding description it will therefore be understood that the operation of the shafts $c^{14}$ and $c^{15}$ is timed with reference to the devices for releasing the carriers from the conveyers, to occur subsequent to such releasing action.

It is sometimes desired not to operate the carriers while rotating the machine. For this purpose the spurs $c^{18}$ are mounted slidably in slots $c^{34}$, the edges of the said slots being grooved, as shown by dotted lines in Fig. 30. Extended from the side of the spurs $c^{18}$ is a small handle $c^{35}$ whereby the spur may be moved in and out of the said slot. The back of the spur $c^{18}$ is provided with a nick to receive a spring actuated pawl $c^{36}$, the toothed end of which is seated in the said nick by a spring $c^{37}$. By means of the said pawl the spurs are held in the advanced position shown in the drawings in Fig. 30. When it is desired not to operate the engaging shafts $c^{14}$ and $c^{15}$ the pawls $c^{36}$ are raised out of engagement with the nicks in the spurs $c^{18}$, and by means of the handles $c^{35}$ the said spurs are retracted. When now the machine is rotated it is obvious, the spurs $c^{18}$ being removed, the shafts $c^{14}$ and $c^{15}$ remain inactive, and the dogs $c^{24}$, $c^{24}$ are not inserted in the links of the chain $c^{1}$. Hence, although the machine may be rotated, the engagement between the carriers and the conveying mechanism does not occur. In the drawings, Fig. 30, the plate $c^{17}$ is cut away to form a circular opening $c^{38}$, whereby the spur $c^{18}$ in the plate $c^{16}$ may be exposed to be operated.

It will be noted that the spur $c^{10}$ is not retracted. The spur $c^{10}$ is that which rocks the shaft $c^{15}$, the effect of which is to cause the dog $c^{24}$ to engage the chain $c^{1}$ at the free or delivering end of the machine. The suspension of the operation of the shafts $c^{14}$, $c^{14}$ causes each of the carriers to be brought to the line forming end of the machine and there remain. This position is what may be termed the inoperative position, even though the rotary frame may continue to revolve.

In the foregoing there has been set forth the construction and arrangement of the mechanism whereby the particular font from which the type are to be drawn is selected; whereby the particular type to be extracted from the said font is selected; and whereby the type are extracted and conveyed to a definite point for assembling in the line setting mechanism. Before proceeding to the description of the line setting mechanism I will describe the construction and arrangement of the font battery and mechanism contained within the magazines for operating the delivery of the type.

Each of the various fonts $d^{1}$, $d^{2}$, $d^{3}$, $d^{4}$, $d^{5}$, $d^{6}$, $d^{7}$, $d^{8}$, $d^{9}$ and $d^{10}$ consists of a plurality of narrow magazines, and each of said magazines is adapted to contain a separate and single column of type. The said fonts are extended radially about the cylindrical path of the carrier rails $b^{4}$, and are extended laterally to coincide with the key board B, and each magazine of the said fonts being disposed in rotary alinement with each of the said key bars $b^{58}$. It will be understood that each magazine alined with any certain key bar contains each a letter represented by the said key bar. These magazines are constructed substantially as shown in Figs. 15 and 31 of the drawings. The sides $d^{11}$, $d^{11}$ are extended from a base $d^{12}$ in such manner as to permit the faces $d^{13}$ of the type $d^{14}$ to extend beyond the raceway formed by the said sides. The upper end is freely open, while at the lower end the sides have lateral inward extensions $d^{15}$, $d^{15}$ separated to form a passage for the finger $b^{15}$ of the ejectors $b^{13}$.

The base $d^{12}$ is provided with a recess $d^{16}$ to receive a bayonet bracket $d^{17}$, which is secured to a back plate $d^{18}$ of the font. It is by means of the recess $d^{16}$ and the bayonet bracket $d^{17}$ that the magazine is in part secured to the back plate $d^{18}$. At the upper end of the plate $d^{18}$ is provided a raised and under-cut guide $d^{19}$, to which is slidably fitted a hook $d^{20}$. The hook $d^{20}$ is provided with a lip $d^{21}$, which extends into a groove formed in the upper end of the base $d^{12}$ of the magazine. When the magazine is secured to the back plate $d^{18}$, by engaging the bayonet bracket $d^{17}$ the hook $d^{20}$ is raised so that the lip $d^{21}$ is removed from interference with the seating of the magazines to rest on the body portion of the said hook $d^{20}$. When the magazine is so positioned, the hook $d^{20}$ is forced forward until the lip $d^{21}$ enters the slot formed in the upper end of the magazine, thereby locking the same to the plate $d^{18}$.

At the lower end of the magazine, and in line with the slot formed for the passage of the finger $b^{15}$ of the ejector, there is pivotally mounted a small bell crank $d^{22}$. The lower extension of the bell crank $d^{22}$ is adapted to be impinged upon by the finger $b^{15}$ when the carrier is placed in position to extract the type from the particular magazine containing the particular bell crank to be acted upon. The rocking of the bell crank upon its pivot depresses the opposite end of the bell crank, which is attached to a cord $d^{23}$. The upper end of the cord $d^{23}$ is connected to a rocking lever $d^{24}$, which carries a spring actuated pawl $d^{25}$. The cord $d^{23}$ is held in position by a spiral spring $d^{26}$, which is anchored upon the base $d^{12}$ and connected to the end of the rocking lever $d^{24}$ opposite that to which is connected the cord $d^{23}$. The rocking lever $d^{24}$ is pivotally mounted on a shaft $d^{27}$, having fixedly connected thereon a ratchet wheel $d^{28}$, into the teeth of which the pawl $d^{25}$ is arranged to strike. The said bell crank, cord, rocking lever, pawl, and ratchet wheel are so arranged that when the finger $b^{15}$ of the ejector rotates the bell crank $d^{22}$, the wheel $d^{28}$ is rotated a certain designed distance.

Fixedly mounted upon the shaft $d^{27}$ is a worm gear wheel $d^{29}$. The wheel $d^{29}$ is mounted in toothed engagement with a traveler screw $d^{30}$, so as to rotate the same in unison with the rotation of the said worm gear wheel when the same is rotated by the intermittent action of the bell crank $d^{22}$ and the transmission connections between the said crank and wheel. Threaded upon the traveler screw $d^{30}$ is a block $d^{31}$. The block $d^{31}$ is provided on its lower and inner edge with a half round groove in which are formed the half round screw threads adapted to engage the thread on the traveler screw $d^{30}$.

By reason of the construction and arrangement of the parts set forth in the preceding description, the type column is advanced one space or the space of one type as and when the bell crank $d^{22}$ is struck by the finger $b^{15}$ of the ejector $b^{13}$. This places the type at the bottom of the columns ready for delivery from the magazine and in position to be extracted by the said finger. The column rests on inwardly extended flanges $d^{40}$. The bottom type thus remains in that condition until operated upon by the succeeding carrier and in a similar manner.

The carriers are separately and individually rotated in line with all the columns of type of the same characters, each column being carefully arranged so that the printing faces of the said type are projected slightly beyond the front or open edges of the sides of the said magazines. The type are also placed in the same position with reference to their legs in each of the said magazines. When it is desired to refill a magazine, the block $d^{31}$ is raised out of the channel formed by the sides of the magazine, and the type placed therein. The block $d^{31}$ is then placed in the channel, the screw threads formed in the half cylindrical groove therein fitting over the threads of the traveler screw $d^{30}$. By means of this construction, time is saved which might otherwise be consumed in rotating the traveler screw until the block $d^{31}$ would be retracted to the upper end of the magazine.

As stated, what is herein termed a font consists of a plurality of magazines of the construction and arrangement set forth in the preceding description. The number of the magazines depends entirely upon the completeness of the fonts. That is to say, if a font is to carry more than one size of the same style of type, the number of magazines would be thereby enlarged, as each magazine contains only characters similar in all respects. There is no limit to the number of variations of the characters in the fonts, except as to the desired and proper size to which the machine may be extended. I have in each font provided one or more magazines carrying the ordinary type spacing devices, such as are illustrated in the drawings in Figs. 32 to 34 inclusive. These will be hereinafter more fully described.

The magazines are secured to the back plate $d^{18}$, which is nicked to extend across that part of the machine wherein are operated the carriers. The back plates are provided with rollers $d^{32}$, $d^{32}$, which straddle the carrying bars $d^{33}$, $d^{33}$ mounted between the side frames X, X, as shown in Fig. 1 of the drawings. The rollers $d^{32}$ are held in position upon the bars $d^{33}$ by means of flange plates $d^{34}$, $d^{34}$. The difficulty of introducing loaded fonts, is, by the use of the bars $d^{33}$, $d^{33}$ and the rollers $d^{32}$, $d^{32}$, minimized. The fonts are not frequently changed on the machine as a whole, but the magazines are lifted from the fonts, refilled and replaced without disturbing the font in its entirety.

The arrangement of the magazines is fixed with reference to the arrested position of the various carriers, by the operation of the key bars of the key board A, the magazines being so placed as to aline with the rotary path of the finger $b^{15}$ on the carriers when arrested by a certain key bar of the said key board.

By reason of this control of the arrangement, the various magazines in the various fonts are alined. That is to say, the magazine containing the letter $m$ in each font is alined with the magazines carrying the letter $m$ in all of the other fonts. This is true of all of the letters of the lower and the upper case. By reason of this arrangement the key board A need carry only the one set of key pads, or at most the two sets, one indicating the upper and the other the lower case font.

It will be understood that the number of fonts forming the battery used in connection with this machine is only limited by the size of the rotary structure of the machine, and that machines having a larger or smaller font capacity will be constructed for distribution.

As above stated, the carriers deliver the various types to the line setting mechanism, which, in its present disclosure, is limited to the mechanism for forming the separate line, or, in other words, the compositor's stick. The location, construction and arrangement of the stick as it affects the present disclosure, are illustrated in Figs. 2$^a$, 20, 21 and 30 of the drawings. The stick is mounted upon the table $X^1$, and consists primarily in a channel formed by the two sides $e^1$, $e^1$. The width of the channel may be enlarged by any suitable means known to the art. No such means is shown in the present disclosure.

Mounted beside the said channel is a follower block $e^2$, slidably mounted upon a plate $e^3$, and having a wing $e^4$ extended into the channel of the stick. The block $e^2$ is guided between the side of the stick and the side of a rack bar $e^5$. A second wing $e^6$ is set out from the side of the follower block to rest over the rack bar $e^5$ and in the path of an extended ear $e^7$ mounted on the said rack bar. The rack bar $e^5$ is guidably mounted in the plate $e^3$, and is provided at the forward end with a rack toothed section $e^8$, the teeth whereof are meshed with a small gear wheel $e^9$. The gear wheel $e^9$, a pinion $e^{10}$, a gear wheel $e^{11}$ and a pinion $e^{12}$ form a chain of gears for radially rotating a star wheel $e^{13}$. Between the extensions of the star wheel $e^{13}$ are extended escapement members $e^{14}$, $e^{14}$ of a sounding bell vibrator $e^{15}$. The vibrator $e^{15}$ when vibrated strikes upon and sounds a bell $e^{16}$.

The above described construction provides for an alarm adapted to be sounded when a certain length of line of type has been placed in the stick. The operation of the alarm with reference to the length of the line may be varied to suit the desire of the compositor. This variation could be most easily effected by shifting the ear $e^7$ on the rack bar $e^5$.

Set in the bottom of the channel of the stick is a picker bar $e^{17}$. The picker bar $e^{17}$ is arranged to be reciprocated in time relation with the machine to advance a picker $e^{18}$ in the path of the type holder of each carrier as the same is rotated past the position of the stick. As above stated, the picker $e^{18}$ is shaped to enter the groove $b^{90}$ in the bed of the holder, the said holder being reversed to present the flared end of the said groove for the reception of the said picker. While the carrier is passing, the picker bar is extended. The inclined inner face of the picker $e^{18}$ effects the extraction of the type from the holder, allowing them to drop by gravity behind the picker $e^{18}$, and between it and the last preceding deposited type.

From the periphery of the disk Z are extended a series of eight cams $e^{19}$, $e^{19}$. The disposition of the said cams is such that immediately the type holder of the carrier has passed the position of the stick, the said cams $e^{19}$ pass under a wheel $e^{20}$, deflecting the same. The wheel $e^{20}$ is mounted on the free end of an arm $e^{21}$, which is fixedly attached to a shaft $e^{22}$, carrying a small gear $e^{23}$. The gear $e^{23}$ is meshed with the teeth of a rack section $e^{24}$ of the picker bar $e^{17}$. The deflecting of the wheel $e^{20}$ operates through the gear $e^{23}$ to extend the picker bar $e^{17}$ to present the picker $e^{18}$ in the path of the type carried by the type holder, as described. As the cams $e^{19}$ pass from engagement with the wheel $e^{20}$, the spring $e^{25}$ is permitted to retract the picker bar $e^{17}$, drawing the picker $e^{18}$ back against the type newly introduced in the line, and seating the various types snugly in position. At the same time, this action advances the line of type and the block $e^2$ carried thereby toward the rear end of the stick. When in the course of operation, the line becomes filled and a desired length, or at a period just preceding that condition, the extended wing of the block $e^2$ strikes upon the ear $e^7$ of the rack bar $e^5$, and from that time sounds the alarm on the bell $e^{16}$ as each succeeding type is added to the line, therefore constantly apprising the compositor the condition of the line, and thus permitting him to make arrangement accordingly.

Having thus described the construction and arrangement of the various groups and instrumentalities constituting the present machine, it is deemed advisable to describe the operation thereof in its entirety. The compositor being seated before the key-boards A and B starts the motor, rotating the machine. With the rotation of the machine the carriers begin to travel back and forth along the rails $b^4$, $b^4$, but until the font selecting key is depressed the ejector of the carriers, and the type holders thereof, are not extended, and do not affect the various fonts as they pass in front of the same. The operator now depresses the font selecting key indicating the font by him desired. As described above, the depression of the key bar of the key board A extends one of the cams $a^{40}$, which is locked in extended position by the plate $a^{43}$. Thereafter the shafts $b^1$, $b^2$ operating the various carriers will be rocked when the carriers are passing the particular font selected, and not while passing in front of the battery of fonts. Having thus selected his font and placed the machine in operative position to deliver type from that font only, the operator proceeds to compose his matter. In doing this he operates the key bars of the keyboard B, much in the manner of an operator working on an ordinary typewriter. With the depression of each of the key bars the cams $b^{61}$ are advanced to impinge upon and extend one of the plungers $b^{45}$ of the locking bar for engaging the carriers. As described, the extension of the plunger $b^{45}$ operates to seat the latch $b^{37}$ corresponding to the key bar $b^{58}$ which is depressed. The latch $b^{37}$ being thus set intercepts the carrier mounted upon the rails $b^4$, $b^4$ in line with the said latch, which has been thus set. The engagement of the latch $b^{37}$ and the carrier effects the release of the carrier from the conveyer, and arrests the carrier in its lateral flight. The position in which the carrier is arrested is such that in the rotation of the machine the finger $b^{15}$ of the ejector $b^{13}$ is extended into the slot in the lower end of the magazines containing the selected type from the selected font. The shafts $b^1$ and $b^2$ are rotated in such sequence that as the type are drawn from the magazine by the said ejector the type holder is presented in opened position to receive the type. The type being received upon the type holder the same are grasped by the movable jaw thereon, the shafts $b^1$, $b^2$ are returned to their normal positions, lowering the said ejectors and the type holders prior to the carrier passing the next succeeding font. Having thus extracted, and holding the desired type, the carrier moves with the rotary part of the machine until the bar $b^{53}$ is rocked by reason of the wheel $b^{78}$ passing over the cam extensions $b^{77}$. The cam extensions $b^{77}$ are so located that at the time of the rotation of the bar $b^{53}$ the carriers have passed the last of the fonts constituting the font battery. The result of the rotation of the bar $b^{53}$ is to release the carrier from engagement therewith, leaving the said carrier in condition to be reëngaged by the conveyers for the remainder of its lateral flight in which it has been arrested. When the rotary part of the machine now progresses to the point where the wheel $c^{12}$ passes over the spurs $c^{10}$, the shaft $c^{15}$ is rotated, resulting in the engagement of the dog $c^{24}$ with the links of the outer reach of the chain $c^1$. As described, the chain $c^1$ is continuously traveling in harmony with the rotation of the rotary members of the machine. The carrier, having extracted and now holding the type, is laterally moved on the rails $b^4$, $b^4$ until the latch $b^{91}$ engages the dog and arrests the carrier in the manner as above described. This arrestation of the carrier is in a position where the same is in line with the stick of the line setting mechanism. At the moment of the carrier being delivered into the position where it is engaged by the latch $b^{91}$, and immediately preceding the arrestation by the said latch, the type holder is reversed by means of the gear wheel $b^{85}$ riding over the rack $b^{86}$. In reversing the type holder, as above stated, the foot of the type is presented downward to the stick on the line setting mechanism, and the flared end of the groove $b^{90}$ is presented to the end of the picker $e^{18}$. By the further rotation of the machine, and immediately preceding the type holder reaching the position of the picker $e^{18}$, the said type holder is extended by the shaft $b^2$ being rocked to extend the same. The rocking of the shaft at this point, it will be remembered, is occasioned by the wheel $a^8$ falling into the recess $a^{49}$. It will also be remembered that each of the plates $a^2$ upon which the wheels $a^8$ track has a recess $a^{49}$ in horizontal line, and therefore each of the various carriers, when passing the line setting mechanism, are thus operated upon.

In Figs. 32 and 33 of the drawings there are illustrated in diagrammatic form the paths of the type carriers when influenced by the conveyers, and when released thereby. For the convenient reading of the drawings there has been marked on the figures, and on the lines indicating the path of the carrier, the various stations at which some of the views of the drawings have been taken.

In Fig. 32 is illustrated the path of the carrier when in its lateral flight it is not arrested by one of the locking latches $b^{37}$. The long parallel broken lines shown in the drawing are designated $c^{14}$ and $c^{15}$, which are the designating characters for the shafts which the said dotted lines indicate in the diagram, and the rotation of which causes the dogs $b^{24}$, $b^{24}$ to engage the outer and inner reaches of the chain $c^1$ of the conveying mechanism.

The point marked H is the point from which the carrier starts in its operation. This is due to the rocking of the shaft $c^{14}$ by the spur $c^{18}$. As above described, the rocking of the shaft $c^{14}$ causes the engagement of the dog $c^{24}$ on the inner reach of the chain $c^1$. The inner reach of the chain $c^1$ is traveling toward the disk Y of the machine. If uninterrupted the carrier passes from the station marked H to the station marked I. At this point the carrier is arrested by the latch $b^{91}$, which, as above described, is normally extended into the position for arresting the said carriers. As above described, with the arrestation of the carriers the same are released from the chain of the conveyer. This position is illustrated in Fig. 21$^b$ of the drawings. Being arrested in its lateral flight the carrier is rotated by the machine passing through the space beyond the fonts, wherein the rocking of the shafts $b^1$ and $b^2$ does not result in the extraction of type until the carrier arrives at the position marked K. At this position the shaft $c^{15}$ is rocked by reason of the wheel $c^{12}$ passing over the spur $c^{10}$. The rocking of the shaft $c^{15}$ lifts the arm $c^{39}$, which extends under the latch $b^{91}$ and raises the same out of engagement with the recess $b^{75}$ and the latch $b^{57}$. At the same time, the rocking of the shaft places the dog $c^{24}$ in engagement with the outer reach of the chain $c^1$ and starts the carrier to the opposite end of the rails $b^4$, and to the position marked L. In the rotary path of the machine, in the line from L to H is the operative position of the picker finger $e^{18}$. It is understood that the carriers are arrested by the various latches $b^{37}$, only one proceeding from the station H toward the station I. This path is below the type selecting table carrying the type bars $b^{58}$. The path indicated by K and L is above the type selecting table, and the flights on that path of the various carriers, whether rotated with type or otherwise, are such as to pass the type selecting station prior to arranging the latches $b^{37}$ in locking position.

In Fig. 33 is illustrated the path of a carrier when arrested by one of the various latches $b^{37}$. In this event the carrier starts from the station H, traveling in the direction indicated by the arrow heads, and at the station marked M is arrested by one of the said latches $b^{37}$. Being arrested and disengaged from the conveyer, the carrier is rotated in the circular path until it arrives at the station N. In the passage over the circular path the carrier is moved transversely in front of each of the various fonts and in line with the magazines containing the latter corresponding to the key which set the particular latch $b^{37}$ which arrested the carrier. The various operations above described whereby the particular type are extracted from the particular font selected, and in the manner shown in Figs. 18, 19 and 19$^a$, have been performed prior to the carrier arriving at the station N. As above described, with the rocking of the shaft $c^{15}$ the carrier is now engaged by the return reach of the chain $c^1$, and is brought to the station L by the said chain. At the station L the carrier is arrested and released from the chain and held while passing in the rotary path in the line of the picker finger $e^{18}$ to have the type with which the type holder is laden extracted therefrom.

The carriers are arrested at the station L by the latches $b^{94}$. The latches $b^{94}$ are normally extended in the path of the latches $b^{57}$ by springs $b^{95}$. The latches $b^{94}$ are pivoted at $b^{96}$ (see Fig. 21$^a$) and are provided with a tail piece $b^{97}$, the end of which is extended in the path of a cam $b^{98}$, which is fixedly mounted upon the shaft $c^{14}$. When the said shaft $c^{14}$ is rotated, the latch $b^{94}$ is retracted from engagement with the recess $b^{75}$, and the dog $c^{24}$ is forced into engagement with the lower reach of the chain $c^1$, thereby compelling the flight of the carrier toward the opposite end of the machine or the disk Y.

In conclusion it will be observed that the operation of the present machine presents certain distinctive features which may be expressed as follows:

First: By a key controlled board, the font is selected from which the type are delivered.

Second: The type characters are selected by key board controlling devices which arrest, in alinement with the various magazines of the various fonts containing the selected character, extracting devices.

Third: The extracting devices travel laterally and swiftly from one end of the assembled fonts to the other and return in each revolution of the mechanism, and in thus traversing the machine the carriers are arrested after the locking mechanisms have passed the key board selecting mechanism. Further, prior to the arrival of the arrested carrier again in line with the key board the carrier is returned to the delivery station for the type carried therein, thus avoiding interference and duplication of fonts.

Fourth: The composing mechanism operates in a certain and definite path, assembling in stick form the successive type from the said carriers.

In the diagrammatic Figs. 35 and 36 are indicated by leaders and by the word "Figure" and the designating numeral therefor, the stations in the various flights shown therein at which the views of the drawing referred to are taken.

Having thus described my invention, what I claim as new and desire to secure by Letters Patent is:—

1. A type setting machine comprising a font battery embodying a plurality of fonts the delivery ends whereof are disposed in parallel arrangement; a type selecting mechanism embodying extractors for removing the type successively from the said fonts and holders for said types, said extractors being arranged to travel transversely across the said fonts; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said holders for said type from the said fonts to the line forming mechanism.

2. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a type selecting mechanism embodying extractors for removing the type successively from the said fonts and holders for said types, said extractors being arranged to travel transversely across the said fonts; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said holders for said type from the said fonts to the line forming mechanism.

3. A type setting machine comprising a font battery embodying a plurality of fonts arranged in lateral straight line extension, and radially disposed about a common center, each font embodying a series of magazines adapted to contain in column order type of a single character, said magazines each having a delivery opening alined with the opening of the other magazines forming its font; a type selecting mechanism embodying extractors for removing the type successively from the said fonts and holders for said types, said extractors being arranged to travel transversely across the said fonts; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said holders for said type from the said fonts to the line forming mechanism.

4. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof; a type selecting mechanism embodying extractors for removing the type successively from the said fonts and holders for said types, said extractors being arranged to travel transversely across the said fonts; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said holders for said type from the said fonts to the line forming mechanism.

5. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said fonts and holders for said types, said extractors being arranged to travel transversely across the said fonts; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said holders for said type from the said fonts to the line forming mechanism.

6. A type setting machine comprising a font battery embodying a plurality of fonts arranged in lateral straight line extension and radially disposed about a common center, each font embodying a series of magazines adapted to contain in column order type of a single character, said magazines each having a delivery opening alined with the opening of the other magazines forming its font; a feeding mechanism mounted in each of said magazines and adapted to advance the column of type in each to present successively the type in said magazine at the delivery end thereof, said feeding mechanism being operatively connected with the type selecting mechanism; a type selecting mechanism embodying extractors for removing the type successively from the said fonts and holders for said types, said extractors being arranged to travel transversely across the said fonts; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said holders for said type from the said fonts to the line forming mechanism.

7. A type setting machine comprising a font battery embodying a plurality of fonts the delivery ends whereof are disposed in lateral straight line extension, each font embodying a series of magazines adapted to contain in column order type of a single character, the said magazines each having a delivery opening alined with the opening of the other magazines forming its font, and each of the said magazines forming an open sided channel wherein the type face may be viewed; a type selecting mechanism embodying extractors for removing the type successively from the said fonts and holders for said types, said extractors being arranged to travel transversely across the said fonts; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said holders for said type from the said fonts to the line forming mechanism.

8. A type setting machine comprising a font battery embodying a plurality of fonts arranged in lateral straight line extension and radially disposed about a common center, each font embodying a series of magazines adapted to contain in column order type of a single character, said magazines each having a delivery opening alined with the opening of the other magazines forming its font, and each of said magazines having an open sided channel wherein the type face may be viewed; a type selecting mechanism embodying extractors for removing the type successively from the said fonts and holders for said types, said extractors being arranged to travel transversely across the said fonts; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said holders for said type from the said fonts to the line forming mechanism.

9. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a type selecting mechanism embodying reciprocated members extensible to extract the type from said magazines and holders for said types; a font selecting mechanism arranged to regulate the stations at which the said reciprocated members operate; a line forming mechanism embodying a holder and an assembling device arranged to feed type into the said holder and to maintain them in position therein; and a conveying mechanism arranged to transfer the said holders for said type from the said fonts to the line forming mechanism.

10. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a type selecting mechanism embodying extractors for removing and holders for supporting the type successively from the said magazines; a rocking shaft slidably connected with said extractors to extend the same within the delivery end of said magazines; means for rocking the said shaft; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said holders for said type from the said fonts to the line forming mechanism.

11. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a type selecting mechanism embodying extractors for removing the type successively from the said magazines, said type selecting mechanism being arranged to travel transversely across the said fonts; a type holding mechanism mounted on said selecting mechanism and arranged to receive the type as extracted from the said fonts; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

12. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a type selecting mechanism embodying extractors for removing the type successively from the said magazines, said extractors being arranged to extend within the delivery end of said magazines; a type holding mechanism mounted on said selecting mechanism arranged to receive the type as extracted from the said magazines; a movable member arranged to hold the type when so received; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

13. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a type selecting mechanism embodying extractors for removing the type successively from the said magazines, said extractors being arranged to be inserted in the delivery end of said magazines; a type holding mechanism mounted on said selecting mechanism and arranged to receive the type as extracted from the said magazines; a movable member mounted on said holding mechanism to retain the type when so received; means for elevating the said holder in timed relation with the extension of said extractors to extend the said holder under the type as extracted; a font selecting mechanism arranged to regulate the stations at which the said extractors operate; a line forming mechanism embodying a holder and an assembling device arranged to feed type into the said holder and to maintain them in position therein; and a conveyng mechanism arranged to transfer the said type from the said fonts to the line forming mechanism.

14. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a type selecting mechanism embodying extractors for removing the type successively from the said magazines, said extractors being arranged to travel transversely across the said fonts; a type holding mechanism mounted on said selecting mechanism and arranged to receive the type as extracted from the said magazines; a movable member arranged to hold the type when so received by the said holding member; a rocking shaft slidably connected with said type holder and adapted to elevate the same; means for rocking the said shaft in timed relation with the font selecting mechanism; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

15. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a type selecting mechanism embodying extractors for removing the type successively from the said magazines, said extractors being arranged to travel transversely across the said fonts and to be extended within the delivery end of the said magazines when extended; a type holding mechanism mounted on said selecting mechanism arranged to receive the type as extracted from the said magazines; a movable grasping member arranged to hold the type when so received; a rocking shaft slidably connected with said extractors to extend the same within the delivery end of said magazines; a rocking shaft slidably connected with said type holder to elevate the same under the type being extracted; means connecting the said rocking shafts for extending the said extractors and for elevating the said type holders to rock the said shafts in timed relation; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

16. A type setting machine comprising a font battery embodying a plurality of fonts disposed in lateral straight line extension, each font embodying a series of magazines adapted to contain in column order type of a single character, said magazines each having a delivery opening alined with the openings of the other magazines forming its font; a type selecting mechanism embodying extractors for removing the type successively from the said magazines, said extractors being arranged to travel transversely across the said fonts and to be extended within the delivery end of the said magazines when extended; a type holding mechanism mounted on said selecting mechanism arranged to receive the type as extracted from the said magazines; a movable grasping member arranged to hold the type when so received; a rocking shaft slidably connected with said extractors to extend the same within the delivery end of said magazines; a rocking shaft slidably connected with said type holder to elevate the same under the type being extracted; means connecting the rocking shafts for extending the said extractors and for elevating the said type holders to rock the said shafts in timed relation; means for rotatably reversing the said holders; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

17. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a type selecting mechanism embodying extractors for removing the type successively from the said magazines, said extractors arranged to travel transversely across the said fonts, and extensible to extract the type from said magazines; a type holding mechanism mounted on said selecting mechanism arranged to receive the type as extracted from the said magazines; a movable member arranged to hold the type when so received; a rocking shaft slidably connected with the said type holding mechanism; a chain of gears interposed between said rocking shaft and said movable member, said chain being arranged to rotate the said holding member when the said shaft is rocked; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

18. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a type selecting mechanism embodying extractors for removing the type successively from the said magazines, said extractors being arranged to travel transversely across the said fonts; a type holding mechanism mounted on said selecting mechanism arranged to receive the type as extracted from the said magazines; a movable jaw mounted on said holding mechanism to grasp the type when received by said holding mechanism; a rocking shaft slidably connected with said extractors and adapted to elevate the same within the delivery end of the said magazines; a rocking shaft slidably connected with said type holding mechanism adapted to elevate the same to the type as the same are delivered from the said magazines; a chain of gears mounted upon the said holding mechanism and interposed between the said shaft and movable jaw thereof, said chain being disposed to spread the said holding jaw when and as the said holding mechanism is extended by the said rocking shaft; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

19. A type setting machine comprising a font battery embodying a plurality of fonts arranged in lateral straight line extension and radially disposed about a common center, each font embodying a series of magazines adapted to contain in column order type of a single character, said magazines each having a delivery opening alined with the opening of the other magazines forming its font; a type selecting mechanism embodying reciprocated members extensible to extract the type from said magazines; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

20. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof; a type selecting mechanism embodying extractors for removing the type successively from the said magazines; a rocking shaft slidably connected with said extractors to extend the same within the delivery end of said magazines; means for rocking the said shaft; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

21. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines, said type selecting mechanism being arranged to travel transversely across the said fonts; a type holding mechanism mounted on said selecting mechanism and arranged to receive the type as extracted from the said fonts; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

22. A type setting machine comprising a font battery embodying a plurality of fonts the delivery ends whereof are disposed in lateral straight line extension, each font embodying a series of magazines adapted to contain in column order type of a single character, the said magazines each having a delivery opening alined with the opening of the other magazines forming its font; and each of the said magazines forming an open sided channel wherein the type face may be viewed; a type selecting mechanism embodying extractors for removing the type successively from the said magazines, said extractors being arranged to extend within the delivery end of said magazines; a type holding mechanism mounted on said selecting mechanism arranged to receive the type as extracted from the said magazines; a movable member arranged to hold the type when so received; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

23. A type setting machine comprising a font battery embodying a plurality of fonts arranged in lateral straight line extension and radially disposed about a common center, each font embodying a series of magazines adapted to contain in column order type of a single character, said magazines each having a delivery opening alined with the opening of the other magazine forming its font; a type selecting mechanism embodying extractors for removing the type successively from the said magazines; a rocking shaft slidably connected with said extractors to extend the same within the delivery end of said magazines; means for rocking the said shaft; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

24. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof; a type selecting mechanism embodying extractors for removing the type successively from the said magazines, said type selecting mechanism being arranged to travel transversely across the said fonts; a type holding mechanism mounted on said selecting mechanism and arranged to receive the type as extracted from the said fonts; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

25. A type setting machine comprising a font battery embodying a plurality of fonts disposed in lateral straight line extension, each font embodying a series of magazines adapted to contain in column order type of a single character, said magazines each having a delivery opening alined with the openings of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines said extractors being arranged to extend within the delivery end of said magazines; a type holding mechanism mounted on said selecting mechanism arranged to receive the type as extracted from the said magazines; a movable member arranged to hold the type when so received; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

26. A type setting machine comprising a font battery embodying a plurality of fonts the delivery ends whereof are disposed in lateral straight line extension, each font embodying a series of magazines adapted to contain in column order type of a single character, the said magazines each having a delivery opening alined with the opening of the other magazines forming its font, and each of the said magazines forming an open sided channel wherein the type face may be viewed; a type selecting mechanism embodying extractors for removing the type successively from the said magazines, said extractors being arranged to be inserted in the delivery end of said magazines; a type holding mechanism mounted on said selecting mechanism and arranged to receive the type as extracted from the said magazines; a movable member mounted on said holding mechanism to retain the type when so received; means for elevating the said holder in timed relation with the extension of said extractors to extend the said holder under the type as extracted; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line feeding mechanism.

27. A type setting machine comprising a font battery embodying a plurality of fonts arranged in lateral straight line extension and radially disposed about a common center, each font embodying a series of magazines adapted to contain in column order type of a single character, said magazines each having a delivery opening alined with the opening of the other magazines forming its font; a type selecting mechanism embodying extractors for removing the type successively from the said magazines, said type selecting mechanism being arranged to travel transversely across the said fonts; a type holding mechanism mounted on said selecting mechanism and arranged to receive the type as extracted from the said fonts; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

28. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof; a type selecting mechanism embodying extractors for removing the type successively from the said magazines, said extractors being arranged to extend within the delivery end of said magazines; a type holding mechanism mounted on said selecting mechanism arranged to receive the type as extracted from the said magazines; a movable member arranged to hold the type when so received; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

29. A type setting machine comprising a font battery embodying a plurality of fonts disposed in lateral straight line extension, each font embodying a series of magazines adapted to contain in column form type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines, said extractors being arranged to be inserted in the delivery end of said magazines; a type holding mechanism mounted on said selecting mechanism and arranged to receive the type as extracted from the said magazines; a movable member mounted on said holding mechanism to retain the type when so received; means for elevating the said holder in timed relation with the extension of said extractors to extend the said holder under the type as extracted; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

30. A type setting machine comprising a font battery embodying a plurality of fonts the delivery ends whereof are disposed in lateral straight line extension, each font embodying a series of magazines adapted to contain in column order type of a single character, the said magazines each having a delivery opening alined with the opening of the other magazines forming its font, and each of the said magazines forming an open sided channel wherein the type face may be viewed; a type selecting mechanism embodying extractors for removing the type successively from the said magazines, said extractors being arranged to travel transversely across the said fonts; a type holding mechanism mounted on said selecting mechanism and arranged to receive the type as extracted from the said magazines; a movable member arranged to hold the type when so received by the said holding member; a rocking shaft slidably connected with said type holder and adapted to elevate the same; means for rocking the said shaft in timed relation with the font selecting mechanism; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

31. A type setting machine comprising a font battery embodying a plurality of fonts arranged in lateral straight line extension and radially disposed about a common center, each font embodying a series of magazines adapted to contain in column order type of a single character, said magazines each having a delivery opening alined with the opening of the other magazines forming its font; a type selecting mechanism embodying extractors for removing the type successively from the said magazines, said extractors being arranged to extend within the delivery end of said magazines; a type holding mechanism mounted on said selecting mechanism arranged to receive the type as extracted from the said magazines; a movable member arranged to hold the type when so received; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

32. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof; a type selecting mechanism embodying extractors for removing the type successively from the said magazines, said extractors being arranged to be inserted in the delivery end of said magazines; a type holding mechanism mounted on said selecting mechanism and arranged to receive the type as extracted from the said magazines;

a movable member mounted on said holding mechanism to retain the type when so received; means for elevating the said holder in timed relation with the extension of said extractors to extend the said holder under the type as extracted; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

33. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines, said extractors being arranged to travel transversely across the said fonts; a type holding mechanism mounted on said selecting mechanism and arranged to receive the type as extracted from the said magazines; a movable member arranged to hold the type when so received by the said holding member; a rocking shaft slidably connected with said type holder and adapted to elevate the same; means for rocking the said shaft in timed relation with the font selecting mechanism; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

34. A type setting machine comprising a font battery embodying a plurality of fonts the delivery ends whereof are disposed in lateral straight line extension, each font embodying a series of magazines adapted to contain in column order type of a single character, the said magazines each having a delivery opening alined with the opening of the other magazines forming its font, and each of the said magazines forming an open sided channel wherein the type face may be viewed; a type selecting mechanism embodying extractors for removing the type successively from the said magazines, said extractors being arranged to travel transversely across the said fonts and to be extended within the deivery end of the said magazines when extended; a type holding mechanism mounted on said selecting mechanism arranged to receive the type as extracted from the said magazines; a movable grasping member arranged to hold the type when so received; a rocking shaft slidably connected with said extractors to extend the same within the delivery end of said magazines; a rocking shaft slidably connected with said type holder to elevate the same under the type being extracted; means connecting the said rocking shafts for extending the said extractors and for elevating the said type holders to rock the said shafts in timed relation; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

35. A type setting machine comprising a font battery embodying a plurality of fonts arranged in lateral straight line extension and radially disposed about a common center, each font embodying a series of magazines adapted to contain in column order type of a single character, said magazines each having a delivery opening alined with the opening of the other magazines forming its font; a type selecting mechanism embodying extractors for removing the type successively from the said magazines, said extractors being arranged to be inserted in the delivery end of said magazines; a type holding mechanism mounted on said selecting mechanism and arranged to receive the type as extracted from the said magazines; a movable member mounted on said holding mechanism to retain the type when so received; means for elevating the said holder in timed relation with the extension of said extractors to extend the said holder under the type as extracted; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

36. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof; a type selecting mechanism embodying extractors for removing the type successively from the said magazines, said extractors being arranged to travel transversely across the said fonts; a type holding mechanism mounted on said selecting mechanism and arranged to receive the type as extended from the said magazines; a movable member arranged to hold the type when so received by the said holding member; a rocking shaft slidably connected with said type holder and adapted to elevate the same; means for rocking the said shaft in timed relation with the font selecting mechanism; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

37. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines, said extractors being arranged to travel transversely across the said fonts and to be extended within the delivery end of the said magazines when extended; a type holding mechanism mounted on said selecting mechanism arranged to receive the type as extracted from the said magazines; a movable grapsing member arranged to hold the type when so received; a rocking shaft slidably connected with said extractors to extend the same within the delivery end of said magazines; a rocking shaft slidably connected with said type holder to elevate the same under the type being extracted; means connecting the said rocking shafts for extending the said extractors and for elevating the said type holders to rock the said shafts in timed relation; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

38. A type setting machine comprising a font battery embodying a plurality of fonts the delivery ends whereof are disposed in lateral straight line extension, each font embodying a series of magazines adapted to contain in column order type of a single character, the said magazines each having a delivery opening alined with the opening of the other magazines forming its font, and each of the said magazines forming an open sided channel wherein the type face may be viewed; a type selecting mechanism embodying extractors for removing the type successively from the said magazines, said extractors being arranged to travel transversely across the said fonts and to be extended within the delivery end of the said magazines when extended; a type holding mechanism mounted on said selecting mechanism arranged to receive the type as extracted from the said magazines; a movable grasping member arranged to hold the type when so received; a rocking shaft slidably connected with said extractors to extend the same within the delivery end of said magazines; a rocking shaft slidably connected with said type holder to elevate the same under the type being extracted; means connecting the rocking shafts for extending the said extractors and for elevating the said type holders to rock the said shafts in timed relation; means for rotatably reversing the said holders; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

39. A type setting machine comprising a font battery embodying a plurality of fonts arranged in lateral straight line extension and radially disposed about a common center, each font embodying a series of magazines adapted to contain in column order type of a single character, said magazines each having a delivery opening alined with the opening of the other magazines forming its font; a type selecting mechanism embodying extractors for removing the type successively from the said magazines, said extractors being arranged to travel transversely across the said fonts; a type holding mechanism mounted on said selecting mechanism and arranged to receive the type as extended from the said magazines; a movable member arranged to hold type when so received by the said holding member; a rocking shaft slidably connected with said type holder and adapted to elevate the same; means for rocking the said shaft in timed relation with the font selecting mechanism; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

40. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof; a type selecting mechanism embodying extractors for removing the type successively from the said magazines, said extractors being arranged to travel transversely across the said fonts and to be extended within the delivery end of the said magazines when extended; a type holding mechanism mounted on said selecting mechanism arranged to receive the type as extracted from the said magazines; a movable grasping member arranged to hold type when so received; a rocking shaft slidably connected with said extractors to extend the same within the delivery end of said magazines; a rocking shaft slidably connected with said type holder to elevate the same under the type being extracted; means connecting the said rocking shafts for extending the said extractors and for elevating the said type holders to rock the said shafts in timed relation; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

41. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines, said extractors being arranged to travel transversely across the said fonts and to be extended within the delivery end of the said magazines when extended; a type holding mechanism mounted on said selecting mechanism arranged to receive the type as extracted from the said magazines; a movable grasping member arranged to hold the type when so received; a rocking shaft slidably connected with said extractors to extend the same within the delivery end of said magazines; a rocking shaft slidably connected with said type holder to elevate the same under the type being extracted; means connecting the rocking shafts for extending the said extractors and for elevating the said type holders to rock the said shafts in timed relation; means for rotatably reversing the said holders; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

42. A type setting machine comprising a font battery embodying a plurality of fonts the delivery ends whereof are disposed in lateral straight line extension, each font embodying a series of magazines adapted to contain in column order type of a single character, the said magazines each having a delivery opening alined with the opening of the other magazines forming its font, and each of the said magazines forming an open sided channel wherein the type face may be viewed; a type selecting mechanism embodying extractors for removing the type successively from the said magazines, said extractors arranged to travel transversely across the said fonts, and extensible to extract the type from said magazines; a type holding mechanism mounted on said selecting mechanism arranged to receive the type as extracted from the said magazines; a movable member arranged to hold the type when so received; a rocking shaft slidably connected with the said type holding mechanism; a chain of gears interposed between said rocking shaft and said movable member, said chain being arranged to rotate the said holding member when the said shaft is rocked; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

43. A type setting machine comprising a font battery embodying a plurality of fonts arranged in lateral straight line extension and radially disposed about a common center, each font embodying a series of magazines adapted to contain in column order type of a single character, said magazines each having a delivery opening alined with the opening of the other magazines forming its font; a type selecting mechanism embodying extractors for removing the type successively from the said magazines, said extractors being arranged to travel transversely across the said fonts and to be extended within the delivery end of the said magazines when extended; a type holding mechanism mounted on said selecting mechanism arranged to receive the type as extracted from the said magazines; a movable grasping member arranged to hold the type when so received; a rocking shaft slidably connected with said extractors to extend the same within the delivery end of said magazines; a rocking shaft slidably connected with said type holder to elevate the same under the type being extracted; means connecting the said rocking shafts for extending the said extractors and for elevating the said type holders to rock the said shafts in timed relation; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

44. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof; a type selecting mechanism embodying extractors for removing the type successively from the said magazines, said extractors being arranged to travel transversely across the said fonts and to be extended within the delivery end of the said magazines when extended; a type holding mechanism mounted on said selecting mechanism arranged to receive the type as extracted from the said magazines; a movable grasping member arranged to hold the type when so received; a rocking shaft slidably connected with said extractors to extend the same within the delivery end of said magazines; a rocking shaft slidably connected with said type holder to elevate the same under the type being extracted; means connecting the rocking shafts for extending the said extractors and for elevating the said type holders to rock the said shafts in timed relation; means for rotatably reversing the said holders; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

45. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines, said extractors arranged to travel transversely across the said fonts, and extensible to extract the type from said magazines; a type holding mechanism mounted on said selecting mechanism arranged to receive the type as extracted from the said magazines; a movable member arranged to hold the type when so received; a rocking shaft slidably connected with the said type holding mechanism; a chain of gears interposed between said rocking shaft and said movable member, said chain being arranged to rotate the said holding member when the said shaft is rocked; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

46. A type setting machine comprising a font battery embodying a plurality of fonts the delivery ends whereof are disposed in lateral straight line extension, each font embodying a series of magazines adapted to contain in column order type of a single character, the said magazines each having a delivery opening alined with the opening of the other magazines forming its font, and each of the said magazines forming an open sided channel wherein the type face may be viewed; a type selecting mechanism embodying extractors for removing the type successively from the said magazines, said extractors being arranged to travel transversely across the said fonts; a type holding mechanism mounted on said selecting mechanism arranged to receive the type as extracted from the said magazines; a movable jaw mounted on said holding mechanism to grasp the type when received by said holding mechanism; a rocking shaft slidably connected with said extractors and adapted to elevate the same within the delivery end of the said magazines; a rocking shaft slidably connected with said type holding mechanism adapted to elevate the same to the type as the same are delivered from the said magazines; a chain of gears mounted upon the said holding mechanism and interposed between the said shaft and movable jaw thereof, said chain being disposed to spread the said holding jaw when and as the said holding mechanism is extended by the said rocking shaft; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

47. A type setting machine comprising a font battery embodying a plurality of fonts arranged in lateral straight line extension and radially disposed about a common center, each font embodying a series of magazines adapted to contain in column order type of a single character, said magazines each having a delivery opening alined with the opening of the other magazines forming its font; a type selecting mechanism embodying extractors for removing the type successively from the said magazines, said extractors being arranged to travel transversely across the said fonts and to be extended within the delivery end of the said magazines when extended; a type holding mechanism mounted on said selecting mechanism arranged to receive the type as extracted from the said magazines; a movable grasping member arranged to hold the type when so received; a rocking shaft slidably connected with said extractors to extend the same within the delivery end of said magazines; a rocking shaft slidably connected with said type holder to elevate the same under the type being extracted; means connecting the rocking shafts for extending the said extractors and for elevating the said type holders to rock the said shafts in timed relation; means for rotatably reversing the said holders; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

48. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof; a type selecting mechanism embodying extractors for removing the type successively from the said magazines, said extractors arranged to travel transversely across the said fonts, and extensible to extract the type from said magazines; a type holding mechanism mounted on said selecting mechanism arranged to receive the type as extracted from the said magazines; a movable member arranged to hold the type when so received; a rocking shaft slidably connected with the said type holding mechanism; a chain of gears interposed between said rocking shaft and said movable member, said chain being arranged to rotate the said holding member when the said shaft is rocked; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

49. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines, said extractors being arranged to travel transversely across the said fonts; a type holding mechanism mounted on said selecting mechanism arranged to receive the type as extracted from the said magazines; a movable jaw mounted on said holding mechanism to grasp the type when received by said holding mechanism; a rocking shaft slidably connected with said extractors and adapted to elevate the same within the delivery end of the said magazines; a rocking shaft slidably connected with said type holding mechanism adapted to elevate the same to the type as the same are delivered from the said magazines; a chain of gears mounted upon the said holding mechanism and interposed between the said shaft and movable jaw thereof, said chain being disposed to spread the said holding jaw when and as the said holding mechanism is extended by the said rocking shaft; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

50. A type setting machine comprising a font battery embodying a plurality of fonts arranged in lateral straight line extension and radially disposed about a common center, each font embodying a series of magazines adapted to contain in column order type of a single character, said magazines each having a delivery opening alined with the opening of the other magazines forming its font; a type selecting mechanism embodying extractors for removing the type successively from the said magazines, said extractors arranged to travel transversely across the said fonts, and extensible to extract the type from said magazines; a type holding mechanism mounted on said selecting mechanism arranged to receive the type as extracted from the said magazines; a movable member arranged to hold the type when so received; a rocking shaft slidably connected with the said type holding mechanism; a chain of gears interposed between said rocking shaft and said movable member, said chain arranged to rotate the said holding member when the said shaft is rocked; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

51. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof; a type selecting mechanism embodying extractors for removing the type successively from the said magazines, said extractors being arranged to travel transversely across the said fonts; a type holding mechanism mounted on said selecting mechanism arranged to receive the type as extracted from the said magazines; a movable jaw mounted on said holding mechanism to grasp the type when received by said holding mechanism; a rocking shaft slidably connected with said extractors and adapted to elevate the same within the delivery end of the said magazines; a rocking shaft slidably connected with said type holding mechanism adapted to elevate the same to the type as the same are delivered from the said magazines; a chain of gears mounted upon the said holding mechanism and interposed between the said shaft and movable jaw thereof, said chain being disposed to spread the said holding jaw when and as the said holding mechanism is extended by the said rocking shaft; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

52. A type setting machine comprising a font battery embodying a plurality of fonts the delivery ends whereof are disposed in lateral straight line extension, each font embodying a series of magazines adapted to contain in column order type of a single character, the said magazines each having a delivery opening alined with the opening of the other magazines forming its font, and each of the said magazines forming an open sided channel wherein the type face may be viewed; a type selecting mechanism embodying reciprocated members extensible to extract the type from said magazines; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

53. A type setting machine comprising a font battery embodying a plurality of fonts arranged in lateral straight line extension and radially disposed about a common center; each font embodying a series of magazines adapted to contain in column order type of a single character, said magazines each having a delivery opening alined with the opening of the other magazines forming its font; a type selecting mechanism embodying extractors for removing the type successively from the said magazines, said extractors being arranged to travel transversely across the said fonts; a type holding mechanism mounted on said selecting mechanism arranged to receive the type as extracted from the said magazines; a movable jaw mounted on said holding mechanism to grasp the type when received by said holding mechanism; a rocking shaft slidably connected with said extractors and adapted to elevate the same within the delivery end of the said magazines; a rocking shaft slidably connected with said type holding mechanism adapted to elevate the same to the type as the same are delivered from the said magazines; a chain of gears mounted upon the said holding mechanism and interposed between the said shaft and movable jaw thereof, said chain being disposed to spread the said holding jaw when and as the said holding mechanism is extended by the said rocking shaft; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

54. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof; a type selecting mechanism embodying reciprocated members extensible to extract the type from said magazines; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

55. A type setting machine comprising a font battery embodying a plurality of fonts the delivery ends whereof are disposed in lateral straight line extension, each font embodying a series of magazines adapted to contain in column order type of a single character, the said magazines each having a delivery opening alined with the opening of the other magazines forming its font, and each of the said magazines forming an open sided channel wherein the type face may be viewed; a type selecting mechanism embodying extractors for removing the type successively from the said magazines, said type selecting mechanism being arranged to travel transversely across the said fonts; a type holding mechanism mounted on said selecting mechanism and arranged to receive the type as extracted from the said fonts; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

56. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines; a rocking shaft slidably connected with said extractors to extend the same within the delivery end of said magazines; means for rocking the said shaft; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

57. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof; a type selecting mechanism embodying reciprocated members extensible to extract the type from said magazines; a font selecting mechanism arranged to regulate the stations at which the said reciprocated members operate; a line forming mechanism embodying a holder and an assembling device arranged to feed type into the said holder and to maintain them in position therein; and a conveying mechanism arranged to transfer the said type from the said fonts to the line forming mechanism.

58. A type setting machine comprising a font battery embodying a plurality of fonts the delivery ends whereof are disposed in lateral straight line extension, each font embodying a series of magazines adapted to contain in column order type of a single character, the said magazines each having a delivery opening alined with the opening of the other magazines forming its font, and each of the said magazines forming an open sided channel wherein the type face may be viewed; a type selecting mechanism embodying extractors for removing the type successively from the said magazines; a rocking shaft slidably connected with said extractors to extend the same within the delivery end of said magazines; means for rocking the said shaft; a font selecting mechanism arranged to regulate the stations at which the said extractors operate; a line forming mechanism embodying a holder and an assembling device arranged to feed type into the said holder and to maintain them in position therein; and a conveying mechanism arranged to transfer the said type from the said fonts to the line forming mechanism.

59. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines, said type selecting mechanism being arranged to travel transversely across the said fonts; a type holding mechanism mounted on said selecting mechanism and arranged to receive the type as extracted from the said fonts; a font selecting mechanism embodying a plurality of rocking shafts slidably connected with said selecting mechanisms; means for rocking said shafts at certain stations in the rotary path of said shafts; a line forming mechanism embodying a holder and an assembling device arranged to feed type into the said holder and to maintain them in position therein; and a conveying mechanism arranged to transfer the said type from the said fonts to the line forming mechanism.

60. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying reciprocated members extensible to extract the type from said magazines; a font selecting mechanism to regulate the stations at which the said extractors operate, embodying a plurality of rocking members operatively connected with said extractors to cause the same to operate in unison with the said rocking members; a line forming mechanism embodying a holder and an assembling device arranged to feed type into the said holder and to maintain them in position therein; and a conveying mechanism arranged to transfer the said type from the said fonts to the line forming mechanism.

61. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying reciprocated members extensible to extract the type from said magazines; a font selecting mechanism to regulate the stations at which the said reciprocated members operate, embodying a plurality of rocking shafts flexibly connected with said members and with the operative elements thereof; a plurality of fixed interference members arranged to rock the said shafts successively and in timed relation each to the other; a line forming mechanism embodying a holder and an assembling device arranged to feed type into the said holder and to maintain them in position therein; and a conveying mechanism arranged to transfer the said type from the said fonts to the line forming mechanism.

62. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying reciprocating members extensible to extract the type from said magazines; a font selecting mechanism to regulate the stations at which the said extractors operate, embodying a plurality of rocking members operatively connected with said reciprocated members to cause the same to operate in unison with said rocking members; a plurality of tracks shaped to rock the said rocking members; a line forming mechanism embodying a holder and an assembling device arranged to feed type into the said holder and to maintain them in position therein; and a conveying mechanism arranged to transfer the said type from the said fonts to the line forming mechanism.

63. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying reciprocated members extensible to extract the type from said magazines; a font selecting mechanism to regulate the stations at which the said reciprocated members operate, embodying a plurality of rocking members operatively connected with said reciprocated members to cause the same to operate in unison with said rocking members; a plurality of tracks disposed in pairs and arranged to rock the said rocking members successively and in timed relation each to the other; a line forming mechanism embodying a holder and an assembling device arranged to feed type into the said holder and to maintain them in position therein; and a conveying mechanism arranged to transfer the said type from the said fonts to the line forming mechanism.

64. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying reciprocated members extensible to extract the type from said magazines; a font selecting mechanism to regulate the stations at which the said reciprocated members operate, embodying a plurality of rocking shafts slidably connected with said reciprocated members and having radial extensions to regulate the rotary position of said shafts; a plurality of tracks disposed in pairs and arranged to shift the said extensions successively to rock the said shafts in timed relation each to the other; a line forming mechanism embodying a holder and an assembling device arranged to feed type into the said holder and to maintain them in position therein; and a conveying mechanism arranged to transfer the said type from the said fonts to the line forming mechanism.

65. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying reciprocated members extensible to extract the type from said magazines; a font selecting mechanism to regulate the stations at which the said reciprocated members operate, embodying a plurality of rocking shafts slidably connected with said reciprocated members, said shafts having lateral extensions; a plurality of tracks disposed in pairs to regulate the position of said extensions to rock the said shafts in timed relation each to the other; means for locking the said extensions and shafts in operative relation; a line forming mechanism embodying a holder and an assembling device arranged to feed type into the said holder and to maintain them in position therein; and a conveying mechanism arranged to transfer the said type from the said fonts to the line forming mechanism.

66. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying reciprocated members extensible to extract type from said magazines; a font selecting mechanism to regulate the stations at which the said reciprocated members operate, embodying a plurality of rocking shafts slidably connected with said reciprocated members, said shafts having lateral extensions; a plurality of tracks disposed in pairs to regulate the position of said extensions to rock the said shafts in timed relation each to the other; selective means for locking the said extensions and shafts in operative relation; a line forming mechanism embodying a holder and an assembling device arranged to feed type into the said holder and to maintain them in position therein; and a conveying mechanism arranged to transfer the said type from the said fonts to the line forming mechanism.

67. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying reciprocated members extensible to extract the type from said magazines; a font selecting mechanism to regulate the stations at which the said reciprocated members operate, embodying a plurality of rocking shafts slidably connected with said reciprocated members and type holders, said shafts having lateral extensions; a plurality of tracts disposed in pairs to regulate the position of said extensions to rock the said shafts in timed relation each to the other; key operated selective means for locking the said extensions and shafts in operative relation; a line forming mechanism embodying a holder and an assembling device arranged to feed type into the said holder and to maintain them in position therein; and a conveying mechanism arranged to transfer the said type from the said fonts to the line forming mechanism.

68. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying reciprocated members extensible to extract the type from said magazines; a font selecting mechanism to regulate the stations at which the said reciprocated members operate embodying a plurality of rocking shafts slidably connected with said reciprocated members and having lateral extensions; an engaging device adapted to lock the said shafts and extensions in fixed relation; a plurality of selective key bars adapted to be interposed in the path of said engaging device to operate the same; means for releasing the said extensions and shafts; a line forming mechanism embodying a holder and an assembling device arranged to feed type into the said holder and to maintain them in position therein; and a conveying mechanism arranged to transfer the said type from the said fonts to the line forming mechanism.

69. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font;

a feeding mechanism mounted in each of said magazines adapted to advance the column of type in each to present successively the type in said magazines at the delivery end thereof, said feeding mechanism being operatively connected with the type selecting mechanism; a type selecting mechanism embodying reciprocated members extensible to extract the type from said magazines; a font selecting mechanism to regulate the stations at which the said reciprocated members operate, embodying a plurality of rocking shafts slidably connected with said reciprocated members and having lateral extensions; locking devices adapted to lock the said shafts and extensions in fixed relation; a plurality of selective key bars adapted to be interposed in the path of said locking devices to cause the same to lock the said shafts and extensions; means disposed in the path of said extensions to release the same from the said shafts; a line forming mechanism embodying a holder and an assembling device arranged to feed type into the said holder and to maintain them in position therein; and a conveying mechanism arranged to transfer the said type from the said fonts to the line forming mechanism.

70. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying reciprocated members extensible to extract the type from said magazines; a font selecting mechanism to regulate the stations at which the said reciprocated members operate, embodying a series of rocking shafts arranged in pairs and rotatably mounted to be moved across the delivery ends of the said fonts successively; a plurality of shaft rocking devices loosely mounted on each pair of said shafts, said rocking devices on each pair equaling in number the said fonts; locking devices carried on said rocking devices arranged to fixedly connect said shafts and rocking devices; manually operated selective devices for operating the said locking devices, said selective devices equaling in number the said fonts; a plurality of interference devices disposed in the path of the said rocking devices to operate the same, said interference devices relative in number to the said fonts, and disposed in successive order and in relation to said fonts; a line forming mechanism embodying a holder and an assembling device arranged to feed type into the said holder and to maintain them in position therein; and a conveying mechanism arranged to transfer the said type from the said fonts to the line forming mechanism.

71. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying reciprocated members extensible to extract the type from said magazines; a font selecting mechanism to regulate the stations at which the said reciprocated members operate, embodying a series of rocking shafts arranged in pairs and rotatably mounted to be moved across the delivery ends of the said fonts successively; a plurality of shaft rocking devices loosely mounted on each pair of said shafts, said rocking devices on each pair equaling in number the said fonts; locking devices carried on said rocking devices arranged to fixedly connect said shafts and rocking devices; manually operated selective devices for operating the said locking devices, said selective devices equaling in number the said fonts; a plurality of interference devices disposed in the path of the said rocking devices to operate the same, said interference device relative in number to the said fonts, and disposed in successive order and in relation to said fonts; a releasing member to disengage the said locking devices from said shafts, said releasing member being disposed in line and in position to operate said locks after the said shafts have passed the last of the fonts composing the said battery; a line forming mechanism embodying a holder and an assembling device arranged to feed type into the said holder and to maintain them in position therein; and a conveying mechanism arranged to transfer the said type from the said fonts to the line forming mechanism.

72. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines; a rocking shaft slidably connected with the said extractors to extend the same within the delivery end of said magazines; means for rocking the said shaft; a font selecting mechanism embodying a plurality of rocking shafts slidably connected with said selecting mechanisms; means for locking the said shafts at certain stations in the rotary path of said shafts; a line forming mechanism embodying a holder and an assembling device arranged to feed type into the said holder and to maintain them in position therein; and a conveying mechanism arranged to transfer the said type from the said fonts to the line forming mechanism.

73. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines; a rocking shaft slidably connected with said extractors to extend the same within the delivery end of said magazines; means for rocking the said shaft; a font selecting mechanism to regulate the stations at which the said extractors operate embodying a plurality of rocking members operatively connected with said extractors to cause the same to operate in unison with said rocking members; a line forming mechanism embodying a holder and an assembling device arranged to feed type into the said holder and to maintain them in position therein; and a conveying mechanism arranged to transfer the said type from the said fonts to the line forming mechanism.

74. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines; a rocking shaft slidably connected with said extractors to extend the same within the delivery end of said magazines; means for rocking the said shaft; a font selecting mechanism to regulate the stations at which the said extractors operate embodying a plurality of rocking shafts flexibly connected with said extractors and with the operative elements thereof; a plurality of fixed interference members arranged to rock the said shafts successively in timed relation each to the other; a line forming mechanism embodying a holder and an assembling device arranged to feed type into the said holder and to maintain them in position therein; and a conveying mechanism arranged to transfer the said type from the said fonts to the line forming mechanism.

75. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines; a rocking shaft slidably connected with the said extractors to extend the same within the delivery end of said magazines; means for rocking the said shaft; a font selecting mechanism to regulate the stations at which the said extractors operate, embodying a plurality of rocking members operatively connected with the said extractors to cause the same to operate in unison with said rocking members; a plurality of tracks shaped to rock the said rocking members; a line forming mechanism embodying a holder and an assembling device arranged to feed type into the said holder and to maintain them in position therein; and a conveying mechanism arranged to transfer the said type from the said fonts to the line forming mechanism.

76. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines; a rocking shaft slidably connected with the said extractors to extend the same within the delivery end of said magazines; means for rocking the said shaft; a font selecting mechanism to regulate the stations at which the said extractors operate, embodying a plurality of rocking members operatively connected with said extractors to cause the same to operate in unison with said rocking members; a plurality of tracks disposed in pairs and arranged to rock the said rocking members successively and in timed relation each to the other; a line forming mechanism embodying a holder and an assembling device arranged to feed type into the said holder and to maintain them in position therein; and a conveying mechanism arranged to transfer the said type from the said fonts to the line forming mechanism.

77. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines; a rocking shaft slidably connected with the said extractors to extend the same within the delivery end of said magazines; means for rocking the said shaft; a font selecting mechanism to regulate the stations at which the said extractors operate, embodying a plurality of rocking shafts slidably connected with said extractors and having radial extensions to regulate the rotary position of said shafts; a plurality of tracks disposed in pairs and arranged to shift the said extensions successively to rock the said shafts in timed relation each to the other; a line forming mechanism embodying a holder and an assembling device arranged to feed type into the said holder and to maintain them in position therein; and a conveying mechanism arranged to transfer the said type from the said fonts to the line forming mechanism.

78. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines; a rocking shaft slidably connected with the said extractors to extend the same within the delivery end of said magazines; means for rocking the said shaft; a font selecting mechanism to regulate the stations at which the said extractors operate, embodying a plurality of rocking shafts slidably connected with said extractors, said shafts having lateral extensions; a plurality of tracks disposed in pairs to regulate the position of said extensions to rock the said shafts in timed relation each to the other; means for locking the said extensions and shafts in operative relation; a line forming mechanism embodying a holder and an assembling device arranged to feed type into the said holder and to maintain them in position therein; and a conveying mechanism to transfer the said type from the said fonts to the line forming mechanism.

79. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines; a rocking shaft slidably connected with the said extractors to extend the same within the delivery end of said magazines; means for locking the said shaft; a font selecting mechanism to regulate the stations at which the said extractors operate, embodying a plurality of rocking shafts slidably connected with said extractors, said shafts having lateral extensions; a plurality of tracks disposed in pairs to regulate the position of said extensions to rock the said shafts in timed relation each to the other; selective means for locking the said extensions and shafts in operative relation; a line forming mechanism embodying a holder and an assembling device arranged to feed type into the said holder and to maintain them in position therein; and a conveying mechanism to transfer the said type from the said fonts to the line forming mechanism.

80. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines; a rocking shaft slidably connected with the said extractors to extend the same within the delivery end of said magazines; means for rocking the said shaft; a font selecting mechanism to regulate the stations at which the said extractors operate, embodying a plurality of rocking shafts slidably connected with said extractors, said shafts having lateral extensions; a plurality of tracks disposed in pairs to regulate the position of said extensions to rock the said shafts in timed relation each to the other; key operated selective means for locking the said extensions and shafts in operative relation; a line forming mechanism embodying a holder and an assembling device arranged to feed type into the said holder and to maintain them in position therein; and a conveying mechanism to transfer the said type from the said fonts to the line forming mechanism.

81. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines; a rocking shaft slidably connected with the said extractors to extend the same within the delivery end of said magazines; means for rocking the said shaft; a font selecting mechanism to regulate the stations at which the said extractors operate, embodying a plurality of rocking shafts slidably connected with said extractors and having lateral extensions; and engaging device adapted to lock the said shafts and extensions in fixed relation; a plurality of selective key bars adapted to be interposed in the path of said engaging device to operate the same; means for releasing the said extensions and shafts; a line forming mechanism embodying a holder and an assembling device arranged to feed type into the said holder and to maintain them in position therein; and a conveying mechanism arranged to transfer the said type from the said fonts to the line forming mechanism.

82. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines; a rocking shaft slidably connected with the said extractors to extend the same within the delivery end of said magazines; means for rocking the said shaft; a font selecting mechanism to regulate the stations at which the said extractors operate, embodying a plurality of rocking shafts slidably connected with said extractors and having lateral extensions; locking devices adapted to lock the said shafts and extensions in fixed relation; a plurality of selective key bars adapted to be interposed in the path of said locking devices to cause the same to lock the said shafts and extensions; means disposed in the path of said extensions to release the same from the said shafts; a line forming mechanism embodying a holder and an assembling device arranged to feed type into the said holder and to maintain them in position therein; and a conveying mechanism arranged to transfer the said type from the said fonts to the line forming mechanism.

83. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines; a rocking shaft slidably connected with the said extractors to extend the same within the delivery end of said magazines; means for rocking the said shaft; a font selecting mechanism to regulate the stations at which the said extractors operate, embodying a series of rocking shafts arranged in pairs and rotatably mounted to be moved across the delivery ends of said fonts successively; a plurality of shaft rocking devices loosely mounted on each pair of said shafts, said rocking devices on each pair equaling in number the said fonts; locking devices carried on said rocking devices arranged to fixedly connect said shafts and rocking devices; manually operated selective devices for operating the said locking devices, said selective devices equaling in number the said fonts; a plurality of interference devices disposed in the path of the said rocking devices to operate the same, said interference devices relative in number to the said fonts and disposed in successive order and in relation to said fonts; a line forming mechanism embodying a holder and an assembling device arranged to feed type into said holder and to maintain them in position therein; and a conveying mechanism arranged to transfer the said type from the said fonts to the line forming mechanism.

84. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines; a rocking shaft slidably connected with the said extractors to extend the same within the delivery end of said magazines; means for rocking the said shaft; a font selecting mechanism to regulate the stations at which the said extractors operate, embodying a series of rocking shafts arranged in pairs and rotatably mounted to be moved across the delivery ends of said fonts successively; a plurality of shaft rocking devices loosely mounted on each pair of shafts, said rocking devices on each pair equaling in number the said fonts; locking devices carried on said rocking devices arranged to fixedly connect said shafts and rocking devices; manually operated selective devices for operating the said locking devices, said selective devices equaling in number the said fonts; a plurality of interference devices disposed in the path of the said rocking devices to operate the same, said interference devices relative in number to the said fonts and disposed in successive order and in relation to said fonts; a releasing member to disengage the said locking devices, said releasing member being disposed in line and in position to operate said locks after the said shafts have passed the last of the fonts composing the said battery; a line forming mechanism embodying a holder and an assembling device arranged to feed type into said holder and to maintain them in position therein; and a conveying mechanism arranged to transfer the said type from the said fonts to the line forming mechanism.

85. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying reciprocated members extensible to extract the type from said magazines; a font selecting mechanism embodying a plurality of rocking shafts slidably connected with said selecting mechanisms; means for regulating the said shafts at certain stations in the rotary path of said shafts; a line forming mechanism embodying a holder and an assembling device arranged to feed type into said holder and to maintain them in position therein; and a conveying mechanism arranged to transfer the said type from the said fonts to the line forming mechanism.

86. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines, said type selecting mechanism being arranged to travel transversely across the said fonts; a type holding mechanism mounted on said selecting mechanism and arranged to receive the type as extracted from the said fonts; a font selecting mechanism to regulate the stations at which the said extractors operate, embodying a plurality of rocking members operatively connected with said extractors to cause the same to operate in unison with said rocking members; a line forming mechanism embodying a holder and an assembling device arranged to feed type into the said holder and to maintain them in position therein; and a conveying mechanism arranged to transfer the said type from the said fonts to the line forming mechanism.

87. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines, said type selecting mechanism being arranged to travel transversely across the said fonts; a type holding mechanism mounted on said selecting mechanism and arranged to receive the type as extracted from the said fonts; a font selecting mechanism to regulate the stations at which the said extractors operate embodying a plurality of rocking shafts flexibly connected with said extractors and with the operative elements thereof; a plurality of fixed interference members arranged to rock the said shafts successively and in timed relation each to the other; a line forming mechanism embodying a holder and an assembling device arranged to feed type into said holder and to maintain them in position therein; and a conveying mechanism arranged to transfer the said type from the said fonts to the line forming mechanism.

88. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines, said type selecting mechanism being arranged to travel transversely across the said fonts; a type holding mechanism mounted on said selecting mechanism and arranged to receive the type as extracted from the said fonts; a font selecting mechanism to regulate the stations at which the said extractors operate embodying a plurality of rocking members operatively connected with said extractors to cause the same to operate in unison with said rocking members; a plurality of tracks shaped to rock the said rocking members; a line forming mechanism embodying a holder and an assembling device arranged to feed type into the said holder and to maintain them in position therein; and a conveying mechanism arranged to transfer the said type from the said fonts to the line forming mechanism.

89. A type setting machine comprising a font battery embodying a plurality of fonts disposed in lateral straight line extension, said fonts embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines, said type selecting mechanism being arranged to travel transversely across the said fonts; a type holding mechanism mounted on said selecting mechanism and arranged to receive the type as extracted from the said fonts; a font selecting mechanism to regulate the stations at which the extractors operate, embodying a plurality of rocking members operatively connected with said extractors and with said type holders to cause the same to operate in unison with said rocking members; a plurality of tracks disposed in pairs and arranged to rock the said rocking members successively and in timed relation each to the other; a line forming mechanism embodying a holder and an assembling device arranged to feed type into said holder and to maintain them in position therein; and a conveying mechanism arranged to transfer the said type from the said fonts to the line forming mechanism.

90. A type setting machine comprising a font battery embodying a plurality of fonts disposed in lateral straight line extension, said fonts embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines, said type selecting mechanism being arranged to travel transversely across the said fonts; a type holding mechanism mounted on said selecting mechanism and arranged to receive the type as extracted from the said fonts; a font selecting mechanism to regulate the stations at which the said extractors operate embodying a plurality of rocking shafts slidably connected with said extractors and said type holders and having radial extensions to regulate the rotary position of said shafts; a plurality of tracks disposed in pairs and arranged to shift the said extensions successively to rock the said shafts in timed relation each to the other; a line forming mechanism embodying a holder and an assembling device arranged to feed type into said holder and to maintain them in position therein; and a conveying mechanism arranged to transfer the said type from the said fonts to the line forming mechanism.

91. A type setting machine comprising a font battery embodying a plurality of fonts disposed in lateral straight line extension, said fonts embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines, said type selecting mechanism being arranged to travel transversely across the said fonts; a type holding mechanism mounted on said selecting mechanism and arranged to receive the type as extracted from the said fonts; a font selecting mechanism to regulate the stations at which the said extractors operate embodying a plurality of rocking shafts slidably connected with said extractors and type holders, said shafts having lateral extensions; a plurality of tracks disposed in pairs to regulate the position of said extractors to rock the said shafts in timed relation each to the other; means for locking the said extensions and shafts in operative relation; a line forming mechanism embodying a holder and an assembling device arranged to feed type into said holder and to maintain them in position therein; and a conveying mechanism arranged to transfer the said type from the said fonts to the line forming mechanism.

92. A type setting machine comprising a font battery embodying a plurality of fonts disposed in lateral straight line extension, said fonts embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines, said type selecting mechanism being arranged to travel transversely across the said fonts; a type holding mechanism mounted on said selecting mechanism and arranged to receive the type as extracted from the said fonts; a font selecting mechanism to regulate the stations at which the said extractors operate embodying a plurality of rocking shafts slidably connected with said extractors and type holders, said shafts having lateral extensions; a plurality of tracks disposed in pairs to regulate the position of said extractors to rock the said shafts in timed relation each to the other; selective means for locking the said extensions and shafts in operative relation; a line forming mechanism embodying a holder and an assembling device arranged to feed type into said holder and to maintain them in position therein; and a conveying mechanism arranged to transfer the said type from the said fonts to the line forming mechanism.

93. A type setting machine comprising a font battery embodying a plurality of fonts disposed in lateral straight line extension, said fonts embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines, said type selecting mechanism being arranged to travel transversely across the said fonts; a type holding mechanism mounted on said selecting mechanism and arranged to receive the type as extracted from the said fonts; a font selecting mechanism to regulate the stations at which the said extractors operate embodying a plurality of rocking shafts slidably connected with said extractors and type holders, said shafts having lateral extensions; a plurality of tracks disposed in pairs to regulate the position of said extractors to rock the said shafts in timed relation each to the other; key operative selective means for locking the said extensions and shafts in operative relation; a line forming mechanism embodying a holder and an assembling device arranged to feed type into said holder and to maintain them in position therein; and a conveying mechanism arranged to transfer the said type from the said fonts to the line forming mechanism.

94. A type setting machine comprising a font battery embodying a plurality of fonts disposed in lateral straight line extension, said fonts embodying a series of magazines adapted to contain in column order type of a single character, said magazines each having a delivery opening alined with the opening of the other magazines forming its font: a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines, said type selecting mechanism being arranged to travel transversely across the said fonts; a type holding mechanism mounted on said selecting mechanism and arranged to receive the type as extracted from the said fonts; a font selecting mechanism to regulate the stations at which the said extractors operate embodying a plurality of rocking shafts slidably connected with said extractors and having lateral extensions; an engaging device adapted to lock the said shafts and extensions in fixed relation; a plurality of selective key bars adapted to be interposed in the path of said engaging device to operate the same; means for releasing the said extensions and shafts; a line forming mechanism embodying a holder and an assembling device arranged to feed type into said holder and to maintain them in position therein; and a conveying mechanism arranged to transfer the said type from the said fonts to the line forming mechanism.

95. A type setting machine comprising a font battery embodying a plurality of fonts disposed in lateral straight line extension, said fonts embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines, said type selecting mechanism being arranged to travel transversely across the said fonts; a type holding mechanism mounted on said selecting mechanism and arranged to receive the type as extracted from the said fonts; a font selecting mechanism to regulate the stations at which the said extractors operate embodying a plurality of rocking shafts slidably connected with said extractors and said type holders and having lateral extensions; locking devices adapted to lock the said shafts and extensions in fixed relation; a plurality of selective key bars adapted to be interposed in the path of said locking devices to cause the same to lock the said shafts and extensions; means disposed in the path of said extensions to release the same from the said shafts; a line forming mechanism embodying a holder and an assembling device arranged to feed type into said holder and to maintain them in position therein; and a conveying mechanism arranged to transfer the said type from the said fonts to the line forming mechanism.

96. A type setting machine comprising a font battery embodying a plurality of fonts disposed in lateral straight line extension, said fonts embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines, said type selecting mechanism being arranged to travel transversely across the said fonts; a type holding mechanism mounted on said selecting mechanism and arranged to receive the type as extracted from the said fonts; a font selecting mechanism to regulate the stations at which the said extractors operate embodying a series of rocking shafts arranged in pairs and rotatably mounted to be moved across the delivery ends of the said fonts successively; a plurality of shaft rocking devices loosely mounted on each pair of said shafts, said rocking devices on each pair equaling in number the said fonts; locking devices carried on said rocking devices arranged to fixedly connect said shafts and rocking devices; manually operated selective devices for operating the said locking devices, said selective devices equaling in number the said fonts; a plurality of interference devices disposed in the path of the said rocking devices to operate the same, said interference devices relative in number to the said fonts and disposed in successive order and in relation to said fonts; a line forming mechanism embodying a holder and an assembling device arranged to feed type into said holder and to maintain them in position therein; and a conveying mechanism arranged to transfer the said type from the said fonts to the line forming mechanism.

97. A type setting machine comprising a font battery embodying a plurality of fonts disposed in lateral straight line extension, said fonts embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines, said type selecting mechanism being arranged to travel transversely across the said fonts; a type holding mechanism mounted on said selecting mechanism and arranged to receive the type as extracted from the said fonts; a font selecting mechanism to regulate the stations at which the said extractors operate embodying a series of rocking shafts arranged in pairs and rotatably mounted to be moved across the delivery ends of the said fonts successively; a plurality of shaft rocking devices loosely mounted on each pair of said shafts, said rocking devices on each pair equaling in number the said fonts; locking devices carried on said rocking devices arranged to fixedly connect the said shafts and rocking devices; manually operated selective devices for operating the said locking devices, said selective devices equaling in number the said fonts; a plurality of interference devices disposed in the path of the said rocking devices to operate the same, said interference devices relative in number to the said fonts and disposed in successive order and in relation to the said fonts; a releasing member to disengage the said locking devices from said shafts, said releasing member being disposed in line and in position to operate said locks after the said shafts have passed the last of the fonts composing the said battery; a line forming mechanism embodying a holder and an assembling device arranged to feed type into said holder and to maintain them in position therein; and a conveying mechanism arranged to transfer the said type from the said fonts to the line forming mechanism.

98. A type setting machine comprising a font battery embodying a plurality of fonts disposed in lateral straight line extension, said fonts embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines, said extractors being arranged to extend within the delivery end of said magazines; a type holding mechanism mounted on said selecting mechanism arranged to receive the type as extracted from the said magazines; a movable member arranged to hold the type when so received; a font selecting mechanism embodying a plurality of rocking shafts slidably connected with said selecting mechanisms; means for regulating said shafts at certain stations in the rotary path of said shafts; a line forming mechanism embodying a holder and an assembling device arranged to feed type into said holder and to maintain them in position therein; and a conveying mechanism arranged to transfer the said type from the said fonts to the line forming mechanism.

99. A type setting machine comprising a font battery embodying a plurality of fonts the delivery ends whereof are disposed in lateral straight line extension, each font embodying a series of magazines adapted to contain in column order type of a single character, said magazines each having a delivery opening alined with the opening of the other magazines forming its font, and each of said magazines forming an open sided channel wherein the type face may be viewed; a type selecting mechanism embodying extractors for removing the type successively from the said magazines, said extractors being arranged to be inserted in the delivery end of said magazines; a type holding mechanism mounted on said selecting mechanism and arranged to receive the type as extracted from the said magazines; a movable member mounted on said holder to retain the type when so received; means for elevating the said holder in timed relation with the extension of said extractors to extend the said holder under the type as extracted; a font selecting mechanism to regulate the stations at which the said extractors operate embodying a plurality of rocking members operatively connected with said extractors and with said type holders to cause the same to operate in unison with said rocking members; a line forming mechanism embodying a holder and an assembling device arranged to feed type into said holder and to maintain them in position therein; and a conveying mechanism arranged to transfer the said type from the said fonts to the line forming mechanism.

100. A type setting machine comprising a font battery embodying a plurality of fonts the delivery ends whereof are disposed in lateral straight line extension, each font embodying a series of magazines adapted to contain in column order type of a single character, said magazines each having a delivery opening alined with the opening of the other magazines forming its font, and each of said magazines forming an open sided channel wherein the type face may be viewed; a type selecting mechanism embodying extractors for removing the type successively from the said magazines, said extractors being arranged to travel transversely across the said fonts; a type holding mechanism mounted on said selecting mechanism and arranged to receive the type as extracted from the said magazines; a movable member arranged to hold the type when so received by the said holding member; a rocking shaft slidably connected with said type holder and adapted to elevate the same; means for rocking the said shaft in timed relation with the font selecting mechanism; a font selecting mechanism to regulate the stations at which the said extractors operate embodying a plurality of rocking shafts slidably connected with said extractors and type holders, said shafts having lateral extensions; a plurality of tracks disposed in pairs to regulate the position of said extensions to rock the said shafts in timed relation each to the other; selective means for locking the said extensions and shafts in operative relation; a line forming mechanism embodying a holder and an assembling device arranged to feed type into said holder and to maintain them in position therein; and a conveying mechanism arranged to transfer the said type from the said fonts to the line forming mechanism.

101. A type setting machine comprising a font battery embodying a plurality of fonts the delivery ends whereof are disposed in lateral straight line extension, each font embodying a series of magazines adapted to contain in column order type of a single character, said magazines each having a delivery opening alined with the opening of the other magazines forming its font, and each of said magazines forming an open sided channel wherein the type face may be viewed; a type selecting mechanism embodying extractors for removing the type successively from the said magazines, said extractors being arranged to travel transversely across the said fonts and to be extended within the delivery end of the said magazines when extended; a type holding mechanism mounted on said selecting mechanism arranged to receive the type as extracted from the said magazines; a movable grasping member arranged to hold the type when so received; a rocking shaft slidably connected with said extractors to extend the same within the delivery end of said magazines; a rocking shaft slidably connected with said type holders to elevate the same under the type being extracted; means connecting the said rocking shafts for extending the said extractors and for elevating the said type holders to rock the said shafts in timed relation; a font selecting mechanism to regulate the stations at which the said extractors operate embodying a plurality of rocking shafts slidably connected with said extractors and said type holders and having lateral extensions; locking devices adapted to lock the said shafts and extensions in fixed relation; a plurality of selective key bars adapted to be interposed in the path of said locking devices to cause the same to lock the said shafts and extensions; means disposed in the path of said extensions to release the same from the said shafts; a line forming mechanism embodying a holder and an assembling device arranged to feed type into said holder and to maintain them in position therein; and a conveying mechanism arranged to transfer the said type from the said fonts to the line forming mechanism.

102. A type setting machine comprising a font battery embodying a plurality of fonts disposed in lateral straight line extension, each embodying a series of magazines adapted to contain in column order type of a single character; said magazines each having a delivery opening alined with the opening of the other magazines forming its font; a feeding mechanism adapted to advance the column of type in each to present successively the type in said magazines at the delivery end thereof, said feeding mechanism being operatively connected with the type selecting mechanism; a type selecting mechanism embodying extractors for removing the type successively from the said magazines, said extractors being arranged to travel transversely across the said fonts and to be extended within the delivery end of the said magazines when extended; a type holding mechanism mounted on said selecting mechanism arranged to receive the type as extracted from the said magazines; a movable grasping member arranged to hold the type when so received; a rocking shaft slidably connected with said extractors to extend the same within the delivery end of said magazines; a rocking shaft slidably connected with said type holders to elevate the same under the type being extracted; means connecting the said rocking shafts for extending the said extractors and for elevating the said type holders to rock the said shafts in timed relation; means for rotatably reversing the said holder; a font selecting mechanism to regulate the stations at which the said extractors operate embodying a plurality of rocking shafts slidably connected with said extractors and said type holders and having lateral extensions; locking devices adapted to lock the said shafts and extensions in fixed relation; a plurality of selective key bars adapted to be interposed in the path of said locking devices to cause the same to lock the said shafts and extensions; means disposed in the path of said extensions to release the same from the said shafts; a line forming mechanism embodying a holder and an assembling device arranged to feed type into the said holder and to maintain them in position therein; and a conveying mechanism arranged to transfer the said type from the said fonts to the line forming mechanism.

103. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted on each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines, said extractors being arranged to extend within the delivery end of said magazines; a type holding mechanism mounted on said selecting mechanism arranged to receive the type as extracted from the said magazines; a movable member arranged to hold the type when so received; a font selecting mechanism to regulate the stations at which the said extractors operate embodying a plurality of rocking members operatively connected with said extractors to cause the same to operate in unison with the said rocking members; a line forming mechanism embodying a holder and an assembling device arranged to feed type into the said holder and to maintain them in position therein; and a conveying mechanism arranged to transfer the said type from the said fonts to the line forming mechanism.

104. A type setting machine comprising a font battery embodying a plurality of fonts the delivery ends whereof are disposed in lateral straight line extension, each font embodying a series of magazines adapted to contain in column order type of a single character, said magazines each having a delivery opening alined with the opening of the other magazines forming its font, and each of said magazines forming an open sided channel wherein the type face may be viewed; a type selecting mechanism embodying extractors for removing the type successively from the said magazines, said extractors being arranged to be inserted in the delivery end of said magazines; a type holding mechanism mounted on said selecting mechanism and arranged to receive the type as extracted from the said magazines; a movable member mounted on said type holder to retain the type when so received; means for elevating the said holder in timed relation with the extension of said extractors to extend the said holder under the type as extracted; a font selecting mechanism to regulate the stations at which the said extractors operate embodying a plurality of rocking shafts slidably connected with said extractors and said type holders and having radial extensions to regulate the rotary position of said shafts; a plurality of tracks disposed in pairs and arranged to shift the said extensions successively to rock the said shafts in timed relation each to the other; a line forming mechanism embodying a holder and an assembling device arranged to feed type into said holder and to maintain them in position therein; and a conveying mechanism arranged to transfer the said type from the said fonts to the line forming mechanism.

105. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type setting mechanism embodying extractors for removing the type successively from the said magazines, said extractors arranged to travel transversely across the said fonts and extensible to extract the type from said magazines; a type holding mechanism mounted on said selecting mechanism arranged to receive the type as extracted from the said magazines; a movable member arranged to hold the type when so received; a rocking shaft slidably connected with said type holding mechanism; a chain of gears interposed between said rocking shaft and movable member, said chain being arranged to rotate the said holding member when the said shaft is rocked; a font selecting mechanism to regulate the stations at which the said extractors operate embodying a plurality of rocking shafts slidably connected with said extractors and said type holders and having lateral extensions; locking devices adapted to lock the said shafts and extensions in fixed relation; a plurality of selective key bars adapted to be interposed in the path of said locking devices to cause the same to lock the said shafts and extensions; means disposed in the path of said extensions to release the same from the said shafts; a line forming mechanism embodying a holder and an assembling device arranged to feed type into the said holder and to maintain them in position therein; and a conveying mechanism arranged to transfer the said type from the said fonts to the line forming mechanism.

106. A type setting machine comprising a font battery embodying a plurality of fonts arranged in lateral straight line extension and radially disposed about a common center, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines, said extractors being arranged to extend within the delivery end of said magazines; a type holding mechanism mounted on said selecting mechanism arranged to receive the type as extracted from the said magazines; a movable member arranged to hold the type when so received; a font selecting mechanism to regulate the stations at which the said extractors operate embodying a plurality of rocking shafts slidably connected with said extractors and with said type holders and having lateral extensions; an engaging device adapted to lock the said shafts and extensions in fixed relation; a plurality of selective key bars adapted to be interposed in the path of said engaging device to operate the same; means for releasing the said extensions and shafts; a line forming mechanism embodying a holder and an assembling device arranged to feed type into the said holder and to maintain them in position therein; and a conveying mechanism arranged to transfer the said type from the said fonts to the line forming mechanism.

107. A type setting machine comprising a font battery embodying a plurality of fonts arranged in lateral straight line extension and radially disposed about a common center, each font embodying a series of magazines adapted to contain in column order type of a single character, said magazines each having a delivery opening alined with the opening of the other magazines forming its font; a feeding mechanism mounted in each of said magazines adapted to advance the type in each to present successively the type in said magazines at the delivery end thereof, said feeding mechanism being operatively connected with the type selecting mechanism; a type selecting mechanism embodying extractors for removing the type successively from the said magazines, said extractors being arranged to extend within the delivery end of said magazines; a type holding mechanism mounted on said selecting mechanism arranged to receive the type as extracted from the said magazines; a movable member arranged to hold the type when so received; a font selecting mechanism to regulate the stations at which the said extractors operate embodying a plurality of rocking shafts flexibly connected with said extractors and with the operative elements thereof; a plurality of fixed interference members arranged to rock the said shafts successively and in timed relation each to the other; a line forming mechanism embodying a holder and an assembling device arranged to feed type into said holder and to maintain them in position therein; and a conveying mechanism arranged to transfer the said type from the said fonts to the line forming mechanism.

108. A type setting machine comprising a font battery, embodying a plurality of fonts, the delivery ends whereof are disposed in lateral straight-line extension, each font embodying a series of magazines adapted to contain in column order type of a single character, the said magazines each having a delivery opening alined with the opening of the other magazines forming its font, and each of said magazines forming an open sided channel wherein the type face may be viewed; a type selecting mechanism embodying extractors for removing the type successively from the said magazines, said extractors being arranged to be inserted in the delivery ends of said magazines; a type holding mechanism mounted on said selecting mechanism and arranged to receive the type as extracted from the said magazines; a movable member mounted on said holder to retain the type when so received; means for elevating the said holder in timed relation with the extension of said extractors to extend the said holder under the type as extracted; a font selecting mechanism to regulate the stations at which the said extractors operate, embodying a plurality of rocking shafts slidably connected with said extractors and type holders, said shafts having lateral extensions; a plurality of tracks disposed in pairs to regulate the position of said extensions to rock the said shafts in timed relation each to the other; means for locking the said extensions and shafts in operative relation; a line forming mechanism embodying a holder and an assembling device arranged to feed type into the said holder and to maintain them in position therein; and a conveying mechanism arranged to transfer the said type from the said fonts to the line forming mechanism.

109. A type setting machine comprising a font battery embodying a plurality of fonts, the delivery ends whereof are disposed in lateral straight-line extension, each font embodying a series of magazines adapted to contain in column order type of a single character said magazines each having a delivery opening alined with the opening of the other magazines forming its font, and each of said magazines forming an open sided channel wherein the type face may be viewed; a type selecting mechanism embodying extractors for removing the type successively from the said magazines, said extractors being arranged to travel transversely across the said fonts and to be extended within the delivery ends of the said magazines when extended; a type holding mechanism mounted on said selecting mechanism arranged to receive the type as extracted from the said magazines; a movable grasping member arranged to hold the type when so received; a rocking shaft slidably connected with said type holders to elevate the same under the type being extracted; means connecting the said rocking shafts for extending the said extractors and for elevating the said type holders to rock the said shafts in timed relation; a font selecting mechanism to regulate the stations at which the said extractors operate embodying a series of rocking shafts arranged in pairs and rotatably mounted to be moved across the delivery ends of said fonts successively; a plurality of shaft rocking devices loosely mounted on each pair of said shafts, said rocking devices on each pair equaling in number the said fonts; locking devices carried upon said rocking devices arranged to fixedly connect said shafts and rocking devices; manually operated selective devices for operating the said locking devices, said selective devices equaling in number the said fonts; a plurality of interference devices disposed in the path of said rocking devices to operate the same, said interference devices relative in number to the said fonts and disposd in successive order and in relation to said fonts; a line forming mechanism embodying a holder and an assembling device arranged to feed type into the said holder and to maintain them in position therein; and a conveying mechanism arranged to transfer the said type from the said fonts to the line forming mechanism.

110. A type setting machine comprising a plurality of fonts arranged in lateral straight-line extension and radially disposed about a common center, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery ends thereof, said feeding mechanism being operatively connected with the type selecting mechanism; a type selecting mechanism embodying extractors for moving the type successively from the said magazines said extractors being arranged to extend within the delivery ends of said magazines; a type holding mechanism mounted on said selecting mechanism arranged to receive the type as extracted from the said magazines; a movable member arranged to hold the type when so received; a font selecting mechanism to regulate the stations at which the said extractors operate embodying a plurality of rocking members operatively connected with said extractors to cause the same to operate in unison with said rocking members; a plurality of tracks shaped to rock the said rocking members; a line forming mechanism embodying a holder and an assembling device arranged to feed type into the said holder and to maintain them in position therein; and a conveying mechanism arranged to transfer the said type from the said fonts to the line forming mechanism.

111. A type setting machine comprising a font battery embodying a plurality of fonts the delivery ends whereof are disposed in lateral straight-line extension, each font embodying a series of magazines adapted to contain in column order type of a single character, said magazines each having a delivery opening alined with the opening of the other magazines forming its font, and each of said magazines forming an open sided channel wherein the type face may be viewed; a type selecting mechanism embodying extractors for removing the type successively from the said magazines, said extractors being arranged to travel transversely across the said fonts; a type holding mechanism mounted on said selecting mechanism and arranged to receive the type as extracted from the said magazines; a movable member arranged to hold the type when so received by the said holding member; a rocking shaft slidably connected with said type holders and adapted to elevate the same; means for rocking the said shaft in timed relation with the font selecting mechanism; a font selecting mechanism to regulate the stations at which the said extractors operate embodying a plurality of rocking shafts slidably connected with said extractors and type holders said shafts having lateral extensions; a plurality of tracks disposed in pairs to regulate the position of said extensions to rock the said shafts in timed relation each to the other; key operated selective means for locking the said extensions and shafts in operative relation; a line forming mechanism embodying a holder and an assembling device arranged to feed type into the said holder and to maintain them in position therein; and a conveying mechanism arranged to transfer the said type from the said fonts to the line forming mechanism.

112. A type setting machine comprising a font battery embodying a plurality of fonts disposed in lateral straight line extension each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery ends thereof, said feeding mechanism being operatively connected with the type selecting mechanism; a type selecting mechanism embodying extractors for removing the type successively from the said magazines, said extractors being arranged to extend within the delivery ends of said magazines; a type holding mechanism mounted on said selecting mechanism arranged to receive the type as extracted from the said magazines; a movable member arranged to hold the type when so received; a font selecting mechanism to regulate the stations at which the said extractors operate embodying a plurality of rocking members operatively connected with said extractors and with said type holders to cause the same to move in unison with said rocking members; a plurality of tracks disposed in pairs and arranged to rock the said rocking members successively and in timed relation each to the other; a line forming mechanism embodying a holder and an assembling device arranged to feed type into the said holder and to maintain them in position therein; and a conveying mechanism arranged to transfer the said type from the said fonts to the line forming mechanism.

113. A type setting machine comprising a font battery embodying a plurality of fonts arranged in lateral straight line extension and radially disposed about a common center each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery ends thereof said feeding mechanism being operatively connected with the type selecting mechanism; a font selecting mechanism to regulate the stations at which the said extractors operate embodying a series of rocking shafts arranged in pairs and rotatably mounted to be moved across the delivery ends of said fonts successively; a plurality of shaft rocking devices loosely mounted on each pair of said shafts, said rocking devices on each pair equaling in number the said fonts; locking devices carried on said rocking devices arranged to fixedly connect said shafts and rocking devices; manually operated selective devices for operating said locking devices, said selective devices equaling in number the said fonts; a plurality of interference devices disposed in the path of said rocking devices to operate the same, said interference devices relative in number to the said fonts and disposed in successive order and in relation to said fonts; a line forming mechanism embodying a holder and an assembling device arranged to feed type into the said holder and to maintain them in position therein; and a conveying mechanism arranged to transfer the said type from the said fonts to the line forming mechanism.

114. A type setting machine comprising a font battery embodying a plurality of fonts disposed in lateral straight line extension each font embodying a series of magazines adapted to contain in column order type of a single character, said magazines each having a delivery opening alined with the opening of the other magazines forming its font; a feeding mechanism mounted in each of said magazines adapted to advance a column of type in each to present successively the type in said magazines at the delivery ends thereof, said feeding mechanism being operatively connected with the type selecting mechanism; a type selecting mechanism embodying extractors for removing the type successively from the said magazines said extractors arranged to travel transversely across the said fonts and extensible to extract the type from said magazines; a type holding mechanism mounted on said selecting mechanism arranged to receive the type as extracted from the said magazines; a movable member arranged to hold the type when so received; a rocking shaft slidably connected with the said type holding mechanism; a chain of gears interposed between the said rocking shaft and movable member said chain being arranged to rotate the said holding member when the said shaft is rocked; a font selecting mechanism to regulate the stations at which the said extractors operate embodying a series of rocking shafts arranged in pairs and rotatably mounted to be moved across the delivery ends of said fonts successively; a plurality of shaft rocking devices loosely mounted on each pair of said shafts, said rocking devices on each pair equaling in number the said fonts; locking devices carried on said rocking devices arranged to fixedly connect said shafts and rocking devices; manually operated selective devices for operating the said locking devices, said selective devices equaling in number the said fonts; a plurality of interference devices disposed in the path of the said rocking devices to operate the same, said interference devices relative in number to the said fonts and disposed in successive order and in relation to said fonts; a line forming mechanism embodying a holder and an assembling device arranged to feed type into the said holder and to maintain them in position therein; and a conveying mechanism arranged to transfer the said type from the said fonts to the line forming mechanism.

115. A type setting machine comprising a font battery embodying a plurality of fonts disposed in lateral straight-line extension each font embodying a series of magazines adapted to contain in column order type of a single character, said magazines each having a delivery opening alined with the opening of the other magazines forming its font; a feeding mechanism mounted in each of said magazines adapted to advance a column of type in each to present successively the type in said magazines at the delivery end thereof, said feeding mechanism being operatively connected with the type selecting mechanism; a type selecting mechanism embodying extractors for removing the type successively from the said magazines, said extractors being arranged to extend within the delivery end of said magazines; a type holding mechanism mounted on said selecting mechanism arranged to receive the type as extracted from said magazines; a movable member arranged to hold the type when so received; a font selecting mechanism to regulate the stations at which the said extractors operate embodying a plurality of rocking shafts slidably connected with said extractors and said type holders and having radial extensions to regulate the rotary position of said shafts; a plurality of tracks disposed in pairs and arranged to shift the said extensions successively to rock the said shafts in timed relation each to the other; a line forming mechanism embodying a holder and an assembling device arranged to feed type into the said holder and to maintain them in position therein; and a conveying mechanism arranged to transfer the said type from the said fonts to the line forming mechanism.

116. A type setting machine comprising a font battery embodying a plurality of fonts the delivery ends whereof are disposed in lateral straight-line extension, each font embodying a series of magazines adapted to contain in column order type of a single character, said magazines each having a delivery opening alined with the opening of the other magazines forming its font and each of said magazines forming an open sided channel wherein the type face may be viewed; a type selecting mechanism embodying extractors for removing the type successively from the said magazines, said extractors being arranged to travel transversely across the said fonts and to be extended within the delivery ends of said magazines when extended; a type holding mechanism mounted on said selecting mechanism arranged to receive the type as extracted from said magazines; a movable grasping member arranged to hold the type when so received; a rocking shaft slidably connected with said type holders to elevate the same under the type being extracted; means connecting the said rocking-shafts for extending the said extractors and for elevating the said type holders to rock the said shafts in timed relation; a font selecting mechanism to regulate the stations at which the said extractors operate embodying a series of rocking shafts arranged in pairs and rotatably mounted to be moved across the delivery ends of the said fonts successively; a plurality of shaft rocking devices loosely mounted on each pair of said shafts, said rocking devices on each pair equaling in number the said fonts; locking devices carried on said rocking devices arranged to fixedly connect said shafts and rocking devices; manually operated selective devices for operating the said locking devices said selective devices equaling in number the said fonts; a plurality of interference devices disposed in the path of said rocking devices to operate the same, said interference devices relative in number to the said fonts and disposed in successive order and in relation to said fonts; a line forming mechanism embodying a holder and an assembling device arranged to feed type into the said holder and to maintain them in position therein; and a conveying mechanism arranged to transfer the said type from the said fonts to the line forming mechanism.

117. A type setting machine comprising a font battery embodying a plurality of fonts arranged in lateral straight-line extension and laterally disposed about a common center, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery ends thereof, said feeding mechanism being operatively connected with the type selecting mechanism; a type selecting mechanism embodying extractors for removing the type successively from the said magazines, said extractors arranged to travel transversely across the said fonts and extensible to extract the type from said magazines; a type holding mechanism mounted on said selecting mechanism arranged to receive the type as extracted from the said magazines; a movable member arranged to hold the type when so received; a rocking shaft slidably connected with said type holding mechanism; a chain of gears interposed between said rocking shaft and movable member, said chain being arranged to rotate the said holding member when the said shaft is rocked; a font selecting mechanism to regulate the stations at which the said extractors operate embodying a series of rocking shafts arranged in pairs and rotatably mounted to be moved across the delivery ends of said fonts successively; a plurality of shaft rocking devices loosely mounted on each pair of said shafts, said rocking devices on each pair equaling in number the said fonts; locking devices carried on said rocking devices arranged to fixedly connect said shafts and rocking devices; manually operated selective devices for operating the said locking devices, said selective devices equaling in number the said fonts; a plurality of interference devices disposed in the path of said rocking devices to operate the same, said interference devices relative in number to the said fonts and disposed in successive order and in relation to said fonts; a releasing member to disengage the said locking devices from said shafts, said releasing member being disposed in line and in position to operate said locks after the said shafts have passed the last of the fonts composing the said battery; a line forming mechanism embodying a holder and an assembling device arranged to feed type into the said holder and to maintain them in position therein; and a conveying mechanism arranged to transfer the said type from the said fonts to the line forming mechanism.

118. A type setting machine comprising a font battery embodying a plurality of fonts arranged in lateral straight-line extension and radially disposed about a common center, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery ends thereof, said feeding mechanism being operatively connected with the type selecting mechanism; a type selecting mechanism embodying extractors for removing the type successively from the said magazines, said extractors being arranged to extend within the delivery ends of said magazines; a type holding mechanism mounted on said selecting mechanism arranged to receive the type as extracted from the said magazines; a movable member arranged to hold the type when so received; a font selecting mechanism to regulate the stations at which the said extractors operate embodying a plurality of rocking shafts slidably connected with said extractors and type holders, said shafts having lateral extensions; a plurality of tracks disposed in pairs to regulate the position of said extensions to rock the said shafts in timed relation each to the other; means for locking the said extensions and shafts in operative relation; a line forming mechanism embodying a holder and an assembling device arranged to feed type into the said holder and to maintain them in position therein; and a conveying mechanism arranged to transfer the said type from the said fonts to the line forming mechanism.

119. A type setting machine comprising a font battery embodying a plurality of fonts the delivery ends whereof are disposed in lateral straight line extension each font embodying a series of magazines adapted to contain in column order type of a single character, said magazines each having a delivery opening alined with the opening of the other magazines forming its font, and each of said magazines forming an open sided channel wherein the type face may be viewed; a type selecting mechanism embodying extractors for removing the type successively from the said magazines, said extractors being arranged to travel across the said fonts; a type holding mechanism mounted on said selecting mechanism and arranged to receive the type as extracted from the said magazines; a movable member arranged to hold the type when so received by the said holding member; a rocking shaft slidably connected with said type holder and adapted to elevate the same; means for rocking said shaft in timed relation with the font selecting mechanism; a font selecting mechanism to regulate the stations at which the said extractors operate embodying a plurality of rocking devices slidably connected with said extractors and with said type holders and having lateral extensions; an engaging device adapted to lock the said shafts and extensions in fixed relation; a plurality of selective key bars adapted to be interposed in the path of said engaging device to operate the same; means for releasing the said extensions and shafts; a line forming mechanism embodying a holder and an assembling device arranged to feed type into the said holder and to maintain them in position therein; and a conveying mechanism arranged to transfer the said type from the said fonts to the line forming mechanism.

120. A type setting machine comprising a font battery embodying a plurality of fonts the delivery ends whereof are disposed in lateral straight-line extension each font embodying a series of magazines adapted to contain in column order type of a single character, said magazines each having a delivery opening alined with the opening of the other magazines forming its font, and each of said magazines forming an open sided channel wherein the type face may be viewed; a type selecting mechanism embodying extractors for removing the type successively from the said magazines, said extractors being arranged to travel transversely across the said fonts; a type holding mechanism mounted on said selecting mechanism arranged to receive the type as extracted from the said magazines; a movable jaw mounted on said holding mechanism to grasp the type when received by said holding mechanism; a rocking shaft slidably connected with said extractors and adapted to elevate the same within the delivery ends of the said mechanisms; a rocking shaft slidably connected with said type holding mechanism adapted to elevate the same to the type after the same are delivered from the said magazines; a chain of gears mounted on the said holding mechanism and interposed between the said shaft and movable jaw thereof, said chain being disposed to spread the said holding jaw when and as the said holding mechanism is extended by the said rocking shaft; a font selecting mechanism to regulate the stations at which the said extractors operate embodying a series of rocking shafts arranged in pairs and rotatably mounted to be moved across the delivery ends of the said fonts successively; a plurality of shaft rocking devices loosely mounted on each pair of said shafts, said rocking devices on each pair equaling in number the said fonts; locking devices carried on said rocking devices arranged to fixedly connect said shafts and rocking devices; manually operated selective devices for operating the said locking devices said selective devices equaling in number the said fonts; a plurality of interference devices disposed in the path of the said rocking devices to operate the same, said interference devices relative in number to the said fonts and disposed in successive order and in relation to the said fonts; a line forming mechanism embodying a holder and an assembling device arranged to feed type into the said holder and to maintain them in position therein; and a conveying mechanism arranged to transfer the said type from the said fonts to the line forming mechanism.

121. A type setting machine comprising a font battery embodying a plurality of fonts disposed in lateral straight line extension each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines, said extractors being arranged to extend within the delivery end of said magazines; a type holding mechanism mounted on said selecting mechanism arranged to receive the type as extracted from the said magazines; a movable member arranged to hold the type when so received; a font selecting mechanism to regulate the stations at which the said extractors operate embodying a plurality of rocking shafts slidably connected with said extractors and type holders, said shafts having lateral extensions; a plurality of tracks disposed in pairs to regulate the position of said extensions to rock the said shafts in timed relation each to the other; a line forming mechanism embodying a holder and an assembling device to feed type into said holder and maintain them in position therein; and a conveying mechanism arranged to transfer the said type from the said fonts to the line forming mechanism.

122. A type setting machine comprising a font battery embodying a plurality of fonts disposed in lateral straight line extension each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines, said extractors being arranged to travel transversely across the said fonts and to be extended within the delivery end of the said magazines when extended; a type holding mechanism mounted on said selecting mechanism arranged to receive the type as extracted from the said magazines; a movable grasping member arranged to hold the type when so received; a rocking shaft slidably connected with said type holder to elevate the same under the type being extracted; a rocking shaft slidably connected with said extractors to extend the same within the delivery end of said magazines; means connecting the said rocking shafts for extending the said extractors and for elevating the said type holders to rock the said shafts in timed relation; a font selecting mechanism to regulate the stations at which the said extractors operate embodying a series of rocking shafts arranged in pairs and rotatably mounted to be moved across the delivery ends of said fonts successively; a plurality of shaft rocking devices loosely mounted on each pair of said shafts said rocking devices on each pair equaling in number the said fonts; locking devices carried on said rocking devices arranged to fixedly connect said shafts and rocking devices; manually operative selective devices for operating the said locking devices, said selective devices equaling in number the said fonts; a plurality of interference devices disposed in the path of the said rocking devices to operate the same, said interference devices relative in number to the said fonts and disposed in successive order and in relation to said fonts; a line forming mechanism embodying a holder and an assembling device arranged to feed type into said holder and to maintain them in position therein; and a conveying mechanism arranged to transfer the said type from the said fonts to the line forming mechanism.

123. A type setting machine comprising a font battery embodying a plurality of fonts the delivery ends whereof are disposed in lateral straight line extension, each font embodying a series of magazines adapted to contain in column order type of a single character, said magazines each having a delivery opening alined with the opening of the other magazines forming its font, and each of said magazines forming an open sided channel wherein the type face may be viewed; a type selecting mechanism embodying extractors for removing the type successively from the said magazines said extractors being arranged to travel transversely across the said fonts; a type holding mechanism mounted on said selecting mechanism arranged to receive the type as extracted from the said magazines; a movable jaw mounted on said holding mechanism to grasp the type when received by said holding mechanism; a rocking shaft slidably connected with said extractors and adapted to elevate the same within the delivery end of the said magazines; a rocking shaft slidably connected with said type holding mechanism adapted to elevate the same to the type as the same are delivered from the said magazines; a chain of gears mounted upon the said holding mechanism and interposed between the said shaft and movable jaw thereof, said chain being disposed to spread the said holding jaw when and as the said holding mechanism is extended by the said rocking shaft; a font selecting mechanism to regulate the stations at which the said extractors operate embodying a series of rocking shafts arranged in pairs and rotatably mounted to be moved across the said fonts successively; a plurality of shaft rocking devices loosely mounted on each pair of said shafts said rocking devices on each pair equaling in number the said fonts; locking devices carried on said rocking devices; arranged to fixedly connect said shafts and rocking devices; manually operative selective devices for operating the said locking devices said selective devices equaling in number the said fonts; a plurality of interference devices disposed in the path of the said rocking devices to operate the same, said interference devices relative in number to the said fonts and disposed in successive order and in relation to the said fonts; a releasing member to disengage the said locking devices from said shafts, said releasing member being disposed in line and in position to operate said locks after the said shafts have passed the last of the fonts composing the said battery; a line forming mechanism embodying a holder and an assembling device arranged to feed type into said holder and to maintain them in position therein; and a conveying mechanism arranged to transfer the said type from the said fonts to the line forming mechanism.

124. A type setting machine comprising a font battery embodying a plurality of fonts arranged in lateral straight line extension and radially disposed about a common center, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines, said extractors being arranged to extend within the delivery end of said magazines; a type holding mechanism mounted on said selecting mechanism arranged to receive the type as extracted from the said magazines; a movable member arranged to hold the type when so received; a font selecting mechanism to regulate the stations at which the said extractors operate embodying a plurality of rocking shafts slidably connected with said extractors and type holders, said shafts having lateral extensions; a plurality of tracks disposed in pairs to regulate the position of said extensions to rock the said shafts in timed relation each to the other; key operated selective means for locking the said extensions and shafts in operative relation; a line forming mechanism embodying a holder and an assembling device arranged to feed type into the said holder and to maintain them in position therein; and a conveying mechanism arranged to transfer the said type from the said fonts to the line forming mechanism.

125. A type setting machine comprising a font battery embodying a plurality of fonts arranged in lateral straight line extension and radially disposed about a common center, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines, said extractors being arranged to extend within the delivery end of said magazines; a type holding mechanism mounted on said selecting mechanism arranged to receive the type as extracted from the said magazines; a movable member arranged to hold the type when so received; a font selecting mechanism to regulate the stations at which the said extractors operate embodying a plurality of rocking shafts slidably connected with said extractors and said type holders and having lateral extensions; locking devices adapted to lock the said shafts and extensions in fixed relation; a plurality of selective key bars adapted to be interposed in the path of said locking devices to cause the same to lock the said shafts and extensions; means disposed in the path of said extensions to release the same from the said shafts; a line forming mechanism embodying a holder and an assembling device arranged to feed type into the said holder and to maintain them in position therein; and a conveying mechanism arranged to transfer the said type from the said fonts to the line forming mechanism.

126. A type setting machine comprising a font battery embodying a plurality of fonts arranged in lateral straight line extension and radially disposed about a common center, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof; said feeding mechanism being operatively connected with the type selecting mechanism; a type selecting mechanism embodying extractors for removing type successively from the said magazines, said extractors being arranged to extend within the delivery end of said magazines; a type holding mechanism mounted on said selecting mechanism arranged to receive the type as extracted from the said magazines; a movable member arranged to hold the type when so received; a font selecting mechanism to regulate the stations at which the said extractors operate embodying a series of rocking shafts arranged in pairs and rotatably mounted to be moved across the delivery ends of said fonts successively; a plurality of shaft rocking devices loosely mounted on each pair of said shafts, said rocking devices on each pair equaling in number the said fonts; locking devices carried on said rocking devices arranged to fixedly connect said shafts and rocking devices; manually operative selective devices for operating the said locking devices, said selective devices equaling in number the said fonts; a plurality of interference devices disposed in the path of said rocking devices to operate the same said interference devices relative in number to the said fonts and disposed in successive order and in relation to said fonts; a line forming mechanism embodying a holder and an assembling device arranged to feed type into the said holder and to maintain them in position therein; and a conveying mechanism arranged to transfer the said type from the said fonts to the line forming mechanism.

127. A type setting machine comprising a font battery embodying a plurality of fonts disposed in lateral straight line extension each font embodying a series of magazines adapted to contain in column order type of a single character, said magazines each having a delivery opening alined with the opening of the other magazines forming its font, and each of said magazines forming an open sided channel wherein the type face may be viewed; a type selecting mechanism embodying extractors for removing the type successively from the said magazines, said extractors being arranged to travel transversely across the said fonts; a type holding mechanism mounted on said selecting mechanism arranged to receive the type as extracted from the said magazines; a movable jaw mounted on said holding mechanism to grasp the type when received by said holding mechanism a rocking shaft slidably connected with said extractors and adapted to elevate the same within the delivery end of the said magazines; a rocking shaft slidably connected with said type holding mechanism adapted to elevate the same to the type as the same are delivered from the said magazines; a chain of gears mounted upon the said holding mechanism and interposed between the said shafts and movable jaw thereof, said chain being disposed to spread the said holding jaw when and as the said holding mechanism is extended by the said rocking shaft; a font selecting mechanism to regulate the stations at which the said extractors operate embodying a plurality of rocking shafts slidably connected with said extractors and said type holders and having lateral extensions; locking devices adapted to lock the said shafts and extensions in fixed relation; a plurality of selective key bars adapted to be interposed in the path of said locking devices to cause the same to lock the said shafts and extensions; means disposed in the path of said extensions to release the same from the said shafts; a line forming mechanism embodying a holder and an assembling device arranged to feed type into said holder and to maintain them in position therein; and a conveying mechanism arranged to transfer the said type from the said fonts to the line forming mechanism.

128. A type setting machine comprising a font battery embodying a plurality of fonts arranged in lateral straight line extension and radially disposed about a common center, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the said type successively from the said magazines, said extractors being arranged to extend within the delivery end of said magazines; a type holding mechanism mounted on said selecting mechanism arranged to receive the type as extracted from the said magazines; a movable member arranged to hold the type when so received; a font selecting mechanism to regulate the stations at which the said extractors operate embodying a series of rocking shafts arranged in pairs and rotatably mounted to be moved across the delivery ends of said fonts successively; a plurality of shaft rocking devices loosely mounted on each pair of said shafts, said rocking devices on each pair equaling in number the said fonts; locking devices carried on said rocking devices arranged to fixedly connect said shafts and rocking devices; manually operative selective devices for operating the said locking devices said selective devices equaling in number the said fonts; a plurality of interference devices disposed in the path of said rocking devices to operate the same, said interference devices relative in number to the said fonts and disposed in successive order and in relation to said fonts; a line forming mechanism embodying a holder and an assembling device arranged to feed type into said holder and to maintain them in position therein; and a conveying mechanism arranged to transfer the said type from the said fonts to the line forming mechanism.

129. A type setting machine comprising a font battery embodying a plurality of fonts disposed in lateral straight line extension each font embodying a series of magazines adapted to contain in column order type of a single character, said magazines each having a delivery opening alined with the opening of the other magazines forming its font; a type selecting mechanism embodying reciprocated members extensible to extract the type from said magazines; a font selecting mechanism embodying a plurality of rocking shafts slidably connected with said selecting mechanism; means for rocking said shafts at certain stations in the rotary path of said shafts; a line forming mechanism embodying a holder and assembling devices arranged to feed type into said holder, and maintain the same in position therein; a plurality of devices to operate the said assembling devices in timed relation with the said reciprocated members; and a conveying mechanism arranged to transfer the said type from the said fonts to the line forming mechanism.

130. A type setting machine comprising a font battery embodying a plurality of fonts arranged in lateral straight line extension and radially disposed about a common center, each font embodying a series of magazines adapted to contain in column order type of a single character said magazines each having a delivery opening alined to the opening of the other magazines forming its font; a type selecting mechanism embodying extractors for removing the type successively from the said magazines; a rocking shaft slidably connected with said extractors to extend the same within the delivery end of said magazines; means for rocking the said shaft; a font selecting mechanism to regulate the stations at which the said extractors operate embodying a plurality of rocking members operatively connected with said extractors to cause the same to operate in unison with said rocking members; a line forming mechanism embodying a holder and an assembling device arranged to feed type into said holder and maintain the same in position therein; a plurality of devices to operate the said assembling devices in timed relation with the said extractors; and a conveying mechanism arranged to transfer the said type from the said fonts to the line forming mechanism.

131. A type setting machine comprising a font battery embodying a plurality of fonts disposed in lateral straight line extension each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof; a type selecting mechanism embodying extractors for removing the type successively from the said magazines, said type selecting mechanism being arranged to travel transversely across the said fonts; a type holding mechanism mounted on said selecting mechanism and arranged to receive the type as extracted from the said fonts; a font selecting mechanism to regulate the stations at which the said extractors operate embodying a plurality of rocking shafts flexibly connected with said extractors and with the operative elements thereof; a plurality of fixed interference members arranged to rock the said shafts successively and in timed relation each to the other; a line forming mechanism embodying a holder and an assembling device arranged to feed type into said holder and maintain the same in position therein; a plurality of devices to operate the said assembling devices in timed relation with the said extractors; and a conveying mechanism arranged to transfer said type from the said fonts to the line forming mechanism.

132. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively type in said magazines at the delivery end thereof, said feeding mechanism being operatively connected with the type selecting mechanism; a type selecting mechanism embodying extractors for removing the type successively from the said magazines, said type selecting mechanism being arranged to travel transversely across the said fonts; a type holding mechanism mounted on said selecting mechanism and arranged to receive the type as extracted from said fonts; a font selecting mechanism to regulate the stations at which the said extractors operate embodying a plurality of rocking shafts flexibly connected with said extractors and with the operative elements thereof; a plurality of fixed interference members arranged to rock the said shafts successively and in timed relation each to the other; a line forming mechanism embodying a holder and an assembling device arranged to feed type into said holder and maintain the same in position therein; a plurality of devices to operate the said assembling devices in timed relation with the said extractors; and a conveying mechanism arranged to transfer said type from the said fonts to the line forming mechanism.

133. A type setting machine comprising a font battery embodying a plurality of fonts the delivery ends whereof are disposed in lateral straight line extension, each font embodying a series of magazines adapted to contain in column order type of a single character, said magazines each having a delivery opening alined with the opening of the other magazines forming its font, and each of said magazines forming an open sided channel wherein the type face may be viewed; a type selecting mechanism embodying extractors for removing the type successively from the said magazines, said type selecting mechanism being arranged to travel transversely across the said fonts; a type holding mechanism mounted on said selecting mechanism and arranged to receive the type as extracted from the said fonts; a font selecting mechanism to regulate the stations at which the said extractors operate embodying a plurality of rocking shafts flexibly connected with said extractors and with the operative elements thereof; a plurality of fixed interference members arranged to rock the said shafts successively and in timed relation each to the other; a line forming mechanism embodying a holder and an assembling device arranged to feed type into said holder and maintain the same in position therein; a plurality of devices to operate the said assembling devices in timed relation with the said extractors; and a conveying mechanism arranged to transfer said type from the said fonts to the line forming mechanism.

134. A type setting machine comprising a font battery embodying a plurality of fonts disposed in lateral straight line extension, each font embodying a back plate said plate being removably mounted on the frame of the machine; a series of magazines adapted to contain in column order type of a single character; hangers for securing the said magazines on said back plates; a type selecting mechanism embodying extractors for removing the type successively from the said magazines, said type selecting mechanism being arranged to travel transversely across the said fonts; a type holding mechanism mounted on said selecting mechanism and arranged to receive the type as extracted from the said fonts; a font selecting mechanism to regulate the stations at which the said extractors operate embodying a plurality of rocking shafts flexibly connected with said extractors and with the operative elements thereof; a plurality of fixed interference members arranged to rock the said shafts successively and in timed relation each to the other; a line forming mechanism embodying a holder and an assembling device arranged to feed type into said holder and maintain the same in position therein; a plurality of devices to operate the said assembling devices in timed relation with the said extractors; and a conveying mechanism arranged to transfer the said type from the said fonts to the line forming mechanism.

135. A type setting machine comprising a font battery embodying a plurality of fonts disposed in lateral straight line extension, each font embodying a back plate said plate being removably mounted on the frame of the machine; a series of magazines adapted to contain in column order type of a single character; removable hangers for securing the said magazines on said back plates; a type selecting mechanism embodying extractors for removing the type successively from the said magazines, said type selecting mechanism being arranged to travel transversely across the said fonts; a type holding mechanism mounted on said selecting mechanism and arranged to receive the type as extracted from the said fonts; a font selecting mechanism to regulate the stations at which the said extractors operate embodying a plurality of rocking shafts flexibly connected with said extractors and with the operative elements thereof; a plurality of fixed interference members arranged to rock the said shafts successively and in timed relation each to the other; a line forming mechanism embodying a holder and an assembling device arranged to feed type into said holder and maintain the same in position therein; a plurality of devices to operate the said assembling devices in timed relation with the said extractors; and a conveying mechanism arranged to transfer the said type from the said fonts to the line forming mechanism.

136. A type setting machine comprising a font battery embodying a plurality of fonts disposed in lateral straight line extension each font embodying a series of magazines adapted to contain in column order type of a single character, said magazines each having a delivery opening alined with the opening of the other magazines forming its font; a type selecting mechanism embodying extractors for removing the type successively from the said magazines; a rocking shaft slidably connected with said extractors to extend the same within the delivery end of said magazines; means for rocking said shaft; a font selecting mechanism to regulate the stations at which the said extractors operate embodying a plurality of rocking shafts flexibly connected with said extractors and with the operative elements thereof; a plurality of fixed interference members arranged to rock the said shafts successively and in timed relation each to the other; a line forming mechanism embodying a fixed holder adapted to maintain a line of type; a reciprocated finger adapted to extend in the path of the said type holders and to the rear of the type held therein; interference members movable in unison with said extractors arranged to eject the said finger in the line of the said type; a spring connected with said finger to retract the same from the path of the said type holder; and a conveying mechanism arranged to transfer the said type from the said fonts to the line forming mechanism.

137. A type setting machine comprising a font battery embodying a plurality of fonts arranged in lateral straight line extension and radially disposed about a common center; each font embodying a series of magazines adapted to contain in column order type of a single character, said magazines each having a delivery opening alined with the opening of the other magazines forming its font; a type selecting mechanism embodying extractors for removing the type successively from the said magazines said type selecting mechanism being arranged to travel transversely across the said fonts; a type holding mechanism mounted on said selecting mechanism and arranged to receive the type as extracted from the said fonts; a font selecting mechanism to regulate the stations at which the said extractors operate embodying a plurality of rocking shafts operatively connected with the said extractors to cause the same to operate in unison with said rocking shafts; a plurality of tracks shaped to rock the said rocking members; a line forming mechanism embodying a fixed holder adapted to maintain a line of type; a reciprocated finger adapted to extend in the path of the said type holder and to the rear of the type held therein; interference members movable in unison with said extractors and arranged to eject the said finger in the line of the said type; a spring connected with said finger to retract the same from the path of said type holder; and a conveying mechanism arranged to transfer the said type from the said fonts to the line forming mechanism.

138. A type setting machine comprising a font battery embodying a plurality of fonts disposed in lateral straight line extension, each font embodying a series of magazines adapted to contain in column order type of a single character; said magazines each having a delivery opening alined with the opening of the other magazines forming its font; a feeding mechanism mounted in each of said magazines adapted to advance the column of type in each to present successively the type in said magazines at the delivery end thereof; a type selecting mechanism embodying extractors for removing the type successively from the said magazines, said extractors being arranged to extend within the delivery end of said magazines; a type holding mechanism mounted on said selecting mechanism arranged to receive the type as extracted from the said magazines; a movable member arranged to hold the type when so received; a font selecting mechanism to regulate the stations at which the said extractors operate embodying a plurality of rocking members operatively connected with said extractors and with said type holders to cause the same to operate in unison with said rocking members; a plurality of tracks disposed in pairs and arranged to rock the said rocking members successively and in timed relation each to the other; a line forming mechanism embodying a fixed holder adapted to maintain a line of type; a reciprocated finger adapted to extend in the path of the said type holder and to the rear of the type held therein; interference members movable in unison with said extractors and arranged to eject the said finger in the line of the said type; a spring connected with said finger to retract the same from the path of said type holder; and a conveying mechanism arranged to transfer the said type from the fonts to the line forming mechanism.

139. A type setting machine comprising a font battery embodying a plurality of fonts disposed in lateral straight line extension. each font embodying a series of magazines adapted to contain in column order type of a single character, said magazines each having a delivery opening alined with the opening of the other magazines forming its font: a feeding mechanism mounted in each of said magazines adapted to advance the column of type in each to present successively the type in said magazines at the delivery end thereof, said feeding mechanism being operatively connected with the type selecting mechanism; a type selecting mechanism embodying extractors for removing the type successively from the said magazines, said extractors being arranged to be inserted in the delivery end of said magazines; a type holding mechanism mounted on said selecting mechanism and arranged to receive the type as extracted from the said magazines; a movable member mounted on the said holder to retain the type when so received; means for elevating the said holder in timed relation with the extension of said extractor to extend the said holder under the type as extracted; a font selecting mechanism to regulate the stations at which the said extractors operate embodying a plurality of rocking shafts slidably connected with said extractors and said type holders and having radial extensions to regulate the rotary position of said shafts; a plurality of tracks disposed in pairs and arranged to shift the said extensions successively to rock the said shafts in timed relation each to the other; a line forming mechanism embodying a fixed holder adapted to maintain a line of type; a reciprocated finger adapted to extend in the path of the said type holder and to the rear of the type held therein; interference members movable in unison with said extractors and arranged to eject the said finger in the line of the said type; a spring connected with said finger to retract the same from the path of said type holder; and a conveying mechanism arranged to transfer the said type from the said fonts to the line forming mechanism.

140. A type setting machine comprising a font battery embodying a plurality of fonts the delivery ends whereof are disposed in lateral straight line extension each font embodying a series of magazines adapted to contain in column order type of a single character; said magazines each having a delivery opening alined with the opening of the other magazines forming its font, and each of said magazines forming an open sided channel wherein the type face may be viewed; a type selecting mechanism embodying extractors for removing the type successively from the said magazines, said extractors being arranged to travel transversely across the said fonts; a type holding mechanism mounted on said selecting mechanism and arranged to receive the type as extracted from the said magazines; a movable member arranged to hold the type when so received by the said holding member; a rocking shaft slidably connected with said type holder and adapted to elevate the same; means for rocking the said shaft in timed relation with the font selecting mechanism; a font selecting mechanism to regulate the stations at which the said extractors operate embodying a plurality of rocking shafts slidably connected with said extractors and type holders said shafts having lateral extensions; a plurality of tracks disposed in pairs to regulate the position of said extensions to rock the said shafts in timed relation each to the other; means for locking the said extensions and shafts in operative relation; a line forming mechanism embodying a fixed holder adapted to maintain a line of type; a reciprocated finger adapted to extend in the path of the said type holder and to the rear of the type held therein; interference members movable in unison with said extractors and arranged to eject the said finger in the line of the said type; a spring connected with said finger to retract the same from the path of said type holder; and a conveying mechanism arranged to transfer the said type from the said fonts to the line forming mechanism.

141. A type setting machine comprising a font battery embodying a plurality of fonts disposed in lateral straight line extension, each front embodying a series of magazines adapted to contain in column order type of a single character, said magazines each having a delivery opening alined with the opening of the other magazines forming its font; a type selecting mechanism embodying reciprocated members extensible to extract the type from said magazines; a font selecting mechanism embodying a plurality of rocking shafts slidably connected with said selecting mechanism; means for regulating said shafts at certain stations in the rotary path of said shafts; a line forming mechanism embodying a holder and an assembling device arranged to feed type into said holder and maintain the same in position therein; a plurality of devices to operate the said assembling devices in timed relation with the said reciprocated member; a conveying mechanism arranged to transfer the said type from the said fonts to the line forming mechanism embodying a plurality of endless chains; supporting rails extended in parallel arrangement with said fonts; carrier frames for said extractors and type holders movably mounted on said rails; a plurality of locking devices for engaging the said carriers and chains; means for operating the said locking devices at fixed positions; and a driving mechanism for continuously operating said chains.

142. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a type selecting mechanism embodying a plurality of rocking shafts slidably connected with said selecting mechanism; means for regulating said shafts at certain stations in the rotary path of said shafts; a line forming mechanism embodying a holder and an assembling device arranged to feed type into said holder and to maintain the same in position therein; a plurality of devices to operate the said assembling devices in timed relation with the said reciprocated member; a conveying mechanism arranged to transfer the said type embodying a plurality of endless chains; supporting rails extended in parallel arrangement with said fonts; carrier frames supporting extractors and type holders movably mounted on said rails; a plurality of locking devices for engaging the said carriers and said chains said locking devices being disposed to operate the opposite reaches of said chains to move the said carriers in opposite lateral directions; a plurality of operating devices for operating said locking device at predetermined stations on said rails; and a driving mechanism for continuously operating the said chains.

143. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font;

a type selecting mechanism embodying reciprocated members extensible to extract the type from said magazines; a font selecting mechanism embodying a plurality of rocking shafts slidably connected with said selecting mechanism; means for regulating said shafts at certain stations in the rotary path of said shafts; a line forming mechanism embodying a holder and an assembling device arranged to feed type into said holder and maintain the same in position therein; a plurality of devices to operate the said assembling devices in timed relation with the said extractors; a conveying mechanism arranged to transfer the type from the said fonts to the line forming mechanism embodying a plurality of endless chains; supporting rails extended in parallel arrangement in said fonts; carrier frames supporting extractors and type holders and movably mounted on said rails; a plurality of locking devices for engaging the said carriers and said chains; means for operating the said locking devices at fixed positions; a mechanism for moving the said rails transversely across the delivery ends of said fonts; and a driving mechanism for continuously operating the said chains in unison with the movement of the said rails past the said fonts.

144. A type setting machine comprising a font battery embodying a plurality of fonts arranged in lateral straight line extension and radially disposed about a common center, each font embodying a series of magazines adapted to contain in column order type of a single character, said magazines each having a delivery opening alined with the opening of the other magazines forming its font; a type selecting mechanism embodying extractors for removing the type successively from the said magazines, said type selecting mechanism being arranged to travel transversely across the said fonts; a type holding mechanism mounted on said selecting mechanism and arranged to receive the type as extracted from the said fonts; a font selecting mechanism to regulate the stations at which the said extractors operate embodying a plurality of rocking members operatively connected with said extractors to cause the same to operate in unison with said rocking members; a plurality of tracks shaped to rock the said rocking members; a line forming mechanism embodying a fixed holder adapted to maintain a line of type; a reciprocated finger adapted to extend into the path of the said type holder and to the rear of the type held therein; interference members movable in unison with said extractors and arranged to project the said finger into the path of the said type; a spring connected with said finger to retract the same from the path of the said type holder; a line forming mechanism arranged to transfer the said type from the said fonts to the line forming mechanism embodying a plurality of endless chains; supporting rails extended in parallel arrangement with said fonts; carrier frames for said extractors and type holders movably mounted on said rails; a plurality of locking devices for engaging said carriers and chains; means for operating the said locking devices at fixed positions; and a driving mechanism for continuously operating the said chains.

145. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof; a type selecting mechanism embodying extractors for removing the type successively from the said magazines said extractors being arranged to extend within the delivery end of said magazines; a type holding mechanism mounted on said selecting mechanism arranged to receive the type as extracted from the said magazines; a movable member arranged to hold the type when so received; a font selecting mechanism to regulate the stations at which the said extractors operate embodying a plurality of rocking shafts connected with said extractors and with the operative elements thereof; a plurality of fixed interference members arranged to rock the said shafts successively and in timed relation each to the other; a line forming mechanism embodying a fixed holder adapted to maintain a line of type; a reciprocated finger adapted to extend into the path of the said type holder and to the rear of the type held therein; interference members movable in unison with said extractors and arranged to project the said finger into the path of the said type; a spring connected with said finger to retract the same from the path of said type holder; a conveying mechanism arranged to transfer the said type from the said fonts to the line forming mechanism embodying a plurality of endless chains; supporting rails extended in parallel arrangement with said fonts; carrier frames for said extractors and type holders movably mounted on said rails; a plurality of locking devices for engaging said carriers and chains; means for operating the said locking devices at fixed positions; and a driving mechanism for continuously operating the said chains.

146. A type setting machine comprising a font battery embodying a plurality of fonts disposed in lateral straight line extension; each front embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof said feeding mechanism being operatively connected with the type selecting mechanism; a type selecting mechanism embodying extractors for removing the type successively from the said magazines said extractors being arranged to be inserted in the delivery end of said magazines; a type holding mechanism mounted on said selecting mechanism and arranged to receive the type as extracted from the said magazines; a movable member mounted on said holder to retain the type when so received; means for elevating the said holder in timed relation with the extension of said extractors to extend the said holder under the type as extracted; a font selecting mechanism to regulate the stations at which the said extractors operate embodying a plurality of rocking devices slidably connected with said extractors and said type holders and having radial extensions to regulate the rotary position of said shafts; a plurality of tracks disposed in pairs and arranged to shift the said extensions successively to rock the said shafts in timed relation each to the other; a line forming mechanism embodying a fixed holder adapted to maintain a line of type; a reciprocating finger adapted to extend in the path of the said type holder and to the rear of the type held therein; interference members movable in unison with said extractors and arranged to project the said finger into the path of the said type; a spring connected with said finger to retract the same from the path of said type holder; a conveying mechanism arranged to transfer the said type from the said fonts to the line forming mechanism embodying a plurality of endless chains; supporting rails extended in parallel arrangement with said fonts; carrier frames for said extractors and type holders removably mounted on said rails; a plurality of locking devices for engaging said carriers and chains; means for operating the said locking devices at fixed positions; and a driving mechanism for continuously operating the said chains.

147. A type setting machine comprising a font battery embodying a plurality of fonts the delivery ends whereof are disposed in lateral straight line extension, each font embodying a series of magazines adapted to contain in column order type of a single character, said magazines each having a delivery opening alined with the opening of the other magazines forming its font, and each of said magazines forming an open sided channel wherein the type face may be viewed; a type selecting mechanism embodying extractors for removing the type successively from the said magazines, said extractors being arranged to travel transversely across the said fonts; a type holding mechanism mounted on said selecting mechanism and arranged to receive the type as extracted from the said magazines; a movable member arranged to hold the type when so received by the said holding member; a rocking shaft slidably connected with said type holder and adapted to elevate the same; means for rocking the said shaft in timed relation with the font selecting mechanism; a font selecting mechanism to regulate the stations at which the said extractors operate embodying a plurality of rocking devices slidably connected with said extractors and type holders said shafts having lateral extensions; a plurality of tracks disposed in pairs to regulate the position of said extensions to rock the said shafts in timed relation each to the other; means for locking the said extensions and shafts in operative relation; a line forming mechanism embodying a fixed holder adapted to maintain a line of type; a reciprocated finger adapted to extend into the path of the said type holder and to the rear of the type held therein; interference members movable in unison with said extractors and arranged to project the said finger into the path of the said type; a spring connected with said finger to retract the same from the path of said type holder; a conveying mechanism arranged to transfer the said type from the said fonts to the line forming mechanism embodying a plurality of endless chains; supporting rails extended in parallel arrangement with said fonts; carrier frames for said extractors and type holders movably mounted on said rails; a plurality of locking devices for engaging said carriers and chains; means for operating the said locking devices at fixed positions; and a driving mechanism for continuously operating the said chains.

148. A type setting machine comprising a font battery embodying a plurality of fonts disposed in lateral straight line extension, each font embodying a series of magazines, adapted to contain in column order type of a single character, said magazines each having a delivery opening alined with the opening of the other magazines forming its font; a type selecting mechanism embodying extractors for removing the type successively from the said magazines, said extractors being arranged to extend within the delivery end of said magazines; a type holding mechanism mounted on said selecting mechanism arranged to receive the type as extracted from the said magazines; a movable member arranged to hold the type when so received; a font selecting mechanism to regulate the stations at which the said extractors operate embodying a plurality of rocking shafts slidably connected with said extractors and said type holders and having radial extensions to regulate the rotary position of said shafts; a plurality of tracks disposed in pairs and arranged to shift the said extensions successively to rock the said shafts in timed relation each to the other; a line forming mechanism embodying a fixed holder adapted to maintain a line of type; a reciprocated finger adapted to extend into the path of the said type holders and to the rear of the type held therein; interference members movable in unison with said extractors and arranged to project the said finger into the path of the said type; a spring connected with said finger to retract the same from the path of said type holder; a conveying mechanism for transferring the said type embodying a plurality of endless chains; supporting rails extended in parallel arrangement with said fonts; carrier frames supporting said extractors and said type holders movably mounted on said rails; a plurality of locking devices for engaging the said carriers and said chains said locking devices being disposed to operate the opposite reaches of the said chains to move the said carriers in opposite lateral directions; a plurality of operating devices for operating said locking devices at predetermined stations on said rails; and a driving mechanism for continuously operating said chains.

149. A type setting machine comprising a font battery embodying a plurality of fonts arranged in lateral straight line extension and radially disposed about a common center, each font embodying a series of magazines adapted to contain in column order type of a single character, said magazines each having a delivery opening alined with the opening of the other magazines forming its fonts; a type selecting mechanism embodying extractors for removing the type successively from the said magazines said extractors being arranged to be inserted in the delivery end of said magazines; a type holding mechanism mounted on said selecting mechanism and arranged to receive the type as extracted from the said magazines; a movable member mounted on said holder to retain the type when so received; means for elevating the said holder in timed relation with the extension of said extractor to extend the said holder under type as extracted; a font selecting mechanism to regulate the stations at which the said extractors operate embodying a plurality of rocking shafts slidably connected with said extractors and type holders said shafts having lateral extensions; a plurality of tracks disposed in pairs to regulate the position of said extensions to rock the said shafts in timed relation each to the other; means for locking the said extensions and shafts in operative relation; a line forming mechanism embodying a fixed holder adapted to maintain a line of type; a reciprocated finger adapted to extend into the path of the said type holder and to the rear of the type held therein; interference members movable in unison with said extractors and arranged to project the said finger into the path of the said type; a spring connected with said finger to retract the same from the path of said type holder; a conveying mechanism for transferring the said type embodying a plurality of endless chains; supporting rails extended in parallel arrangement with said fonts; carrier frames supporting said extractors and said type holders movably mounted on said rails; a plurality of locking devices for engaging the said carriers and said chains said locking devices being disposed to operate on opposite reaches of the said chains to move the said carriers in opposite lateral directions; a plurality of operating devices for operating the said locking devices at predetermined stations on said rails; and a driving mechanism for continuously operating the said chains.

150. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a feeding mechanism mounted in each of said magazines adapted to advance the column of type in each to present successively the type in said magazines at the delivery end thereof; a type selecting mechanism embodying extractors for removing the type successively from the said magazines said extractors being arranged to travel transversely across the said fonts; a type holding mechanism mounted on said selecting mechanism and arranged to receive the type as extracted from the said magazines; a movable member arranged to hold the type when so received by the said holding member; a rocking shaft slidably connected with said type holder and adapted to elevate the same; means for rocking the said shaft in timed relation with the font selecting mechanism; a font selecting mechanism to regulate the stations at which the said extractors operate embodying a plurality of rocking shafts slidably connected with said extractors and type holders, said shafts having lateral extensions; a plurality of tracks disposed in pairs to regulate the position of said extensions to rock the said shafts in timed relation each to the other; selective means for locking the said extensions and shafts in operative relation; a line forming mechanism embodying a fixed holder adapted to maintain a line of type; a reciprocated finger adapted to extend into the path of the said type holder and to the rear of the type held therein; interference members movable in unison with said extractors and arranged to project the said finger into the path of the said type; a spring connected with said finger to retract the same from the path of the said type holder; a conveying mechanism for transferring the said type embodying a plurality of endless chains; supporting rails extended in parallel arrangement with said fonts; carrier frames supporting said extractors and said type holders movably mounted on said rails; a plurality of locking devices for engaging the said carriers and said chains, said locking devices being disposed to operate on opposite reaches of the said chains to move the said carriers in opposite lateral directions; a plurality of operating devices for operating said locking devices at predetermined stations on said rails; and a driving mechanism for continuously operating the said chains.

151. A type setting machine comprising a font battery embodying a plurality of fonts disposed in lateral straight line extension each font embodying a series of magazines adapted to contain in column order type of a single character, said magazines each having a delivery opening alined with the opening of the other magazines forming its font; a feeding mechanism mounted in each of said magazines adapted to advance the column or type in each to present successively the type in said magazines at the delivery end thereof, said feeding mechanism being operatively connected with the said type selecting mechanism; a type selecting mechanism embodying extractors for removing the type successively from the said magazines said extractors being arranged to travel transversely across the said fonts and to be extended within the delivery end of the said magazines when extended; a type holding mechanism mounted on said selecting mechanism arranged to receive the type as extracted from the said magazines; a movable grasping member arranged to hold the type when so received; a rocking shaft slidably connected with said extractors to extend the same within the delivery end of said magazines; a rocking shaft slidably connected with said type holder to elevate the same under the type being extracted; means connecting the said rocking shafts for extending the said extractors and for elevating the said type holders to rock the said shafts in timed relation; a font selecting mechanism to regulate the stations at which the said extractors operate embodying a plurality of rocking shafts slidably connected with said extractors and type holders, said shafts having lateral extensions; a plurality of tracks disposed in pairs to regulate the position of said extensions to rock the said shafts in timed relation each to the other; key operated selective means for locking the said extensions and shafts in operative relation; a line forming mechanism embodying a fixed holder adapted to maintain a line of type; a reciprocated finger adapted to extend into the path of the said type holder and to the rear of the type held therein; interference members movable in unison with said extractors and arranged to project the said finger into the path of the said type; a spring connected with said finger to retract the same from the path of said type holder; a conveying mechanism for transferring said type embodying a plurality of endless chains; supporting rails extended in parallel arrangement with said fonts; carrier frames supporting said extractors and said type holders movably mounted on said rails; a plurality of locking devices for engaging the said carriers and said chains said locking devices being disposed to operate the opposite reaches of the said chains to move the said carriers in opposite lateral directions; a plurality of operating devices for operating said locking devices at predetermined stations on said rails; and a driving mechanism for continuously operating the said chains.

152. A type setting machine comprising a font battery embodying a plurality of fonts the delivery ends whereof are disposed in lateral straight line extension, each font embodying a series of magazines adapted to contain in column order type of a single character, said magazines each having a delivery opening alined with the opening of the other magazines forming its font, and each of said magazines forming an open sided channel wherein the type face may be viewed; a type selecting mechanism embodying extractors for removing the type successively from the said magazines, said extractors being arranged to travel transversely across the said fonts and to be extended within the delivery end of said magazines when extended; a type holding mechanism mounted on said selecting mechanism arranged to receive the type as extracted from the said magazines; a removable grasping member arranged to hold the type when so received; a rocking shaft slidably connected with said extractors to extend the same within the delivery end of said magazines; a rocking shaft slidably connected with said type holder to elevate the same under the type being extracted; means connecting the said rocking shafts for extending the said extractors and for elevating the said type holders to rock the said shafts in timed relation; means for rotatably reversing the said holder; a font selecting mechanism to regulate the stations at which the said extractors operate embodying a plurality of rocking shafts slidably connected with said extractors and with said type holders and having lateral extensions; an engaging device adapted to lock the said shafts and extensions in fixed relation; a plurality of selective key bars adapted to be interposed in the path of said engaging device to operate the same; means for releasing the said extensions and shafts; a line forming mechanism embodying a fixed holder adapted to maintain a line of type; a reciprocated finger adapted to extend into the path of the said type holder and to the rear of the type held therein; interference members movable in unison with said extractors and arranged to project the said finger into the path of the said type; a spring connected with said finger to retract the same from the path of the said type holder; a conveying mechanism for transferring the said type embodying a plurality of endless chains; supporting rails extended in parallel arrangement with said fonts; carrier frames supporting said extractors and said type holders movably mounted on said rails; a plurality of locking devices for engaging the said carriers and said chains, said locking devices being disposed to operate on opposite reaches of the said chains to move the said carriers in opposite lateral directions; a plurality of operating devices for operating said locking devices at predetermined stations on said rails; and a driving mechanism for continuously operating the said chains.

153. A type setting machine comprising a font battery embodying a plurality of fonts disposed in lateral straight line extension, each font embodying a series of magazines adapted to contain in column order type of a single character, said magazines each having a delivery opening alined with the opening of the other magazines forming its font; a type selecting mechanism embodying extractors for removing the type successively from the said magazines; a rocking shaft slidably connected with said extractors to extend the same within the delivery end of said magazines; means for rocking the said shaft; a font selecting mechanism to regulate the stations at which the said extractors operate embodying a plurality of rocking members operatively connected with said extractors and with said type holders to cause the same to operate in unison with said rocking members; a plurality of tracks disposed in pairs and arranged to rock the said rocking members successively and in timed relation each to the other; a line forming mechanism embodying a fixed holder adapted to maintain a line of type; a reciprocated finger adapted to extend into the path of the said type holder and to the rear of the type held therein; interference members movable in unison with said extractors and arranged to project the said finger in the path of the said type; a spring connected with said finger to retract the same from the path of said type holder; a conveying mechanism arranged to transfer the type from the said fonts to the line forming mechanism embodying a plurality of endless chains; supporting rails extended in parallel arrangement in said fonts; carrier frames supporting said extractors and said type holders and movably mounted on said rails; a plurality of locking devices for engaging the said carriers and said chains; means for operating the said locking devices at fixed positions; a mechanism for moving the said rails transversely across the delivery end of said fonts; and a driving mechanism for continuously operating the said chains in unison with the movement of the said rails past the said fonts.

154. A type setting machine comprising a font battery embodying a plurality of fonts disposed in lateral straight line extension, each font embodying a series of magazines adapted to contain in column order type of a single character, said magazines each having a delivery opening alined with the other magazines forming its font; a feeding mechanism mounted in each of said magazines adapted to advance the column of type in each to present successively the type in said magazines at the delivery end thereof; a type selecting mechanism embodying extractors for removing the type successively from the said magazines, said extractors being arranged to extend within the delivery end of said magazines; a type holding mechanism mounted on said selecting mechanism arranged to receive the type as extracted from the said magazines; a movable member arranged to hold the type when so received; a font selecting mechanism to regulate the stations at which the said extractors operate embodying a plurality of rocking shafts slidably connected with said extractors and type holders, said shafts having lateral extensions; a plurality of tracks disposed in pairs to regulate the position of said extensions to rock the said shafts in timed relation each to the other; means for locking the said extensions and shafts in operative relation; a line forming mechanism embodying a fixed holder adapted to maintain a line of type; a reciprocated finger adapted to extend into the path of the said type holders and to the rear of the type held therein; interference members movable in unison with said extractors and arranged to project the said finger into the path of the said type; a spring connected with said finger to retract the same from the path of the said type holder; a conveying mechanism arranged to transfer the type from the said fonts to the line forming mechanism embodying a plurality of endless chains; supporting rails extended in parallel arrangement with said fonts; carrier frames supporting said extractors and said type holders and movably mounted on said rails; a plurality of locking devices for engaging the said carriers and said chains; means for operating the said locking devices at fixed positions; a mechanism for moving the said rails transversely across the delivery end of said fonts; and a driving mechanism for continuously operating the said chains in unison with the movement of the said rails past the said fonts.

155. A type setting machine comprising a font battery embodying a plurality of fonts the delivery ends whereof are disposed in lateral straight line extension, each font embodying a series of magazines adapted to contain in column order type of a single character, said magazines each having a delivery opening alined with the opening of the other magazines forming its font, and each of said magazines forming an open sided channel wherein the type face may be viewed; a type selecting mechanism embodying extractors for removing the type successively from the said magazines, said extractors being arranged to travel transversely across the said fonts; a type holding mechanism mounted on said selecting mechanism and arranged to receive the type as extracted from the said magazines; a movable member arranged to hold the type when so received by the said holding member; a rocking shaft slidably connected with said type holder and adapted to elevate the same; means for rocking the said shaft in timed relation with the font selecting mechanism; a font selecting mechanism to regulate the stations at which the said extractors operate embodying a plurality of rocking shafts slidably connected with said extractors and type holders, said shafts having lateral extensions; a plurality of tracks disposed in pairs to regulate the position of said extensions to rock the said shafts in timed relation each to the other; key operated selective means for locking the said extensions and shafts in operative position; a line forming mechanism embodying a fixed holder adapted to maintain a line of type; a reciprocated finger adapted to extend into the path of the said type holders and to the rear of the type held therein; interference members movable in unison with said extractors and arranged to project the said finger into the path of the said type; a spring connected with said finger to retract the same from the path of the said type holders; a conveying mechanism arranged to transfer the type from the said fonts to the said line forming mechanism embodying a plurality of endless chains; supporting rails extended in parallel arrangement with said fonts; carrier frames supporting said extractors and said type holders and movably mounted on said rails; a plurality of locking devices for engaging said carriers and said chains; means for operating said locking devices at fixed positions; a mechanism for moving the said rails transversely across the delivery end of said fonts; and a driving mechanism for continuously operating the said chains in unison with the movement of the said rails past the said fonts.

In testimony whereof I have signed this specification in the presence of two subscribing witnesses.

JOHN J. HUMMEL.

Witnesses:
R. KERTHOUS,
LEON J. CADORE.